US010222766B2

(12) United States Patent
Fagan et al.

(10) Patent No.: US 10,222,766 B2
(45) Date of Patent: Mar. 5, 2019

(54) SYSTEM AND METHOD OF OPERATION OF THE SYSTEM INCORPORATING A GRAPHICAL USER INTERFACE ON A MOBILE COMPUTING DEVICE FOR A MEMBER OF A FLIGHT CREW IN A VEHICLE CABIN

(71) Applicant: BOMBARDIER INC., Dorval (CA)

(72) Inventors: Tim Michael Fagan, Beaconsfield (CA); Erin Murphy, Seattle, WA (US); Linsey Nancarrow, Seattle, WA (US); Jeff Bartenbach, Seattle, WA (US)

(73) Assignee: BOMBARDIER INC., Dorval, Quebec (CA)

( * ) Notice: Subject to any disclaimer, the term of this patent is extended or adjusted under 35 U.S.C. 154(b) by 350 days.

(21) Appl. No.: 14/165,068

(22) Filed: Jan. 27, 2014

(65) Prior Publication Data

US 2016/0062327 A1 Mar. 3, 2016

Related U.S. Application Data

(60) Provisional application No. 61/759,159, filed on Jan. 31, 2013.

(51) Int. Cl.
*G05B 15/02* (2006.01)
*B64D 11/00* (2006.01)

(52) U.S. Cl.
CPC ........ *G05B 15/02* (2013.01); *B64D 11/00153* (2014.12)

(58) Field of Classification Search
None
See application file for complete search history.

(56) References Cited

U.S. PATENT DOCUMENTS

| 4,501,013 A | 2/1985 | Sato |
| 5,555,458 A | 9/1996 | Large |

(Continued)

FOREIGN PATENT DOCUMENTS

| DE | 102006006363 A1 | 8/2007 |
| DE | 102007043379 A1 | 4/2009 |

(Continued)

OTHER PUBLICATIONS

Frequent Flying, "Vintage Airline Seat Map Eastern Air Lines Boeing 727-100", Jan. 18, 2012, 2 pages, downloaded http://frequentlyflying.boardingarea.com/vintage-airline-seat-map-eastern-air-lines-boeing-727-100/.

(Continued)

*Primary Examiner* — Tuan C Dao
(74) *Attorney, Agent, or Firm* — Karceski IP Law, PLLC

(57) ABSTRACT

A method of operation for a system incorporating a graphical user interface in a mobile computing device for a crew member within a cabin of an aircraft. The method includes displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter include a plurality of controllable parameters selected from a group encompassing light intensity, light color, temperature, and the degree of openness of at least one window shade. A system and executable computer program product also are provided.

20 Claims, 41 Drawing Sheets

(56) References Cited

U.S. PATENT DOCUMENTS

| | | |
|---|---|---|
| 6,249,913 B1 | 6/2001 | Galipeau et al. |
| 6,343,127 B1 | 1/2002 | Billoud |
| 6,448,907 B1 | 9/2002 | Naclerio |
| 6,988,246 B2 | 1/2006 | Kopitzke et al. |
| 7,114,171 B2 | 9/2006 | Brady, Jr. et al. |
| 7,500,716 B2 | 3/2009 | Guerin et al. |
| 7,509,587 B2 | 3/2009 | Kopitzke et al. |
| 7,878,586 B2 | 2/2011 | Kneller et al. |
| 7,908,158 B2 | 3/2011 | Stirlen et al. |
| 8,037,500 B2 | 10/2011 | Margis et al. |
| 8,065,463 B2 | 11/2011 | Porath et al. |
| 8,082,569 B2 | 12/2011 | Brady, Jr. et al. |
| 8,380,393 B1 | 2/2013 | Ohtomo |
| 8,613,385 B1 | 12/2013 | Hulet et al. |
| 2001/0023499 A1 | 9/2001 | Wakahara |
| 2002/0022896 A1* | 2/2002 | Dugan ............... G08B 5/221 700/83 |
| 2003/0132345 A1 | 7/2003 | Lehmann |
| 2004/0139467 A1 | 7/2004 | Rogerson et al. |
| 2004/0142658 A1* | 7/2004 | McKenna ........... H01Q 21/007 455/11.1 |
| 2004/0145612 A1 | 7/2004 | Kopitzke et al. |
| 2005/0001838 A1 | 1/2005 | Gregorio et al. |
| 2005/0002198 A1 | 1/2005 | Blechschmidt |
| 2005/0018172 A1 | 1/2005 | Gelfond et al. |
| 2005/0039305 A1 | 2/2005 | Chirumbolo |
| 2005/0185399 A1 | 8/2005 | Beermann et al. |
| 2005/0121978 A1 | 9/2005 | McAvoy |
| 2005/0280524 A1* | 12/2005 | Boone ................. B60K 35/00 340/461 |
| 2006/0030311 A1* | 2/2006 | Cruz .................. H01Q 1/246 455/431 |
| 2006/0045107 A1 | 3/2006 | Kucenas et al. |
| 2006/0092129 A1 | 5/2006 | Choquet et al. |
| 2006/0099959 A1* | 5/2006 | Staton ................ B60R 25/00 455/456.1 |
| 2006/0155429 A1 | 7/2006 | Boone et al. |
| 2007/0042772 A1* | 2/2007 | Salkini ............... G01S 5/02 455/431 |
| 2007/0061847 A1 | 3/2007 | Callahan et al. |
| 2007/0107277 A1 | 5/2007 | Simms et al. |
| 2007/0141899 A1* | 6/2007 | Saini ................. G06F 17/509 439/502 |
| 2007/0179737 A1* | 8/2007 | Kalokitis ............. G01C 7/04 702/150 |
| 2007/0236926 A1 | 10/2007 | Guard et al. |
| 2008/0055836 A1* | 3/2008 | Lamoree ............ B64D 11/003 361/837 |
| 2008/0104642 A1* | 5/2008 | Galipeau ............. H04N 7/10 725/76 |
| 2008/0144158 A1 | 6/2008 | Stavaeus et al. |
| 2008/0157997 A1 | 7/2008 | Bleacher et al. |
| 2008/0230653 A1 | 9/2008 | Mitchell et al. |
| 2008/0234893 A1 | 9/2008 | Mitchell et al. |
| 2009/0079705 A1 | 3/2009 | Sizelove et al. |
| 2009/0083805 A1 | 3/2009 | Sizelove et al. |
| 2009/0127078 A1 | 3/2009 | Hostmann et al. |
| 2009/0109036 A1* | 4/2009 | Schalla ............. B64D 11/0015 340/573.1 |
| 2009/0112638 A1* | 4/2009 | Kneller ............... G06Q 10/02 705/5 |
| 2009/0113494 A1 | 4/2009 | Weidel |
| 2009/0119431 A1 | 5/2009 | Porath et al. |
| 2009/0206070 A1 | 8/2009 | Ortner et al. |
| 2009/0249408 A1 | 10/2009 | Smallhorn |
| 2009/0288123 A1 | 11/2009 | Havlovick et al. |
| 2009/0319902 A1* | 12/2009 | Kneller ............... G06F 3/013 715/733 |
| 2010/0060736 A1 | 3/2010 | Shi et al. |
| 2010/0060739 A1 | 3/2010 | Salazar |
| 2010/0064327 A1 | 3/2010 | Lynch et al. |
| 2010/0070089 A1 | 3/2010 | Harrod et al. |
| 2010/0159879 A1 | 6/2010 | Salkini et al. |
| 2010/0176632 A1 | 7/2010 | Alford et al. |
| 2010/0187354 A1 | 7/2010 | Helfrich |
| 2010/0193633 A1 | 8/2010 | Budinger et al. |
| 2010/0313146 A1* | 12/2010 | Nielsen ............... G06T 19/006 715/757 |
| 2011/0004832 A1 | 1/2011 | Canal et al. |
| 2011/0082616 A1 | 4/2011 | Small et al. |
| 2011/0126242 A1 | 5/2011 | Cline et al. |
| 2011/0160937 A1* | 6/2011 | Caillaud ............. G06Q 10/06 701/3 |
| 2011/0162015 A1 | 6/2011 | Holyoake et al. |
| 2011/0164429 A1 | 7/2011 | Heym et al. |
| 2011/0174926 A1 | 7/2011 | Margis et al. |
| 2012/0060524 A1 | 3/2012 | Al-Ali |
| 2012/0110517 A1 | 5/2012 | Sparks et al. |
| 2012/0130547 A1 | 5/2012 | Fadell et al. |
| 2012/0131504 A1 | 5/2012 | Fadell et al. |
| 2012/0132746 A1 | 5/2012 | Sizelove |
| 2012/0254932 A1 | 10/2012 | Hudson et al. |
| 2013/0005336 A1* | 1/2013 | Ayotte ............... H04W 12/06 455/435.1 |
| 2013/0027954 A1 | 1/2013 | Boomgarden et al. |
| 2013/0063340 A1 | 3/2013 | Mondragon et al. |
| 2013/0093220 A1 | 4/2013 | Pajic |
| 2013/0161971 A1 | 6/2013 | Bugno et al. |
| 2013/0185662 A1 | 7/2013 | Quattrocolo et al. |
| 2013/0235000 A1 | 9/2013 | Lee et al. |
| 2013/0290902 A1 | 10/2013 | Martin et al. |
| 2014/0067208 A1 | 3/2014 | Klappert et al. |
| 2014/0085337 A1 | 3/2014 | Velten et al. |
| 2014/0109080 A1 | 4/2014 | Ricci |
| 2014/0239677 A1 | 8/2014 | Laib et al. |
| 2014/0309868 A1 | 10/2014 | Ricci |
| 2014/0324299 A1 | 10/2014 | Sorensen |
| 2015/0058777 A1 | 2/2015 | Graumann et al. |
| 2015/0253750 A1 | 9/2015 | Eronen et al. |
| 2015/0261379 A1 | 9/2015 | Kneuper et al. |

FOREIGN PATENT DOCUMENTS

| | | |
|---|---|---|
| DE | 102011112944 A1 | 3/2013 |
| JP | 2003182351 A | 7/2003 |
| WO | WO 0052550 A2 | 9/2000 |
| WO | WO 2009062974 A1 | 5/2009 |

OTHER PUBLICATIONS

Rockwell Collins, "Bombardier CES H D" brochure, 147-1351-000 10/11, © 2011 Rockwell Collins Inc, 8 pages.

Rosen Aviation, "Ultra CMS Technical Manual," Revision Date Mar. 11, 2010, Copyright 2010, Document No. 102350 Rev A, 28 pages.

Honeywell "Ovation Select 200C Personal Control Unit" brochure, A60-1 090-000-000, Mar. 2009, © 2009 Honeywell International Inc., 4 pages.

U.S. Appl. No. 14/164,858, filed Jan. 27, 2014, Distributed Architecture for a System and a Method of Operation of the System Incorporating a Graphical User Interface Controlling Functions in a Vehicle Cabin.

U.S. Appl. No. 14/164,932, filed Jan. 27, 2014, System and a Method of Operation of the System Incorporating a Graphical User Interface in a Bulkhead of a Vehicle Cabin.

U.S. Appl. No. 14/165,004, filed Jan. 27, 2014, System and a Method of Operation of the System Incorporating a Graphical User Interface in a Side Ledge of a Vehicle Cabin.

U.S. Appl. No. 14/165,032, filed Jan. 27, 2014, System and a Method of Operation of the System Incorporating a Graphical User Interface on a Mobile Computing Device for a Passenger in a Vehicle Cabin.

U.S. Appl. No. 14/165,068, filed Jan. 27, 2014, System and Method of Operation of the System Incorporating a Graphical User Interface on a Mobile Computing Device for a Member of a Flight Crew in a Vehicle Cabin.

International Search Report and Written Opinion dated Jul. 25, 2016, for International Patent Application No. PCT/IB2015/0059051.

(56) References Cited

OTHER PUBLICATIONS

International Search Report and Written Opinion dated Jul. 27 2016, for International Patent Application No. PCT/IB2015/0059049.
International Search Report and Written Opinion dated Aug. 2, 2016, for International Patent Application No. PCT/IB2015/0059050.
International Search Report and Written Opinion dated Aug. 3, 2016, for International Patent Application No. PCT/IB2015/0059052.
Airliners.Net, "A320 FWD Flight Attendant Panei" Tech Ops Forum, Mar. 17, 2007, 7 pages, downloaded from: http://www.airliners.net/aviationforums/tech_ops/read.main/186678/.
Airbus, "US Airways Flight 1549 A320-214 N106US Landing on the Hudson River", report submitted to the NTSB on Jan. 15, 2009, 54 pages.
Elo Touch Solutions, "Touch is in the air" (describing and depicting a Flight Attendant Panel), Google date: Oct. 3, 2006, 2 pages, downloaded from: http://www.elotouch.com/Solutions/Transportation/air.asp.
Heller, Christoph et al., "Spectrum Sensing for Congitive Wireless Applications inside Aircraft Cabins," 31st IEEE/AIAA Digital Avionics Systems Conference (DASC), Oct. 14-18, 2012, pp. 7E2-1-7E2-9.
International Search Report and Written Opinion dated Sep. 23, 2016, for International Patent Application No. PCT/IB2015/0059053.
Airbus 319 seat map (8/120 configuration), United Airlines, Copyright 2015 United Airlines, Nov. 6, 2015.
Airbus, Single Aisle Technical Training manual Maintenance Course: T1 Lights, select pages (pp. 1, 2, 4-6, 16-20, back cover), Oct. 2005.
JetPhotos.Net, Airbus A320-232 Bulkhead photo, United Airlines, Serial # 503, Mar. 5, 2003, 2 pages. Downloaded from: http//www.jetphotos.net/photo/109418.
SeatGuru, Bulkheads explained: pros and cons, Internet Archive record of https://www.seatguru.com/articles/bulkheads.php from Jan. 30, 2012.
Woods, Martin; The A318: enhancing the A320 Family, in FAST29, Airbus Technical Digest, Dec. 2001, pp. 8-13.
YouTube Screen Shots, Enhanced Fap—Airbus 320, uploaded by cesar soto on Sep. 12, 2007 at https://www.youtube.com/watch?v-IW8ql_3NUjg.
U.S. Appl. No. 14/165,032, filed Jan. 4, 2016.
U.S. Appl. No. 14/164,932, filed Apr. 18, 2016.
Elo Touch Solutions, "In Flight Entertainment/Cabin Management" (http://www.elotouch.com/Solutions/Transportation/air.asp for a description of an early (2006) "Flight Attendant Panel (FAP)"), 2006.
Heller et al., "Spectrum Sensing for Cognitive Wireless Applications Inside Aircraft Cabin," 31st Digital Avionics Systems Conference, Oct. 14-18, 2012.
http://www.airliners.net/aviationforums/tech_ops/read.main/186678/ 2007 description of (the mounting and operation of) the Airbus Flight Attendant Panel (FAP), Mar. 17-21, 2007.

\* cited by examiner

FIG. 24

SYSTEM AND METHOD OF OPERATION OF THE SYSTEM INCORPORATING A GRAPHICAL USER INTERFACE ON A MOBILE COMPUTING DEVICE FOR A MEMBER OF A FLIGHT CREW IN A VEHICLE CABIN

CROSS-REFERENCE TO RELATED APPLICATION(S)

This United States Non-Provisional Patent Application relies for priority on U.S. Provisional Patent Application Ser. No. 61/759,159, filed on Jan. 31, 2013, the entire contents of which are incorporated herein by reference.

FIELD OF THE INVENTION

The present patent application is directed to a system and a method of operation of the system incorporating a graphical user interface on a mobile computing device that is assignable to a member of a crew (i.e., an attendant) in a vehicle cabin (also referred to herein as a "crew GUI," "crew input/output node," or "crew IO node"). The crew IO node provides control over one or more functions within the cabin of the vehicle. The crew member may be a flight attendant (or other crew member) and the vehicle may be an aircraft.

DESCRIPTION OF THE RELATED ART

As should be apparent to those skilled in the art, there are a number of functions that may be controlled within the cabin of an aircraft. The functions may be divided into at least two categories: (1) functions related to environment, and (2) functions related to passenger comfort and entertainment.

Environmental functions include, but are not limited to, things such as cabin temperature, the intensity of the cabin lighting, and the degree to which the window shades are open, among other variables.

Functions related to passenger comfort include those related to actuation of a personal reading light, control over the air flow through an overhead vent, positioning of the passenger seat (i.e., upright or reclined), and a remote call for a flight attendant (i.e., a flight attendant call button).

Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. As should be apparent to any passenger, individuals may control the volume of the media that has been selected.

At present, selected environmental functions typically are adjusted by the flight crew for the comfort of all passengers within the aircraft. For example, temperature typically is controlled at a central location within the aircraft cabin, via a thermostat or similar temperature control device. Similarly, the main cabin lighting in the aircraft typically is controlled via a central panel available to the flight crew. As a result, the flight crew can turn on, turn off, or dim the main lights within the aircraft cabin for all of the passengers.

As should be apparent to the airplane traveler, functions associated with passenger comfort and entertainment typically are accessible directly from the passenger's seat.

This basic operational approach to aircraft cabin functions has been employed for many years. As presently configured, the control systems for the environment and for passenger comfort and entertainment within an aircraft operate independently from one another.

Recently, a desire has developed to improve the manner in which aircraft cabin functions are controlled. Specifically, a desire has arisen to develop controls for one or more functions within the cabin of an aircraft from one or more consolidated IO nodes.

SUMMARY OF THE INVENTION

The present invention provides a GUI and a method of operation of a GUI that is available to a member of a flight crew via a mobile computing device.

In one contemplated embodiment, the crew IO node is mobile and provides control to crew members over one or more functions within an aircraft cabin, regardless of the location of the crew member within the cabin.

The present invention provides for a method of operation for a system incorporating a graphical user interface in a mobile computing device for a crew member within a cabin of an aircraft. The method includes displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter include a plurality of controllable parameters selected from a group encompassing light intensity, light color, temperature, and the degree of openness of at least one window shade.

It is contemplated that the method also may include placing the graphical user interface into a sleep mode if selection of a controllable parameter is not received.

With respect to the method, it is contemplated that the plurality of controllable parameters also may include at least one of media type, media, content, and media volume and that the plurality of controllable parameters may be associated with at least one of the entire cabin of the aircraft, at least one zone within the cabin of the aircraft, or at least one seat within the cabin of the aircraft.

Moreover, the plurality of controllable parameters may be controllable via an interface presenting an isometric view of at least a portion of the cabin of the aircraft.

In an alternative embodiment, it is contemplated that the method may include prioritizing the control input received from the mobile computing device in relation to control inputs received from any other input device, thereby avoiding conflicts between the control inputs.

For the method, it is contemplated that light intensity, temperature, the degree of openness of the at least one window shade, and media volume may be adjustable between a predetermined minimum and a predetermined maximum. In addition, light color may be adjustable between a predetermined warm color and a predetermined cool color.

It is contemplated that the media content may include a video library, an audio library, and a map view. A map view is contemplated to encompass a global map view and a local map view.

Concerning the method, it is contemplated that the displaying of the menu for the controllable parameter includes displaying a light icon, a media icon, a thermostat icon, and a window shade icon. As such, the light icon may be one of a cabin light icon, a table light icon, and a reading light icon.

For the method of the present invention, the crew member device may be at least one of a personal computer, tablet, and smartphone.

The present invention also contemplates a system incorporating a graphical user interface in a mobile computing device for a crew member within a cabin of an aircraft. The system includes a first display for displaying at least one controllable parameter, an input for receiving a selection of the controllable parameter, a second display for displaying at least one control for the selected controllable parameter, wherein the input receives a control input for the selected controllable parameter, and a controller for adjusting the selected controllable parameter consistent with the control input. The controllable parameter includes a plurality of controllable parameters selected from a group encompassing light intensity, light color, temperature, and the degree of openness of at least one window shade.

With respect to the system, it is contemplated that the plurality of controllable parameters also may include at least one of media type, media, content, and media volume and that the plurality of controllable parameters may be associated with at least one of the entire cabin of the aircraft, at least one zone within the cabin of the aircraft, or at least one seat within the cabin of the aircraft.

In addition, with respect to the system, the plurality of controllable parameters may be controllable via an interface presenting an isometric view of at least a portion of the cabin of the aircraft.

Also concerning the system, it is contemplated that the control input received from the mobile computing device may be prioritized in relation to control inputs received from any other input device, thereby avoiding conflicts between the control inputs.

The present invention also provides for an executable computer program product providing instructions for operation of a system incorporating a graphical user interface for a mobile computing device for a crew member device within a cabin of an aircraft. The instructions include displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter includes a plurality of controllable parameters selected from a group that may include light intensity, light color, temperature, and the degree of openness of at least one window shade.

It is contemplated that the executable computer program product will operate such that the plurality of controllable parameters also include at least one of media type, media, content, and media volume and that the plurality of controllable parameters are associated with at least one of the entire cabin of the aircraft, at least one zone within the cabin of the aircraft, or at least one seat within the cabin of the aircraft.

In addition, the program product is contemplated to function such that the plurality of controllable parameters is controllable via an interface presenting an isometric view of at least a portion of the cabin of the aircraft.

Concerning the executable computer program product, the instructions also may include prioritizing the control input received from the mobile computing device in relation to control inputs received from any other input device, thereby avoiding conflicts between the control inputs.

Still further aspects of the present invention will be made apparent from the drawings and description that follows.

BRIEF DESCRIPTION OF THE DRAWINGS

The present invention will now be described in connection with the figures appended hereto, in which:

FIG. 24 is an illustration that provides one contemplated look for a passenger manifest GUI that may be displayed on the crew IO node of the present invention;

DETAILED DESCRIPTION OF EMBODIMENT(S) OF THE PRESENT INVENTION

Figure 1:
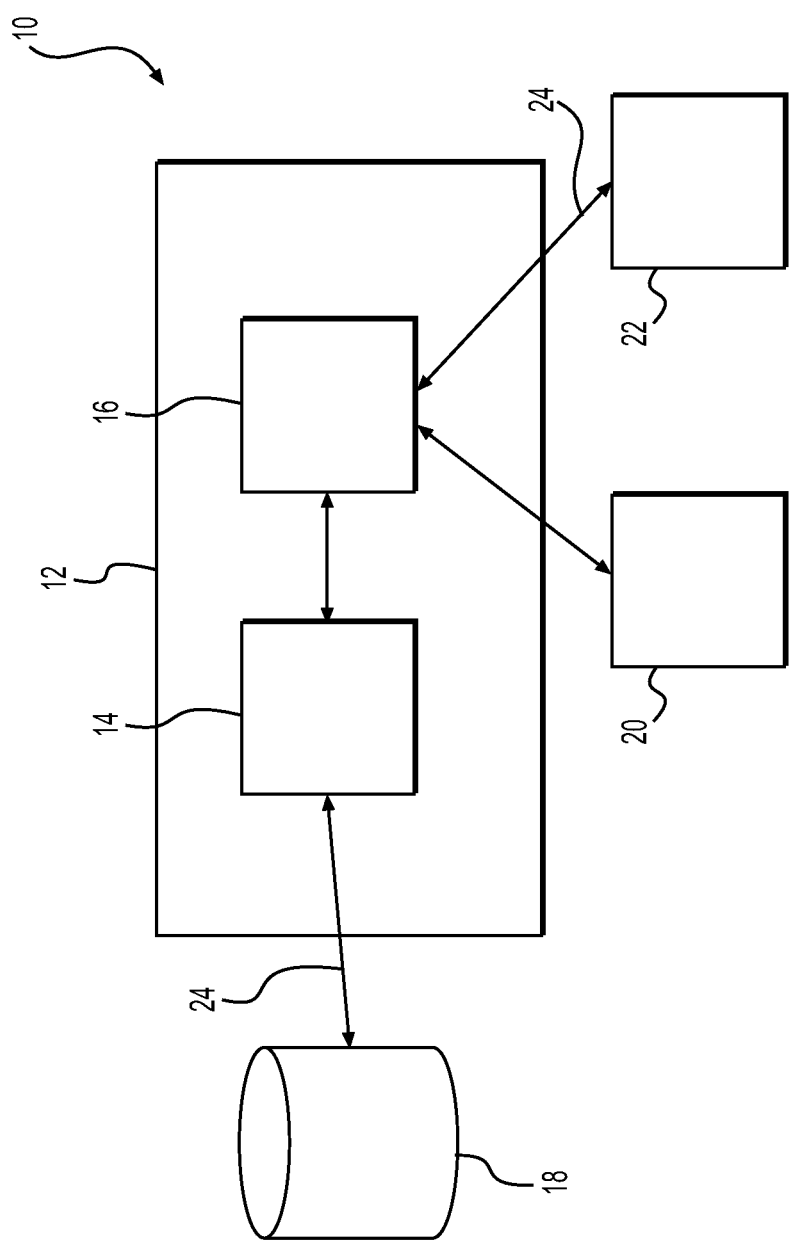
FIG. 1 is a graphical overview of one embodiment of a distributed architecture with which the side ledge IO node of the present invention is contemplated to cooperate.

The present invention will now be described in connection with one or more embodiments. The discussion of any one embodiment is not intended to be restrictive or limiting of the present invention. To the contrary, the embodiments described are intended to be illustrative of the broad scope of the present invention.

Among other aspects, the present invention addresses controls for parameters on board an aircraft including environmental functions and functions related to passenger comfort. As noted above, environmental functions include, but are not limited to, things such as cabin temperature, the intensity of the cabin lighting, and the degree to which the window shades are open, among other variables. Functions related to passenger comfort include those related to actuation of a personal reading light, control over the air flow through an overhead vent, positioning of the passenger seat (i.e., upright or reclined), and a remote call for a flight attendant (i.e., a flight attendant call button). Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. Individuals may control the volume of the media that has been selected.

As should be apparent, and as will be made more apparent in the discussion that follows, the labels "environment" and "passenger comfort" when applied to specific functions that are controllable in an aircraft are merely provided to assist with an understanding of the present invention. Use of either of the labels is not intended to be limiting, as the labels are not considered to be mutually exclusive of one another or of other functions that are not highlighted herein. For example, control over the degree to which the window shades are opened qualifies as control over an environmental function and also over aspects of passenger comfort. The lights in the aircraft belong to the same, crossover category.

With respect to the present invention, the terms "front" (or "fore"), "rear" (or "aft"), left (or "port"), and right (or "starboard") are used in the conventional fashion when referring to an aircraft. These conventions refer to the front, rear, left, and right sides of an aircraft as determined by its normal, forward direction of travel.

In addition, reference is made to members of the flight crew on board the aircraft. The term "flight crew" is intended to be generic to any member of the flight crew, including the pilot, co-pilot, and/or flight attendants. In other words, the term "flight crew" is intended to refer to persons other than passengers on board the aircraft.

The term "bulkhead" is used in the discussion of the present invention. A bulkhead is wall that is disposed within the aircraft. A bulkhead may or may not be a structural component of the aircraft.

It is contemplated that the crew IO node (or crew GUI) of the present invention may be provided on a corporate or private aircraft. In other words, it is contemplated that the present invention may be employed in an aircraft that typically has limited seating by comparison with a commercial, passenger aircraft. While corporate, business, or personal aircraft encompass the primary focus of the crew IO node of the present invention, the present invention is not limited just to such aircraft. To the contrary, the present invention may be employed in any aircraft, including commercial passenger aircraft, without departing from the scope of the present invention.

In addition, while the crew IO node of the present invention is contemplated to be employed on an aircraft, it is noted that the present invention may be employed in any other suitable environment. For example, the present invention may be practiced on a passenger car of a train, on board a ship, or any other suitable environment that should be apparent to those skilled in the art.

It is contemplated that the crew IO node of the present invention will be used in conjunction with a distributed architecture 10, one embodiment of which is illustrated in FIG. 1. The distributed architecture includes a central processing unit 12 ("CPU") that includes a processor 14 and a controller 16. The CPU 12 may be a computer, as should be apparent to those skilled in the art. However, the term CPU 12 is not intended to be limited only to a computer or any part thereof. To the contrary, the term CPU 12 is intended to encompass any type of computing device that may operate to provide the functionality described herein.

The term "processor" is intended to broadly encompass any device capable of executing machine-readable instructions. In other words, the term "processor 14" is intended to refer to any device or component that processes instructions and data. As an example, semiconductor chips within a computer are considered to fall within the definition of the term "processor 14."

While it is contemplated that the processor 14 will be a single component of the distributed architecture 10, the distributed architecture 10 is not intended to be limited solely to such a construction. The processor 14 may include multiple devices that are separate from one another, but cooperate together to process data and execute instructions. For example, the processor 14 may include a semiconductor processing chip and/or any other peripheral devices that support the operation of the semiconductor processing chip. Alternatively, the processor 14 may encompass processing chips that are located in separate systems, but which are operatively connected to provide the desired functionality.

As also illustrated in FIG. 1, the CPU 12 includes a controller 16. In one embodiment, it is contemplated that the controller 16 may be a hardware component that is separate from the processor 14. In a second contemplated embodiment, the controller 16 may be embodied in software (i.e., operating software) that runs on the central processing unit 12. In other words, in this second embodiment, the processor 14 may be the device on which the controller 16 is executed. In a third contemplated embodiment, the controller 16 may be a combination of hardware and software. Regardless of whether the controller 16 is hardware, software, or a combination of the two, it is contemplated that the controller 16 will facilitate communication between the processor 14 and any input/output ("IO") and/or peripheral devices connected thereto. The peripheral devices include the side ledge IO node of the present invention.

While the distributed architecture 10 is described in terms of a CPU 12, a processor 14, and a controller 16 (among other components), it is noted that this configuration is not intended to be illustrative of the breadth of the present invention. The configuration is not intended to exclude any possible server/client configurations. For example, the CPU 12 may be a server on which a client is resident. The controller 16 may be the client. In another configuration, the CPU 12 may be a server that provides access to an independent client. In still another configuration, the CPU 12 may be a router.

As should be apparent, there are many appellations that may be applied to the components comprising the distributed architecture 10. Those variations and equivalents are intended to be encompassed by the scope of the present invention.

As illustrated in FIG. 1, the processor 14 may connect to one or more databases 18. The database 18 may be a memory storage device, an IO device such as an MP3 player, a compact disc ("CD") player, a digital video disk ("DVD") player, or any other suitable storage and playback device. To emphasize the breadth of what is meant by the term, the database 18 may include, but is not limited to, any suitable memory on which the CPU 12 relies for its operation. The term database 18 should not be understood to be limited solely to memory devices.

It is noted that the distributed architecture 10 contemplated for use with the crew IO node of the present invention also may be connected to other systems and processors on board the aircraft. For example, the distributed architecture 10 may receive input from a flight computer on board the aircraft. These other input devices are not illustrated for simplicity. It is noted, however, that other inputs may be provided to the distributed architecture 10, as should be apparent to those skilled in the art.

The distributed architecture 10 is intended to be specific to the passengers and flight crew on an aircraft. As a result, the CPU 12 is contemplated to connect to at least two IO nodes: (1) a passenger IO node 20 and (2) a crew IO node 22. The passenger IO node 20 receives input from and provides output to the passenger. The crew IO node 22 receives input from and provides output to members of the flight crew. Both the passenger IO node 20 and the crew IO node 22 connect to the controller 16, through which selected inputs and outputs are directed.

The passenger IO node 20 is contemplated to encompass any suitable input/output device that may be available to a passenger. Similarly, the crew IO node 22 is intended to encompass any suitable input/output device that may be available to a member of the flight crew. In other words, while the present invention will be described in connection with specific devices, the present invention is not intended to be limited thereby. Other devices may be provide or substituted for the devices described herein without departing from the scope of the present invention.

In addition, as will be made more apparent in the discussion that follows, the passenger IO node 20 and the crew IO node 22 are contemplated to provide overlapping functionality. Therefore, the discussion of a particular functionality with respect to one IO node 20, 22 does not preclude the same functionality from being provided via the other of the IO nodes 20, 22.

As illustrated in FIG. 1, the various components of the distributed architecture 10 connect to one another via communication lines 24. The communication lines 24 may be wired or wireless communication lines, as should be apparent to those skilled in the art. Wired communication lines encompass, but are not limited to, wired connections and docking stations (for one or more of the IO nodes). Wireless communication lines may be provided via any suitable data format including, but not limited to, a Bluetooth™ connection (where appropriate).

Additionally, the communication lines are illustrated as two-way communication channels. While depicted as two-way communication channels, it is noted that one-way communication channels may be employed without departing from the scope of the present invention. In addition, it is also contemplated that the communication channels 24 may encompass one or more busses that channel multiple channels of communication along a single communication line 24.

Figure 2:
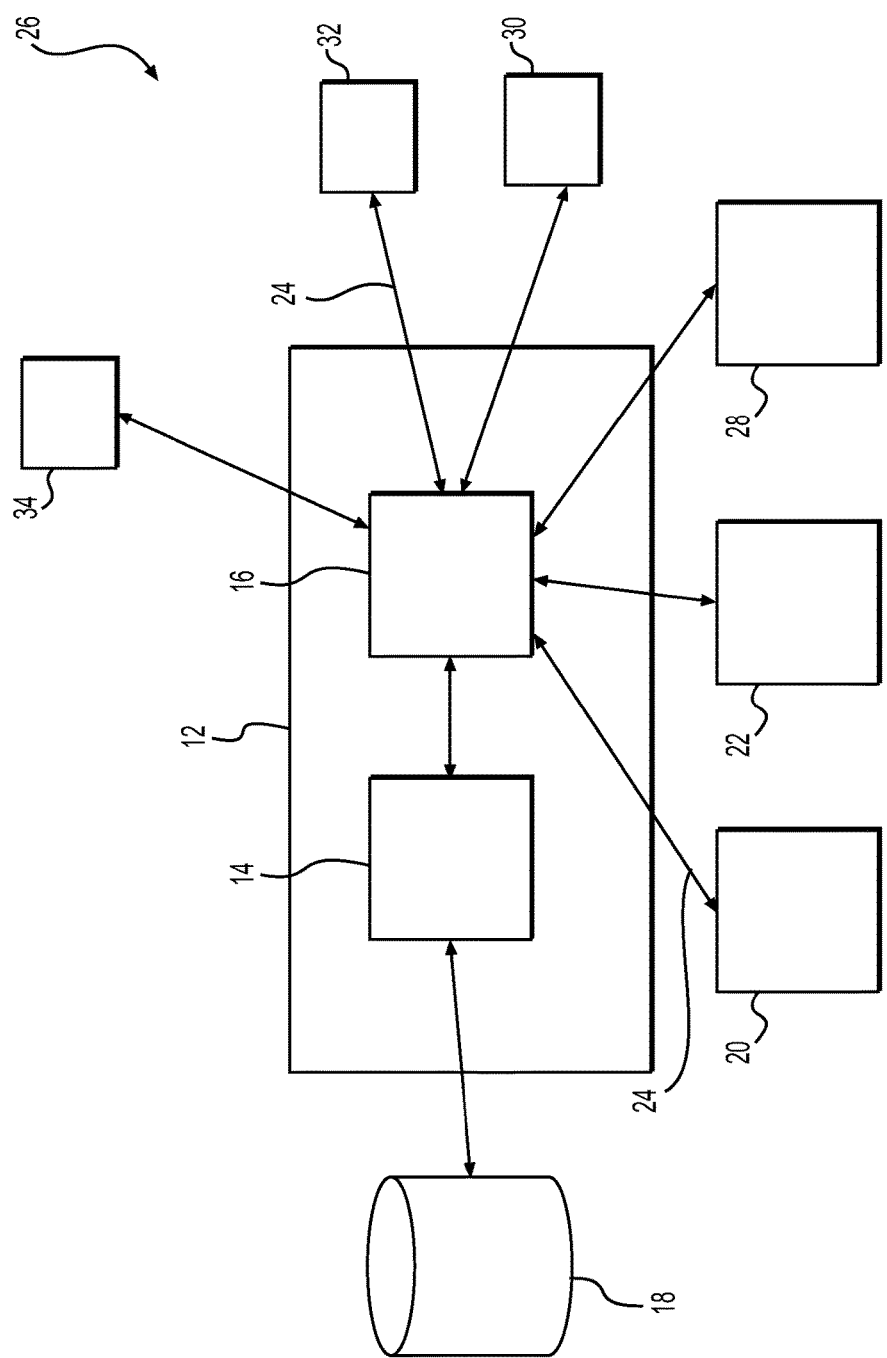
FIG. 2 is a graphical overview of a second embodiment of a distributed architecture with which the crew IO node of the present invention is contemplated to cooperate.

FIG. 2 illustrates a second embodiment of a distributed architecture 26 contemplated for use with the crew IO node 22 of the present invention. As will be made apparent from the discussion that follows, the second embodiment of the distributed architecture 26 may be considered as a variation of the first embodiment.

The distributed architecture 26 is directed to a location-oriented approach rather than a person-oriented approach, as detailed in connection with the distributed architecture 10. The person-oriented approach that is employed for the distributed architecture 10 encompasses an architecture where an IO node is associated with an individual, such as a passenger or a member of the flight crew. The location-oriented approach for the distributed architecture 26 encompasses an architecture that relies, at least in part, on IO nodes that are placed at specific locations with the aircraft.

As will be made apparent in discussion that follows, there is an overlap between the first distributed architecture 10 and the second distributed architecture 26.

As illustrated in FIG. 2, the second distributed architecture 26 is similar to the first distributed architecture in that the distributed architecture 26 includes the CPU 12, the processor 14, the controller 16, and the database 18. The second distributed architecture 26 differs from the first distributed architecture 10 in that additional IO nodes are provided at specific locations within the aircraft cabin, as noted above.

As illustrated in FIG. 2, the second distributed architecture is contemplated to include the passenger IO node 20 and the crew IO node 22. In addition, the second distributed architecture 26 includes a bulkhead IO node 28, a side ledge IO node 30, a table IO node 32, and a window IO node 34. Details of the bulkhead IO node 28, the side ledge IO node 30, the table IO node 32, and the window IO node 34 are provided below.

As suggested by the nomenclature employed, the IO nodes 28, 30, 32, 34 are provided at specific locations in the aircraft. The person-specific IO nodes 20, 22 are contemplated to be portable devices that are associated with individuals and, as such, are not associated with any fixed structure within the aircraft.

As illustrated in FIGS. 1 and 2, the IO nodes 20, 22, 28, 30, 32, 34 connect to the controller 16. The controller is contemplated to incorporate a hierarchical command structure that prioritizes input(s) from the different IO nodes 20, 22, 28, 30, 32, 34. For example, the controller 16 may include a hierarchical command structure where input(s) provided by a crew member override (or nullify) input(s) provided by a passenger. In another contemplated scenario, input(s) provided at one of the IO nodes 20, 22, 28, 30, 32, 34 may be given priority over any other input(s). For example, a crew member may have closed the window shades in the aircraft so that the passengers may enjoy in-flight entertainment. A passenger may wish to open his or her window shade via the window IO node 34. So that the passenger may do this, input(s) from the window IO node 34 may be placed at the top of the hierarchical command tree. Still further, the owner or operator of the aircraft may set the hierarchical command structure for the individual aircraft or a fleet of aircraft, as required or as desired.

It is noted that the window IO node 34 and the table IO node 32 are but two examples of nodes where limited space is available for control inputs and/or outputs. The present invention should not be understood to be limited to the nodes 32, 34 that are shown and described herein.

Figure 3:
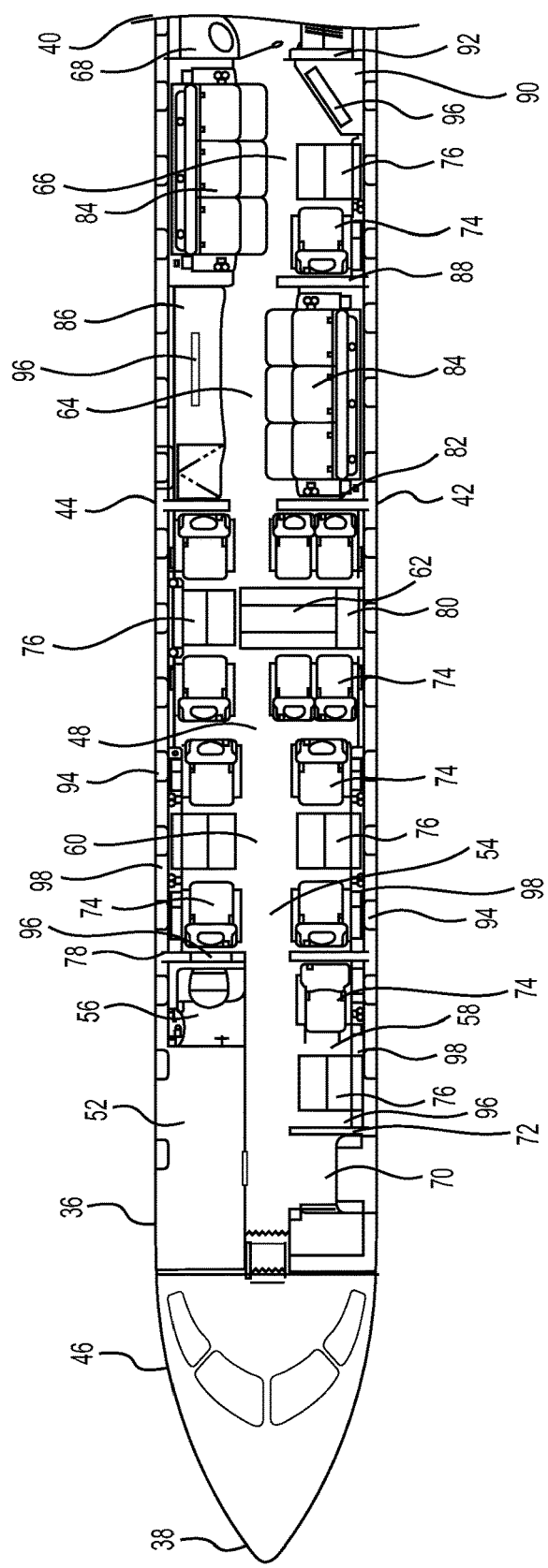
FIG. 3 is a graphical, top view of a portion of an aircraft, depicting one possible configuration for an aircraft cabin that employs the crew IO node of the present invention.

To facilitate the discussion of the distributed architectures 10, 26, a top view of an aircraft 36 is illustrated in FIG. 3. The aircraft 36 that is depicted is merely exemplary of the infinite possible configurations that are possible and should not be understood to be limiting of the configurations with which the side ledge IO node of the present invention is contemplated to operate.

As illustrated in FIG. 3, the aircraft 36 has a front end 38, a rear end 40, a left side 42, and a right side 44. The fuselage 46 of the aircraft 36 defines a cabin 48 therein. The layout of the cabin 48 illustrated in FIG. 3 may be provided for a corporate, business, or personal aircraft, such as a private jet.

The cabin 48 includes a cockpit 50, a galley 52, and a passenger area 54. The cabin 48 also includes a forward lavatory 56, a first passenger seating area 58, a second passenger seating area 60, a third passenger seating area 62, a first bedroom 64, a second bedroom 66, and an aft lavatory 68.

The first passenger seating area 58 is positioned adjacent to the galley 52 and the forward lavatory 56. The first passenger seating area 58 is immediately aft of the door 70 that provides ingress into and egress out of the aircraft 36. A first bulkhead 72 separates the area adjacent to the door 70 from the first passenger seating area 58.

The first passenger seating area 58 is defined by one passenger seat 74 and a stowable table 76. The passenger seat 74 is contemplated to be a reclining seat. However, the passenger seat 74 need not recline. The stowable table 76 is contemplated to be stowable in a side compartment adjacent to the passenger seat 74. As required by applicable aviation laws, the table 76 must be stowed for taxi, take-off, and landing.

It is noted that the first passenger seating area 58 may be reserved for one or more crew members and, therefore, be understood to be a crew seating area 58. Since the type of individual that uses the seating area 58 is not critical to operation of the present invention, the seating area 58 will be referred to herein as the first passenger seating area 58. It is also noted that, while other seating areas are indicated as being for passengers, crew members may use these areas together with the passengers.

A second bulkhead 78 separates the first passenger seating area 58 and forward lavatory 56 from the second passenger seating area 60.

The second passenger seating area 60 includes four passenger seats 74 that are positioned on opposite sides of a central aisle. Two seats 74 face one another across a table 76 on the right side 44 of the aircraft 36. Similarly, two seats 74 face one another across a stowable table 76 on the left side 42 of the aircraft.

The third passenger seating area 62 is defined by six passenger seats 74, a stowable table 76, and a stowable conference table 80. Two seats 74 face one another across the stowable table 76 on the right ride 44 of the aircraft 36. Four seats 74 face one another (in two pairs) across a stowable conference table 78. As illustrated, when the tables 76, 80 are deployed, they are contemplated to form a single conference table that extends across the width of the cabin 48.

As is apparent from FIG. 3, the second seating area 60 and the third seating area 62 are not separated from one another by any bulkhead or other barrier. Instead, these passenger areas 58, 60 are contemplated to form a continuous passenger area within the cabin 48.

The first bedroom 64 is separated from the third passenger seating area 62 by a third bulkhead 82. The first bedroom 64 includes a divan 84 on the left side 42 of the aircraft 36 and a cabinet 86, such as a media cabinet, on the right side 44 of the cabin 48. It is contemplated that the divan 84 will function both as a couch (or a sofa) and a bed, depending upon its use or configuration.

The second bedroom 66 is separated from the first bedroom 64 by a fourth bulkhead 88. The second bedroom 66 includes a divan 84 on the right side 44 of the aircraft 36. A seat 74 and stowable table 76 are provided on the left side 42 of aircraft 36. Also on the left side 42 is a cabinet 90, which may be provided with a media center, including a monitor or a television.

A fifth bulkhead 92 separates the second bedroom 66 from the rear lavatory 68.

It is noted that the fuselage 46 includes a plurality of windows 94.

In addition, at least four monitors 96 (i.e., video output screens) are provided in the aircraft 36 at various locations. The monitors 96 are contemplated to be positioned to provide video information and entertainment to the passengers in the aircraft 36. It is contemplated that entertainment also may be provided to the passengers via entertainment devices that are associated with the passenger seats 74.

As illustrated, the cabin 48 also includes several side ledges 98 that extend along the length of selected ones of the passenger seating areas 58, 60, 62. Where they are provided, the side ledges 98 are disposed between the passenger seat 74 and the wall of the fuselage 46. As is apparent from FIG. 3, the side ledges 98 are provided in the first passenger seating area 58 and the second passenger seating area 60. While side ledges 98 are not illustrated for the third passenger seating area 62, side ledges 98 may be provided in this seating area without departing from the scope of the present invention.

It is noted that the term "side ledge" is intended to encompass other furniture within the cabin 48 of the aircraft 36 in addition to the typical side ledge 98 that is identified in FIG. 3. Specifically, a cabinet or side ledge 98 may be provided adjacent to the divan 84 in the aircraft 36. While such a side ledge 98 would extend transversely to the travel direction of the aircraft 36, the side ledge 98 may be provided with control functionality. In addition, if the aircraft 36 were to include a bed with night stands, the night stands would be considered as side ledges 98 for purposes of the present invention.

As should be apparent to those skilled in the art, the configuration for the cabin 48 of the aircraft 36 that is provided in FIG. 3 is merely exemplary of the many possible configurations that may be employed in the cabin 48 of the aircraft 36. In other words, the present invention should not be understood to be limited to use on aircraft 36 with the configuration depicted in FIG. 3.

With renewed reference to the distributed architectures 10, 26, either architecture 10, 26 (or any variant thereof) may be employed onboard the aircraft 36. For purposes of the discussion herein, the aircraft 36 includes the second distributed architecture 26.

In this architecture, the passenger IO node 20 is contemplated to be a mobile electronic device, as discussed above. Mobile electronic devices include, but are not limited to, portable computers, tablets, and smartphones. As will be made apparent from the discussion that follows, it is contemplated that the passenger IO node 20 will be capable of receiving and storing a software program, such as an "app." The app may be specific to a particular aircraft or airline, as required or desired. The app is contemplated to provide the software needed for proper interface with the controller 16 for operation of the distributed architecture 26. In other words, the software resident on the passenger IO node 20 is contemplated to be configured to provide input to the CPU 12 and to receive output from the CPU 12.

The crew IO node 22 also is contemplated to be a mobile device, such as a portable computer, tablet, or smartphone. As with the passenger IO node 20, the crew IO node 22 is contemplated to be provided with a suitable app (or resident software) for interface with the CPU 12.

Where the mobile IO nodes 20, 22 are tablets, it is contemplated that the tablets 20, 22 will be provided with the delivery to the customer of the aircraft 36. In this embodiment, when a passenger boards the aircraft 36, the passenger will be assigned one of the mobile devices for use during the flight. Similarly, when the flight crew embarks on the aircraft 36, members of the flight crew will be assigned one of the mobile devices.

Alternatively, it is contemplated that a passenger may bring his or her own mobile device on board the aircraft 36. If so, the passenger (and/or crew member) may be prompted to download suitable software (i.e., the app) for interface with the controller 16 prior to boarding the aircraft. Similarly, the members of the flight crew may bring their own mobile devices on board the aircraft 36. If so, members of the flight crew also may be prompted to download suitable software on the personal device. In a further contemplated embodiment, the passenger (and/or crew member) may be prompted to download suitable software after boarding the aircraft, for example. It is noted that the apps (i.e., the software) downloaded by the passenger and the crew may be the same or may be separate apps, as required or as desired.

As also discussed above, the aircraft 36 may include additional IO nodes.

As noted above, the crew IO node 22 is the focus of the present invention. While the crew IO node 22 is contemplated to be embodied is an electronic tablet device with a touch-sensitive surface, the crew IO node 22 may be any other suitable alternative device without departing from the scope of the present invention. Moreover, while the present invention is described as a mobile device, meaning that it is not structurally secured to the aircraft 36, the crew IO node 22 may be affixed in the aircraft 36 without departing from the scope of the present invention.

It is noted that the crew IO node 22 and the passenger IO node 20 that is contemplated to work together with the crew IO node 22 share similar functionality. More specifically, the crew IO node 22 is contemplated to include all of the functionality available on the passenger IO node 20 and also to include additional functionality that is specific to members of the flight crew and operation of the aircraft 36. As a result, the passenger IO node 20 is discussed below, with the understanding that a discussion of the crew IO node 22 encompasses the same functionality.

It is noted that the term "user" is employed to refer to passengers and flight crew members, since both categories of persons are contemplated to be users of the present invention. As such, where the term "passenger" or "flight crew member" are used, the term is not intended to exclude use by any other user, as required or as desired.

Figure 4:
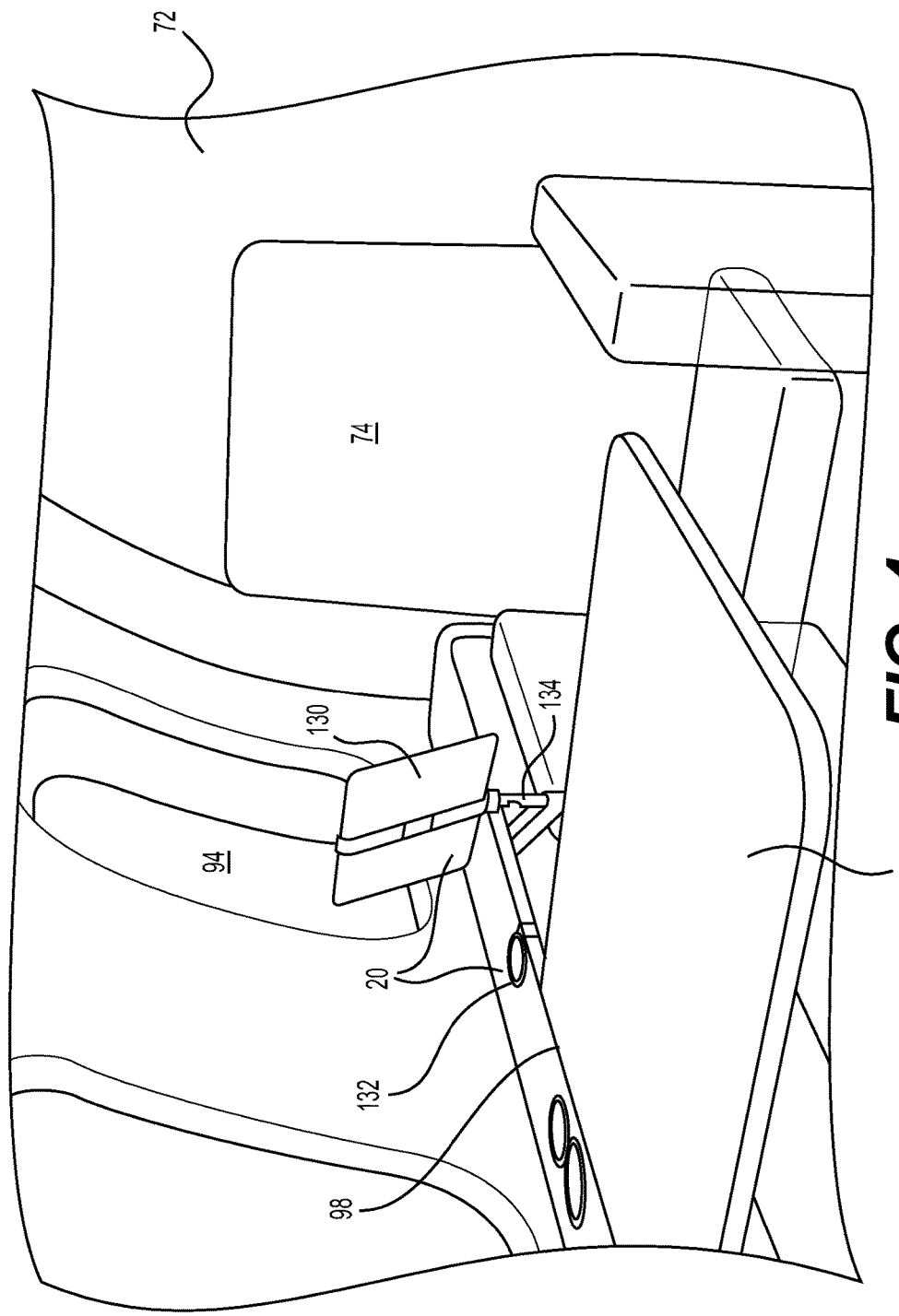
FIG. 4 is a perspective illustration of a portion of a cabin of an aircraft, showing one position for the passenger IO node that is contemplated to cooperate with the crew node of the present invention.

FIG. 4 provides a perspective illustration of a portion of an interior of the cabin 48 of an aircraft 36 that incorporates the passenger IO node 20. The passenger IO node is illustrated as a mobile computing device, such as a touch-sensitive tablet 130. Also provided in FIG. 4 is a second contemplated embodiment of the passenger IO node 20, which is a retractable knob 132 that is disposed in the side ledge 98. The retractable knob 132 is contemplated to provide at least some of (if not all of) the functionality of the tablet 130. The details of the retractable knob 132 are not the focus of the present invention and, therefore, specific details concerning the retractable knob 132 are not provided herein.

In this illustrated embodiment, the passenger IO node 20 is disposed on a retractable stand 134 that extends from the side ledge 98 adjacent to the passenger seat 74. The passenger IO node 20 is removably disposed in the stand 134. In other words, the passenger IO node 20, as embodied in the tablet 132, is not integrally connected to the stand 134. A table 76 also is illustrated in this view, to provide context for the present invention.

As should be apparent, the stand 134 need not extend from the side ledge 98. It is contemplated that the stand 134 may extend from one of the arm rests on the passenger seat 74. Alternatively, the stand 134 may extend from the table 76. As should be apparent to those skilled in the art, the exact location where the stand 134 is positioned is not critical to the present invention.

As noted above, functions associated with passenger comfort fall into two general categories: (1) media functions and (2) cabin-related environmental functions. As such, the passenger IO node 20 is contemplated to provide an interface to the user that includes these two groups of functions.

Figure 5:
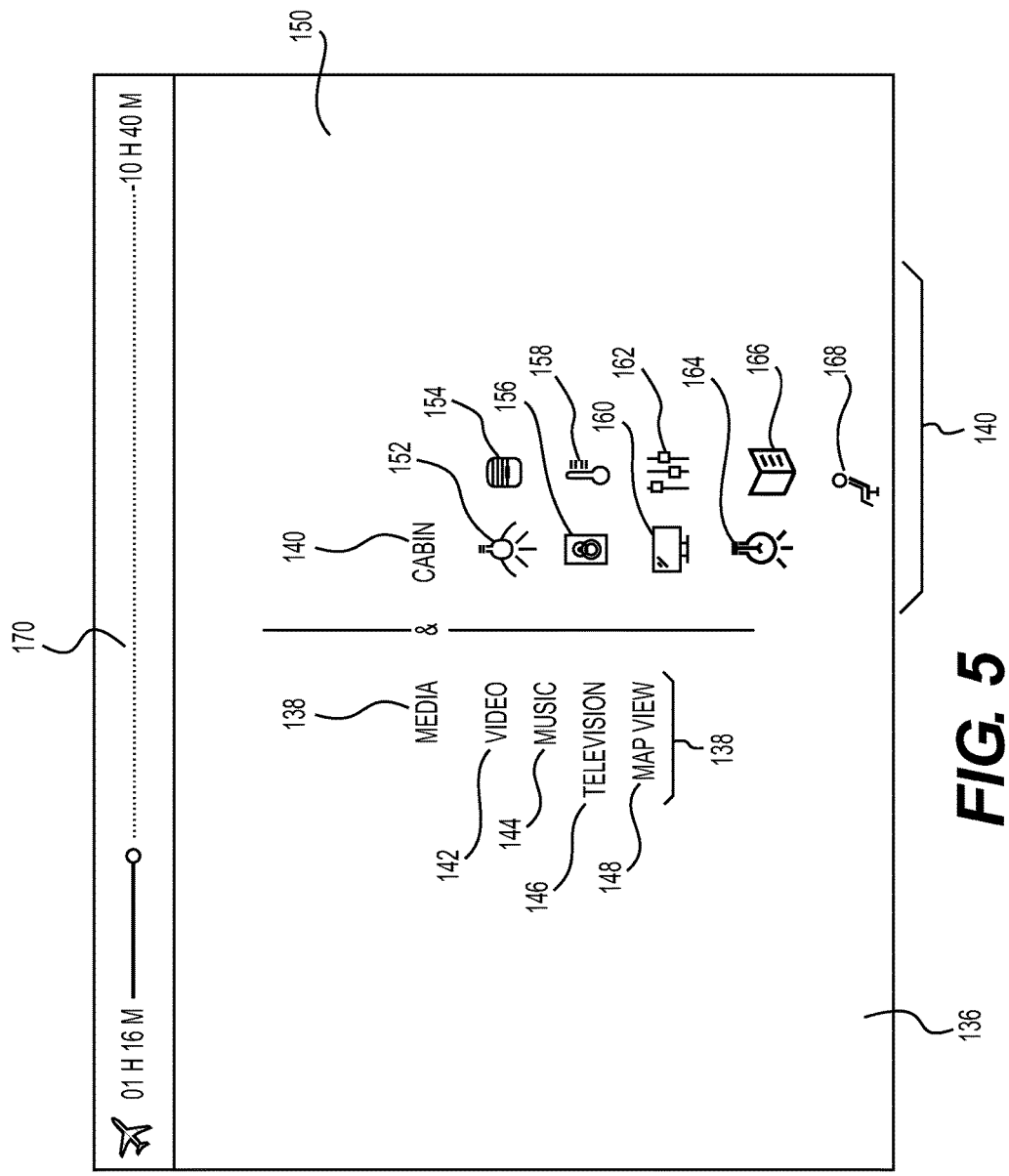
FIG. 5 depicts one contemplated embodiment of a main menu displayable on the crew IO node of the present invention and also on the passenger IO node that cooperates with the crew IO node.

FIG. 5 depicts one contemplated embodiment of a main menu 136 that is contemplated to be displayed, as a root menu, on the crew IO node 22. The main menu 136 includes a media submenu 138 and a cabin submenu 140. Submenu icons and words (both of which are referred to as "icons" herein whether they are words or pictograms) are selectable via the touch interface on the tablet 130.

For purposes of the discussion of the present invention, it is noted that the designation "tablet 130" may refer to either the passenger IO node 20 or the crew IO node 22. Both IO nodes 20, 22 may be embodied in a tablet. For this reason, the designation "tablet 130" is applied to both nodes 20, 22. It is noted, as discussed in greater detail below, that the crew IO node 22 includes control over functionality that may not be accessed or controlled by a passenger.

In the illustrated embodiment, the media submenu 138 includes four options: (1) a video icon 142, (2) a music icon 144, (3) a television icon 146, and (4) a map view icon 148. Each of these separate options is accessible by touching the surface 150 of the crew IO node 22. As should be apparent, the icons 142-148 that are available via the media submenu 138 are merely representative of the types of media that may be accessible by that menu.

The cabin submenu 136 includes nine options: (1) a cabin lighting icon 152, (2) a window shade icon 150, (3) an audio icon 152, (4) a thermostat icon 154, (5) a video icon 156, (6) a presets icon 158, a table light icon 164, (8) a reading light icon 166, and (9) a seat icon 168. Each of these separate options also is available by touching the surface 150 of the crew IO node 22. As with the media submenu 138, the icons 152-168 that are included in the cabin submenu 140 are intended to be exemplary of the types of icons that may be available through the cabin submenu 140.

As should be apparent, the media submenu 138 and the cabin submenu 140 do not present mutually exclusive functionalities. Some functions with the cabin 48 of the aircraft 36 may be accessed from either submenu 138, 140. In other words, the menu trees for both submenus 138, 140 are contemplated to be interrelated and redundant.

The main menu 136 also includes a flight status bar 170, which extends along a top edge of the main menu 136. The flight status bar 170 provides a visual indication of the total duration of the flight, time elapsed since take off, and time remaining until landing. As should be apparent, the flight status bar 170 may provide additional information that may be of interest to the passenger.

The four icons in the media submenu 138 provide access to the four types of entertainment that are available to the passenger on board the aircraft 36.

The video icon 142 provides access to a listing of the video entertainment available to the passenger on board the aircraft 36 as well as other functionality, as discussed below.

The audio icon 144 provides access to a listing of the audio (i.e., music) entertainment available to the passenger on board the aircraft 36. Other functionality also may be made available via the audio icon 144, as discussed herein.

The television icon 146 provides access to a listing of the television programming that may be available to the passengers. Television programming is contemplated to encompass pre-recorded content. However, it is contemplated that television programming also may include real-time television programming for aircraft 36 that are equipped to receive television programming during flight.

In one contemplated embodiment, the map view icon 148 is contemplated to provide a view of the geographic position of the aircraft 36. As such, the crew and/or passenger may identify where the aircraft 36 is in its flight plan. The map view icon 148 also is contemplated to permit access to local geographic maps so that the crew and/or passenger may locate geographic points of interest, for example, at the destination location.

The cabin lighting icon 152 is intended to provide access to control over the main lighting in the cabin 48 of the aircraft 36. The main lighting in the cabin 48 is the overhead lighting and is the lighting in the general passenger area of the aircraft 36. The main cabin lighting in the aircraft 36 is distinguishable from other lighting that may be provided, such as a personal reading light, positioned over the passenger's seat 74 or a table reading light positioned over a table 76, 80 within the aircraft 36.

The window shade icon 154 provides control over one or more of the window shades that cover the windows 94 in the aircraft 36. The window shade icon 154 provides control over the degree to which the window shades in the aircraft 36 are opened or closed.

With respect to the window shades, it is noted that the window shades may be of any particular type without departing from the scope of the present invention. For example, the window shades may be made from a sheet of material that moves (via a motor, for example) in front of the window to block the transmission of light therethrough. Alternatively, the window shades may be made from an electrochromic material. Electrochromic materials respond to signals by altering their color and/or opacity.

The audio icon 156 is similar to the audio icon 144, by providing access to the audio menu, as discussed further herein.

The thermostat icon 158 provides access to a menu that permits the crew and/or passenger to control the temperature within the cabin 48 of the aircraft 36.

The video icon 160 is similar to the video icon 142. This icon also provides access to the functionality of the video menu, as discussed further herein.

The presets icon 162 provides access to predetermined settings related to the cabin 48 of the aircraft 36. By accessing the presents icon 162, the crew and/or passenger may select from several preset environments within the aircraft to facilitate activities such as sleep, meetings, or entertainment viewing, as discussed below.

The table light icon 166 provides control over a light that may be positioned above a stowable table 76 or a conference table 80, as may be provided in the cabin 48 of the aircraft 36.

The reading light icon 164 provides access to control over one or more reading lights above the passenger seats 74 in the cabin 48.

The seat icon 168 provides control over the comfort position of one or more of the seats 74 in the aircraft 36. Via the seat icon 168, the user may adjust the seat 74 between fully upright and fully reclined positions. The term "user" is used herein to refer to any person that has access to the functionality provided by the present invention on board an aircraft 36.

Figure 6:
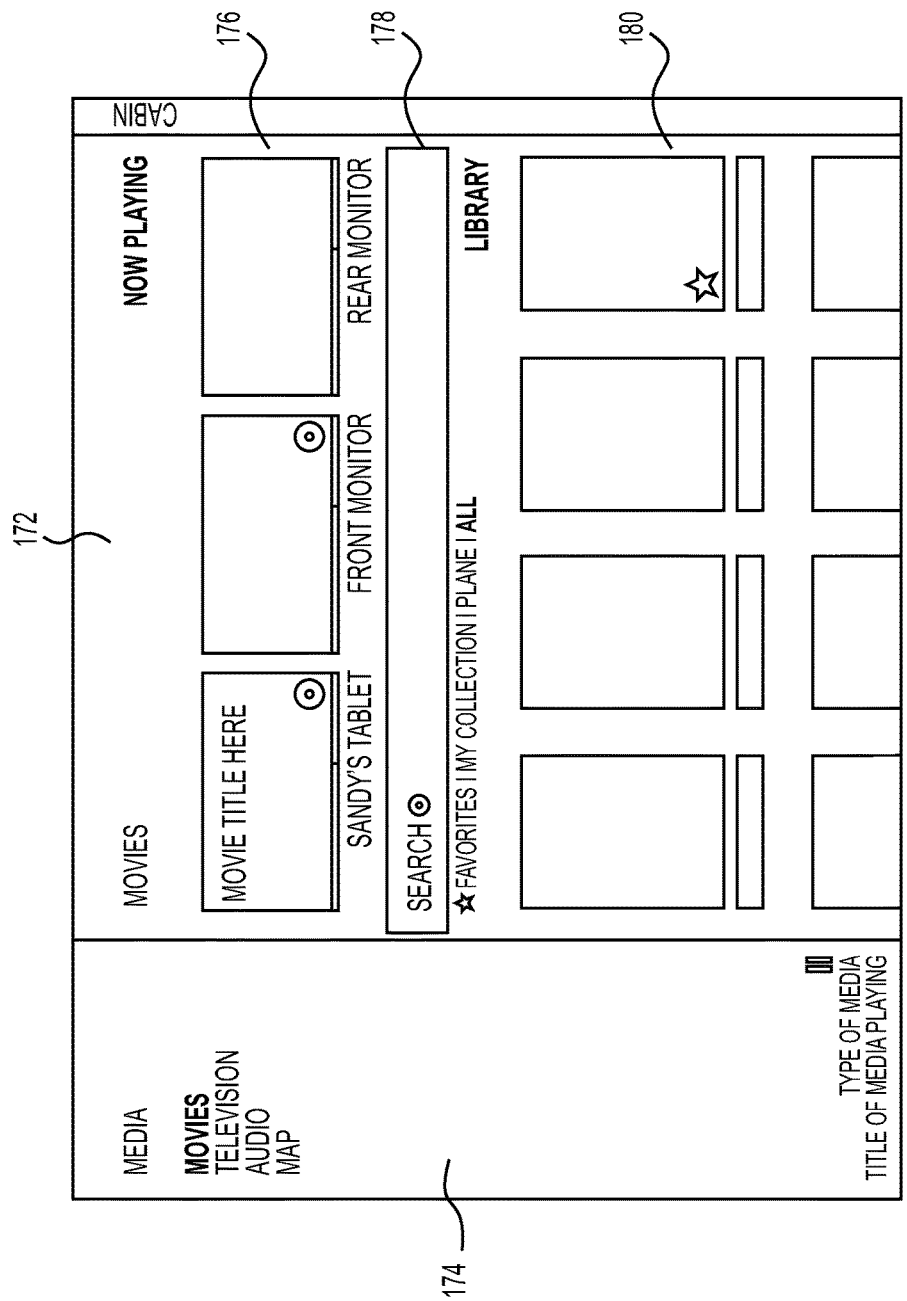
FIG. 6 illustrates features of a video submenu displayable on the crew IO node of the present invention and the passenger IO node that cooperates therewith.

FIG. 6 illustrates one contemplated embodiment of a video submenu 172 according to the present invention. If the user accesses the video icon 142 on the main menu 136, the user will be directed to the video submenu 172. In this illustration, the video submenu 172 encompasses movies that are available to the user. However, the video submenu 172 should not be understood to be limited solely to movie content.

The video submenu 172 includes at least four separate regions, each of which provides access to different, related functionality.

As shown, the video submenu 172 includes a media bar 174 that provides access to the different types of media that are available to the user. Since the user originally selected the video icon 142, the video submenu 172 defaults to the video programming available to the user. The media bar 174 permits the user to change to a different media selection without having to return to the main menu 136.

The video submenu also includes an available devices section 176, a search bar section 178, and a library section 180.

The available devices section 176 provides a listing of the various video devices (i.e., the monitors 96) that are accessible on the aircraft. By selecting one or more of the icons associated with the available video devices 96, the user may select which of the monitors 96 will display the selected video content. For example, the user may elect to have a selected movie played on a nearby monitor 96 as well as a remote monitor in one of the bedrooms 64, 66. In this manner, the user may watch a movie from the user's seat 74 while his or her children watch the same movie in their bedroom 64, for example.

The search bar section 178 is provided so that the user may input search words to locate specific video media within the library on board the aircraft 36.

The library section 180 provides a listing of all of the video content that is available to the user.

Figure 7:
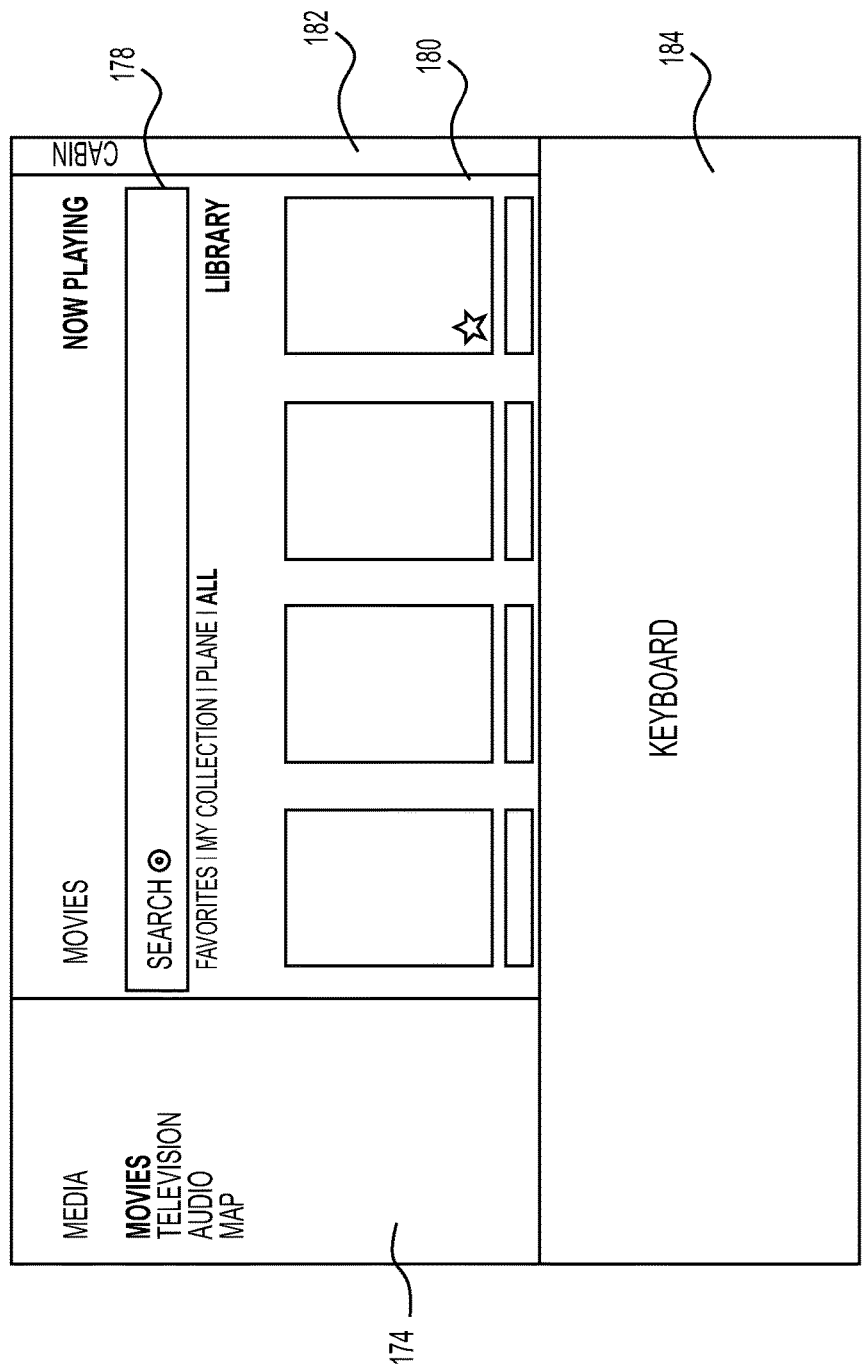
FIG. 7 is a search GUI accessible from the video submenu that is displayable on the crew IO node of the present invention and also the passenger IO node.

FIG. 7 illustrates a search GUI 182 that may appear if the user wishes to access the search bar section 178. The search GUI 182 displays a touch-sensitive keyboard 184 so that the user may input key words for initiation of a search of the video library, a portion of which may remain visible in the library section 180.

Figure 8:
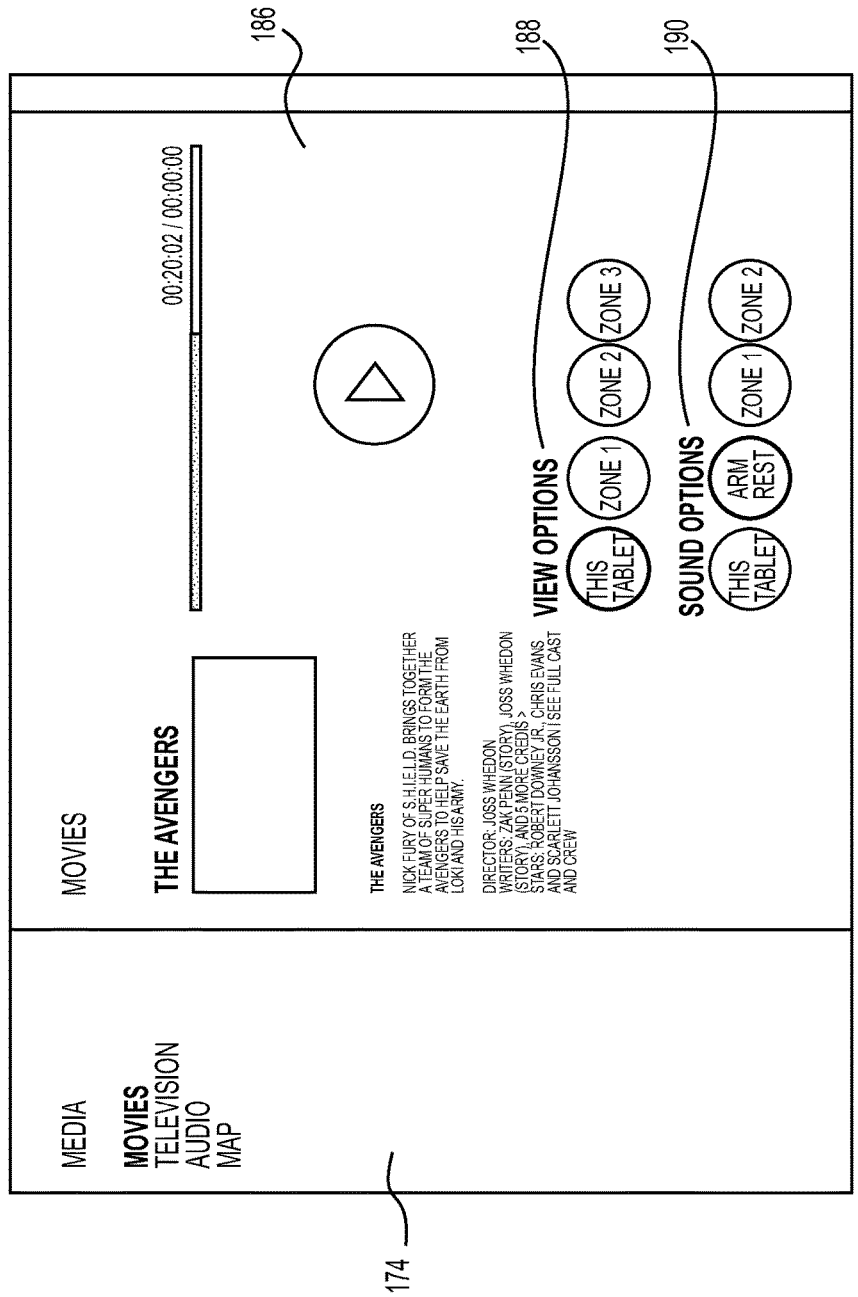
FIG. 8 is a viewing options GUI that presents control options for the viewing of video programming, the viewing options GUI being displayable on the crew IO node of the present invention and the passenger IO node intended to cooperate therewith.

FIG. 8 is a viewing options GUI 186 that may be presented to the user after specific video content has been selected for viewing. The viewing options GUI 186 includes a viewing area submenu 188 and a sound options submenu 190. The viewing area submenu 188 allows the user to select one or more devices (i.e., one or more tablets 130 and/or one or more monitors 96) where the selected video is to be shown. As suggested by the viewing area submenu 188, the cabin 48 of the aircraft 36 may be separated into various zones, consistent with the seating areas 58, 60, 62 and the bedrooms 64, 66. As a result, the user may control the video being displayed in one or more zones within the aircraft 36. The sound options submenu 190 permits the audio portion of the video content to be played via headphone on the armrest of the seat 74 or via speakers on the tablet 132 or speakers within the cabin 48 of the aircraft 36. As indicated, the user may control the sound that is played in one or more zones within the cabin 48 of the aircraft 36.

Figure 9:
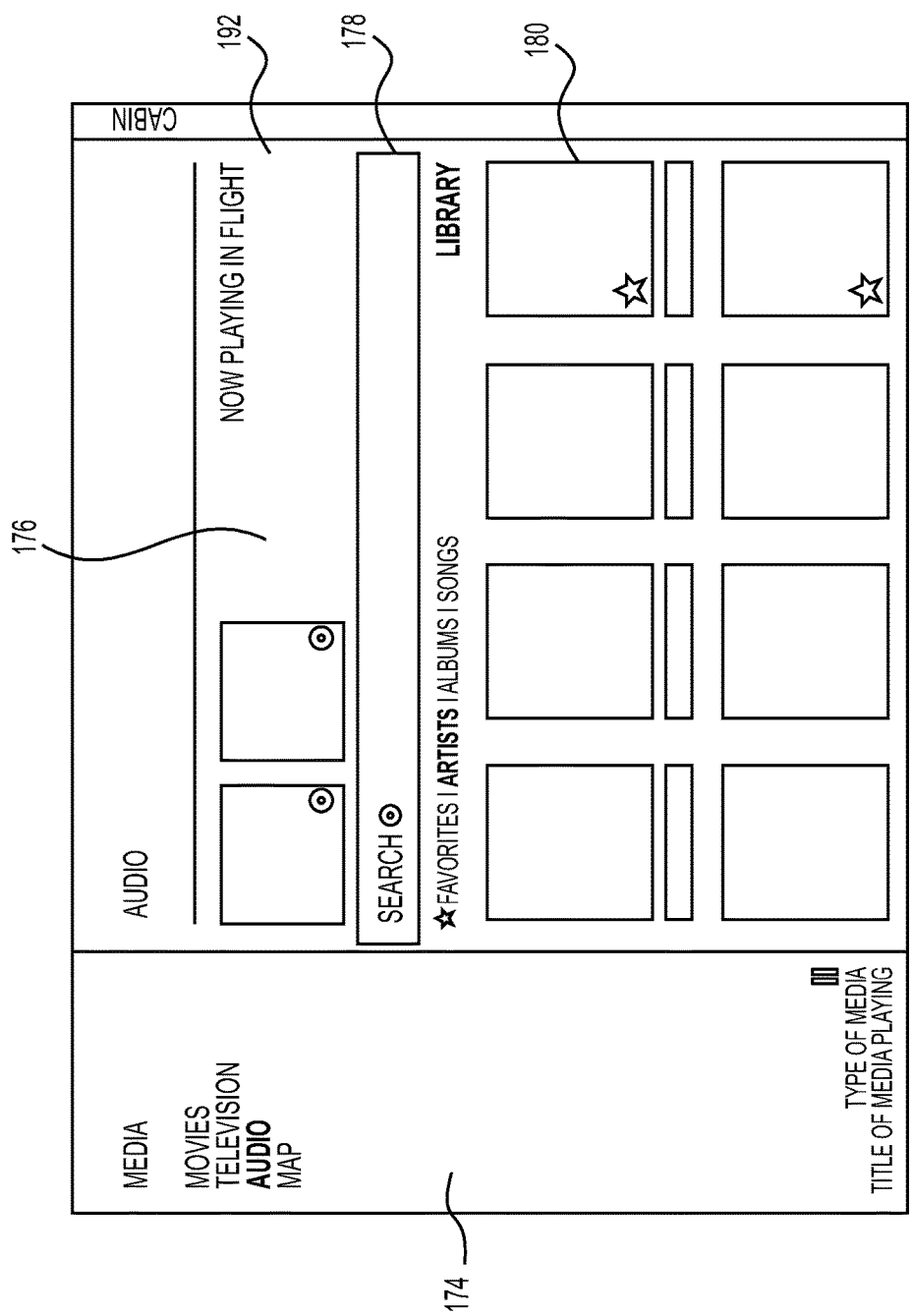
FIG. 9 is one contemplated embodiment of an audio submenu that is displayable on the crew IO node of the present invention and also on the passenger IO node.

FIG. 9 illustrates one contemplated embodiment of an audio submenu 192. The audio submenu is patterned similarly to the video submenu 172. The same options are accessible via the audio submenu 192.

If the user accesses the audio icon 144 on the main menu 136, the user will be directed to the audio submenu 192. In this illustration, the audio submenu 192 encompasses audio programs that are available to the user. However, the audio submenu 192 should not be understood to be limited solely to music content.

The audio submenu 192 includes at least four separate regions, each of which provides access to different, related functionality.

As shown, the audio submenu 192 includes the media bar 174 that provides access to the different types of media that are available to the user. Since the user originally selected the audio icon 144, the audio submenu 192 defaults to the audio programming available to the user. The media bar 174 permits the user to change to a different media selection without having to return to the main menu 136.

The audio submenu 192 also includes an available devices section 176, a search bar section 178, and a library section 180.

Submenus of the audio submenu 192 are contemplated to operate in the same manner as the viewing options GUI 186, discussed above. Specifically, audio programming may be played on one or more devices or within one or more zones in the aircraft 36. Accordingly, further discussion of this functionality is not repeated here.

Figure 10:
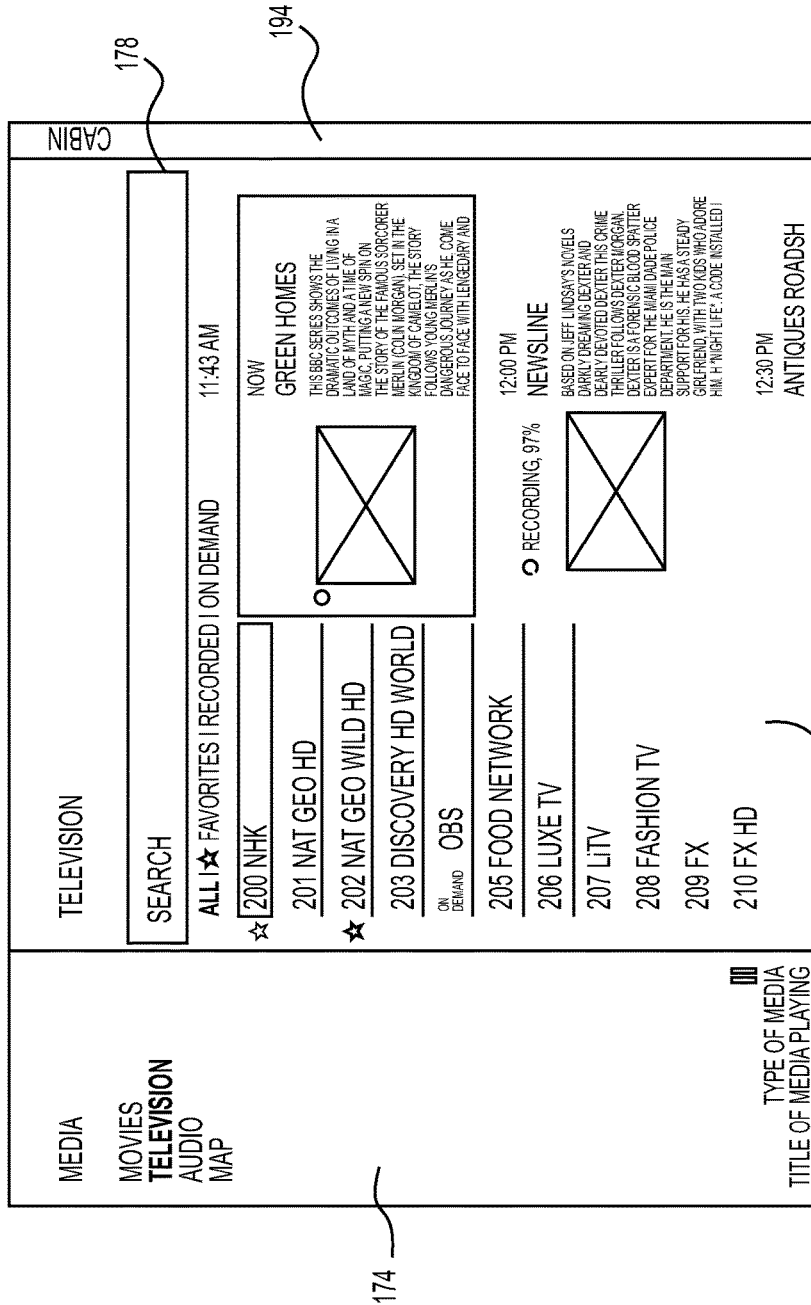
FIG. 10 depicts one possible television submenu that is displayable on the crew IO node of the present invention and also on the passenger IO node.

FIG. 10 illustrates one contemplated embodiment of a television submenu 194. The television submenu 194 is contemplated to provide a slightly different appearance than the video submenu 172 and the audio submenu 192. In the television submenu 194, a channel listing 196 is provided. The channel listing provides a list of the different television channels that are accessible to the user. The television submenu 194, therefore, provides access to currently available (or real time) television channels.

If real time television stations are not available, the television submenu 194 is contemplated to default to a pre-recorded television shows library. In such a case, the television submenu 194 is contemplated to operate in the same manner as the video submenu 172 or the audio submenu 192.

Submenus of the television submenu 194 are contemplated to operate in the same manner as the viewing options GUI 186, discussed above. Specifically, television programming may be played on one or more devices or within one or more zones in the aircraft 36. Accordingly, further discussion of this functionality is not repeated here.

Figure 11:
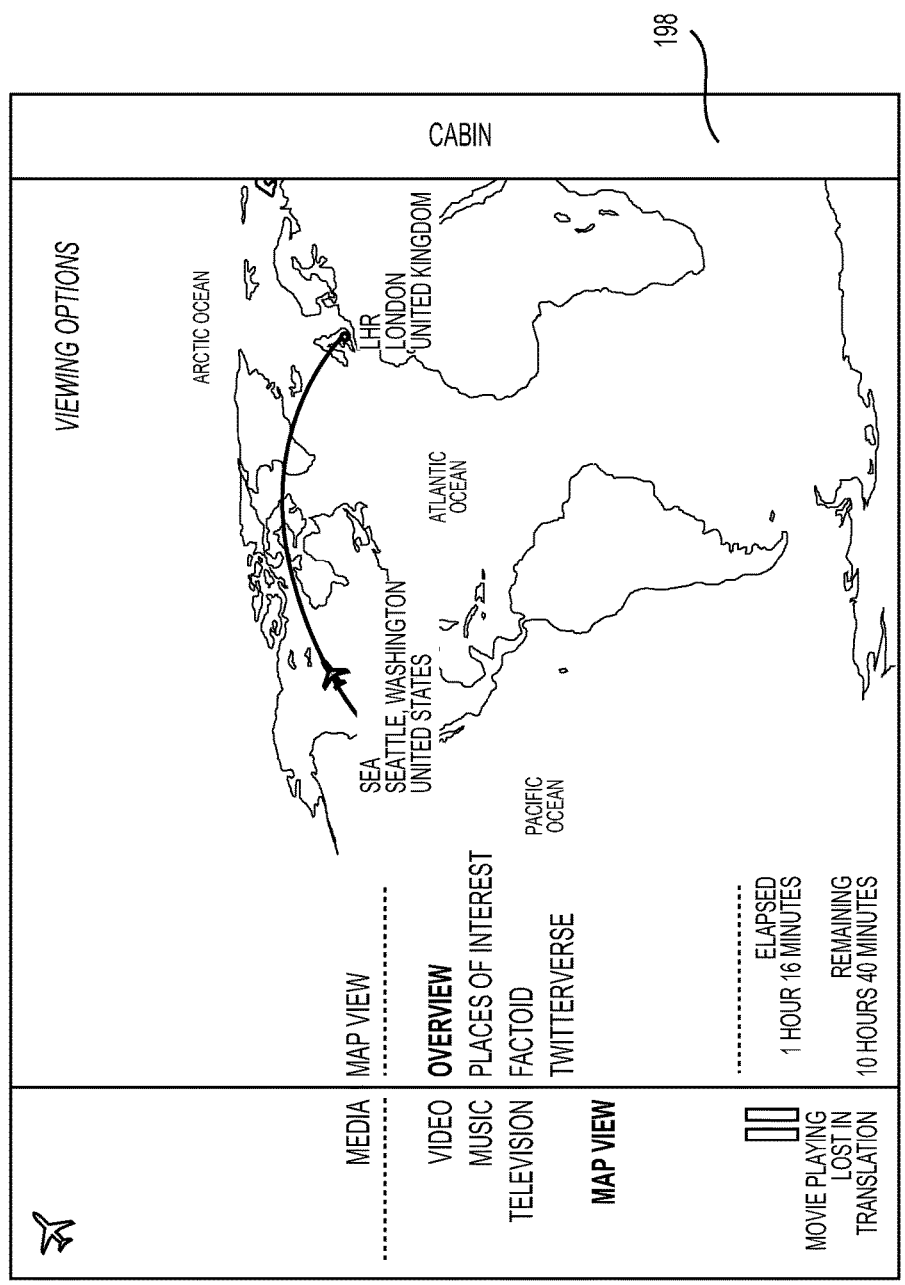
FIG. 11 provides one contemplated map view GUI that is displayable on the crew IO node of the present invention and also on the passenger IO node that cooperates with the crew IO node.

FIG. 11 depicts one embodiment of a map view GUI 198 according to the present invention. A map of the world and the location of the aircraft 36 are provided to the passenger.

Figure 12:
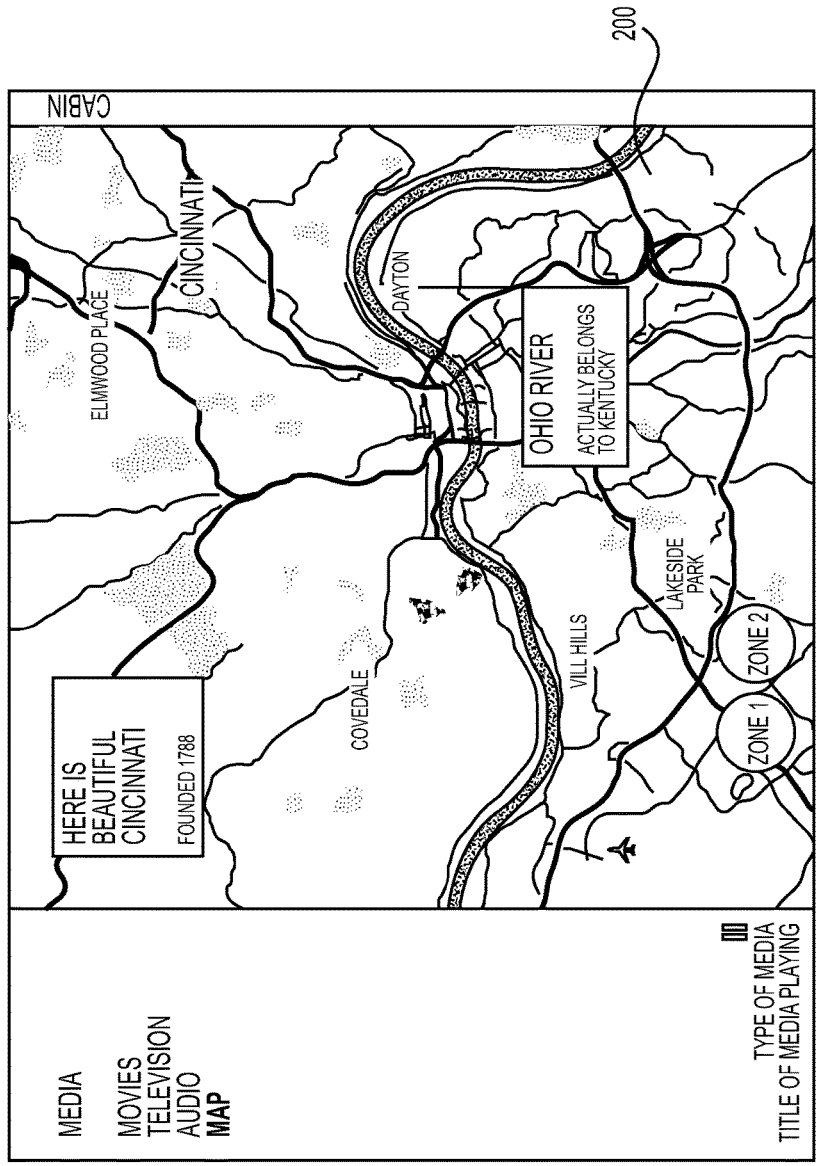
FIG. 12 illustrates a local map GUI contemplated to be displayable on the crew IO node of the present invention and on the passenger IO node that interfaces with the crew IO node.

FIG. 12 depicts a local map GUI 200. The local map GUI 200 is contemplated to provide interactive access to any selected geographic location, such as the destination of the aircraft 36. It is contemplated that the local map GUI 200 will include a search bar that permits the user to look for desired landmarks, restaurants, shops, etc.

Figure 13:
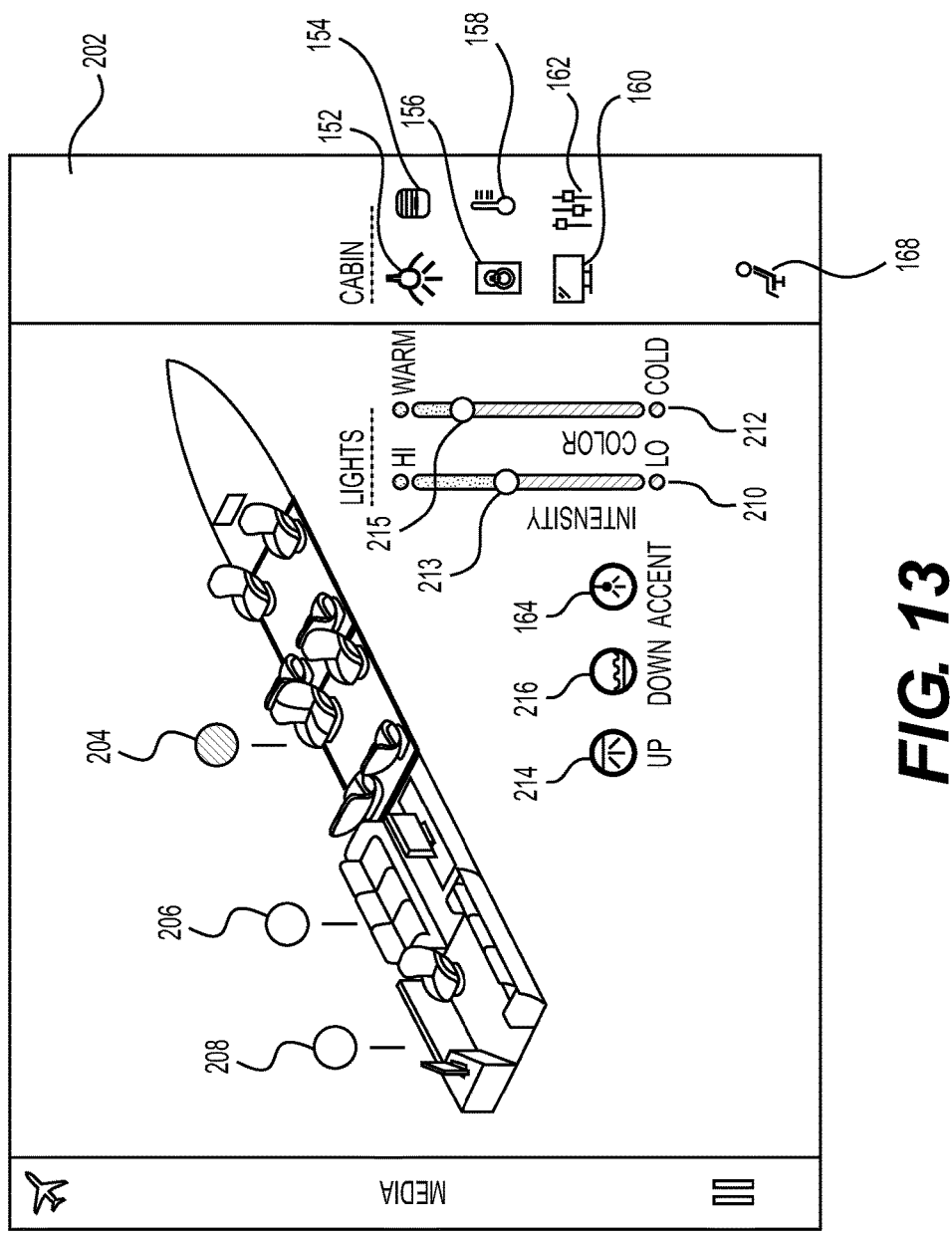
FIG. 13 depicts an embodiment of a cabin light GUI that may be displayed on the crew IO node of the present invention and also on the passenger IO node that works together with the crew IO node.

FIG. 13 illustrates one embodiment of a cabin lights GUI 202 contemplated for use as a part of the present invention. The cabin lights GUI 202 includes zone designators 204, 206, 208. By selecting and highlighting one or more of the zone designators 204, 206, 208, the user is able to control the cabin lighting in the selected zones within the aircraft 36.

Two controls over the cabin lighting are provided via the cabin lights GUI 202. The user is provided with control over the intensity (or brightness) of the cabin lights via the intensity control menu 210. Cabin light intensity is contemplated to be controllable from a minimum of 0 lumens to a predetermined maximum. The user also may be provided with control over the color of the cabin lights via a color control menu 212. Color refers to the "warmness" of the light, as should be apparent to those skilled in the art. Warmer light includes more yellow light elements. Cool light includes a bluer appearance. It is contemplated that the user may be provided control over the coolness or warmness of the light, as indicated by the color control menu 212. Both the intensity control menu 210 and the color control menu 212 are contemplated to be presented as slider bars, with slider elements 214, 216, that assist the passenger to appreciate where the controls are in relation to the extremes.

The cabin lights GUI 202 also includes a window shades up icon 214 and a window shades down icon 216. These icons provide control over the degree of openness of one or more of the window shades in the cabin 48. The table light icon 164 also is provided to the user. As should be apparent, other controls for other lighting also may be provided on the cabin lights GUI 202. Control over any lights in the cabin 48 is contemplated to include control over the intensity of the light and the warmness or coolness of the light. With respect to the warmness (i.e., the yellow or amber content) or coolness (i.e., the blue content) of the light, it is contemplated that the user will adjust the color of the light between two standard colors for the light. As should be apparent, the colors may be set according to standards for lighting or they may be selected by the aircraft owner or user, as appropriate.

In an alternate embodiment, it is contemplated that the user may be provided with even greater control over the color of the lights in the aircraft 36. It is contemplated, for example, that the user may be able to control the red, green, and blue ("RGB") values for the lights in the cabin 48. If so, RGB controllers are anticipated to be displayed on the tablet 130. As should be apparent, for control over the color of the lights, it is contemplated that the lights will be light emitting diodes ("LEDs"), where control over the saturation of the RGB values for the LEDs is permissible. As should be apparent, other light sources may be employed without departing from the scope of the present invention.

Figure 14:
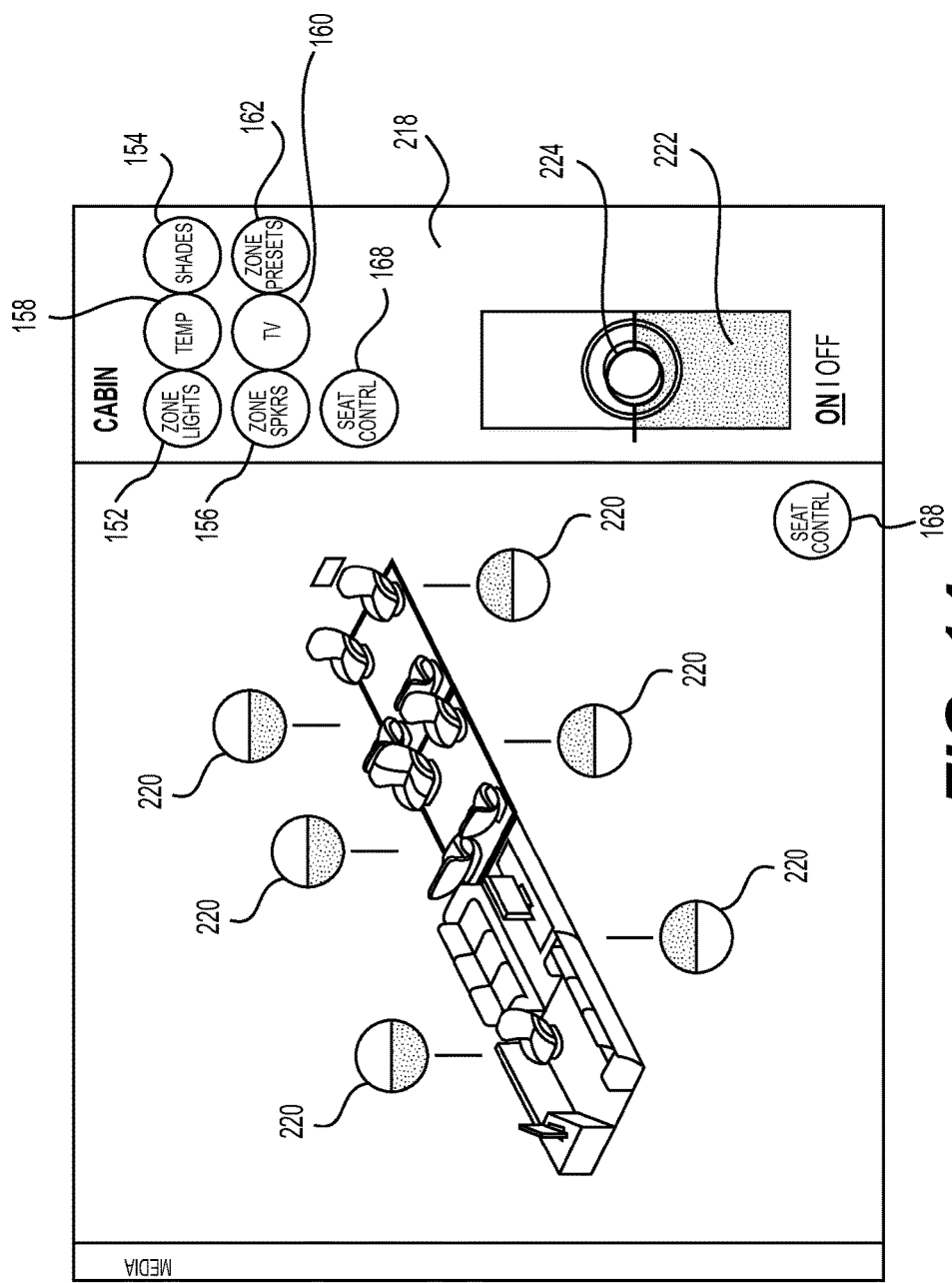
FIG. 14 depicts one contemplated embodiment of a window shades GUI that may be displayed on the crew IO node of the present invention and also on the passenger IO node.

FIG. 14 illustrates one embodiment of a window shades GUI 218 contemplated for use as a part of the present invention. The window shades GUI 218 includes window designators 220. By selecting and highlighting one or more of the window designators 220, the user is able to control the window shade in the selected window 94 within the aircraft 36. In a further contemplated embodiment, the user may be provided with control over the window shades in selected zones in the aircraft 36.

Control over the degree of openness of the window shades is contemplated to be provided via a control bar 222 with a slider 224. The slider 224 is contemplated to provide control over the window shades from a fully closed to a full opened condition.

Figure 15:
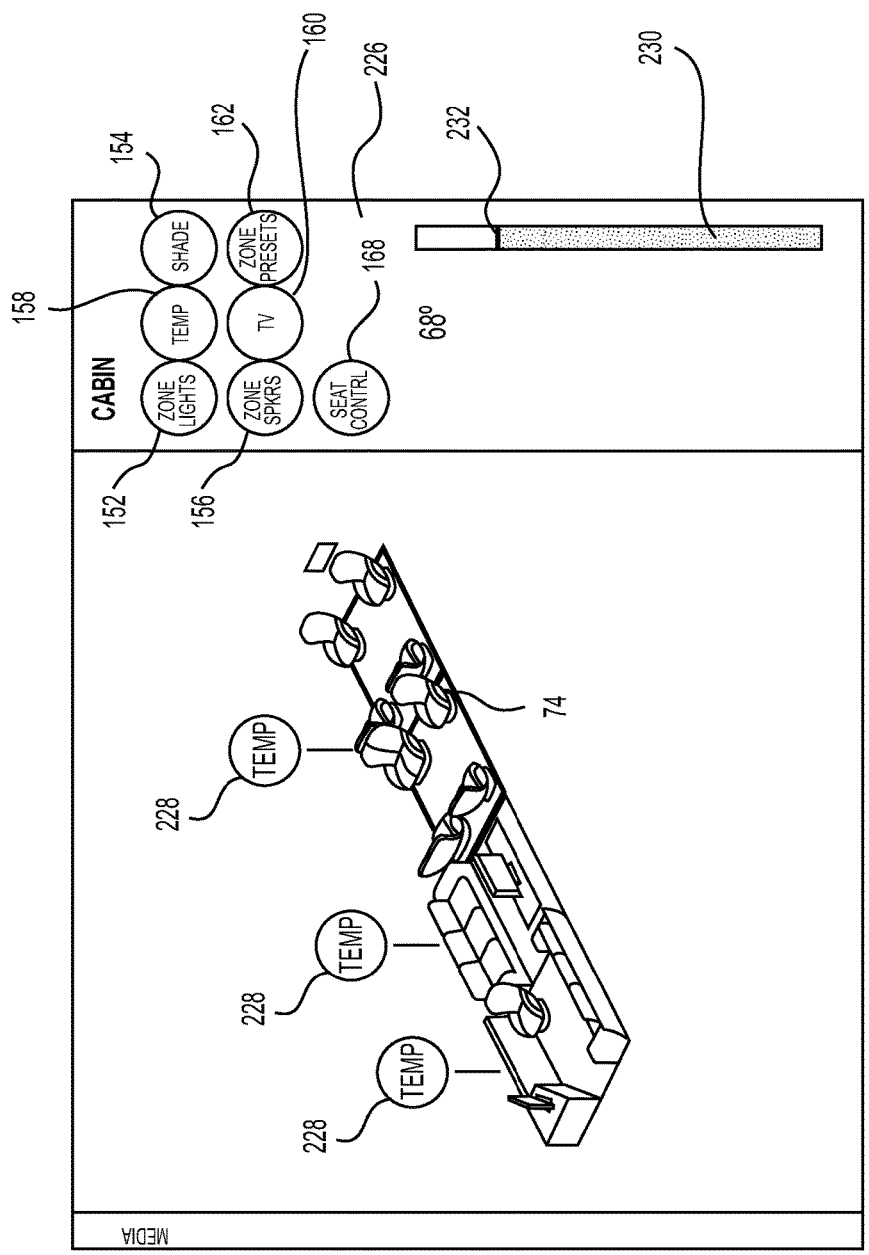
FIG. 15 provides a thermostat GUI contemplated for use with the crew IO node of the present invention and also with the passenger IO node that cooperates with the crew IO node.

FIG. 15 illustrates one contemplated embodiment of a thermostat GUI 226. The thermostat GUI 226 includes zone indicators 228 so that the user may select one or more zones for which the temperature in the aircraft 36 is to be adjusted. The temperature is contemplated to be changed using a temperature control bar 230 with a slider 232. The temperature is contemplated to be controllable within 5-10° C. of the standard ambient of 25° C. Of course, a greater or lesser control may be provided as required or as desired.

Figure 16:
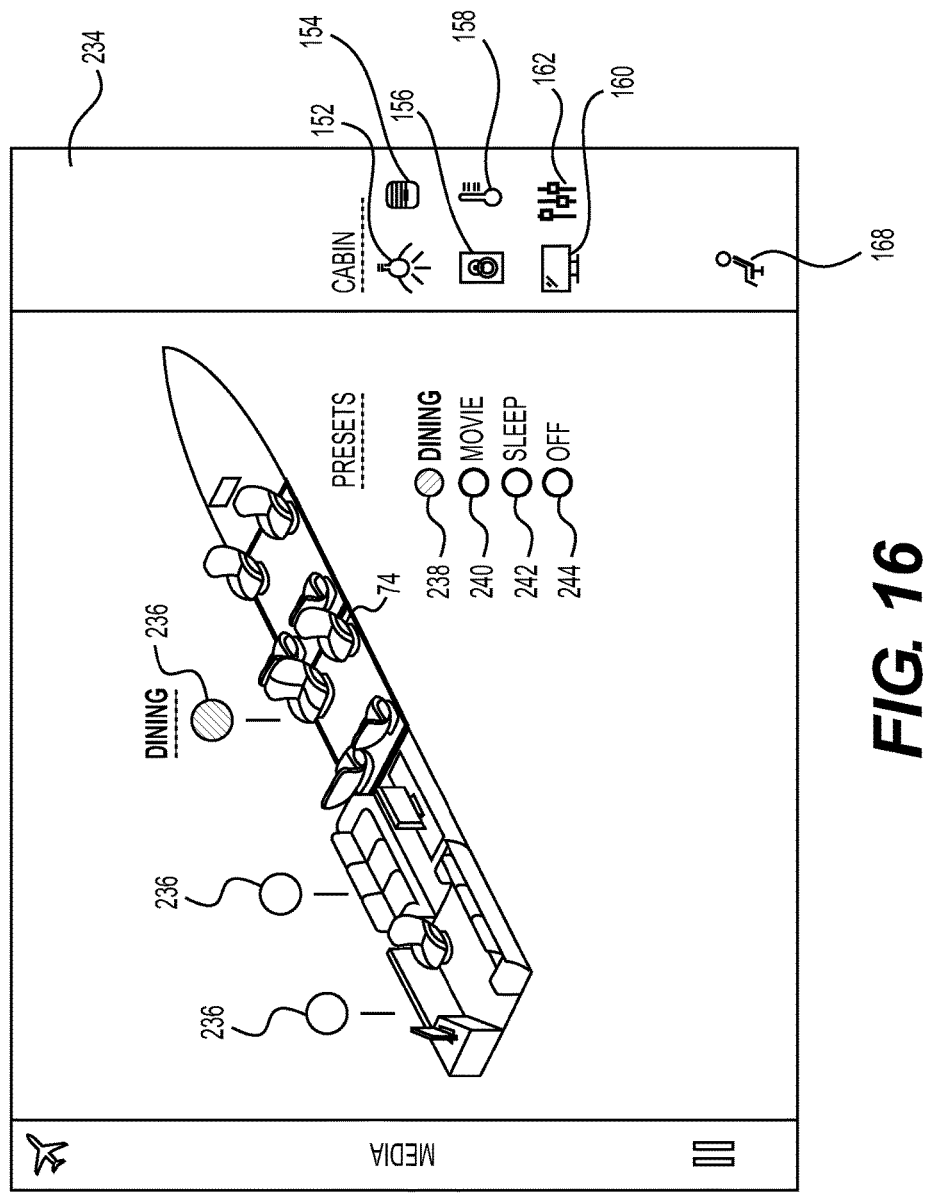
FIG. 16 illustrates a presets GUI that is contemplated for use with the crew IO node of the present invention and also for use with the passenger IO node.

FIG. 16 depicts one contemplated embodiment of a presets GUI 234. The presets GUI 234 includes zone indicators 236, as in previous embodiments. Each zone may be controlled according to a predetermined list of environmental conditions (i.e., presets). In the illustrated example, there are three presets: (1) a dining preset 238, (2) a movie preset 240, and (3) a sleep preset 242. An off switch 244 also is provided to disable one or more of the selected presets. Each preset is contemplated to have a lighting intensity, color, etc. associated therewith, where the presets are conducive to the activity listed, such as "dining." In addition, the presets are contemplated to provide the most comfortable environment for the selected activity by adjusting parameters within the cabin 48 to meet preselected criteria.

Figure 17:
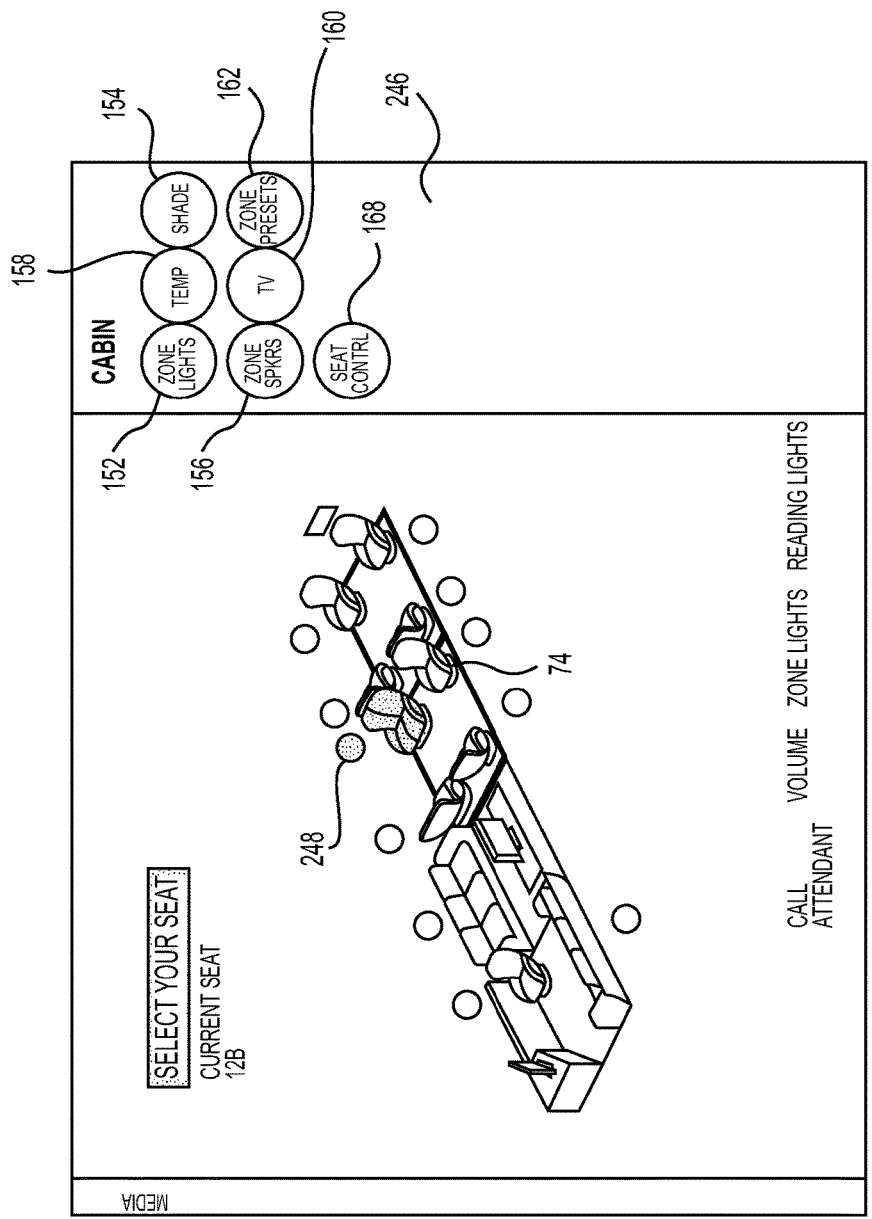
FIG. 17 depicts a seat selector GUI that is contemplated to be displayed on the crew IO node of the present invention and also on the passenger IO node that is contemplated to cooperate with the crew IO node of the present invention.

FIG. 17 provides a seat selector GUI 246, which permits the user to identify his or her seat 74 via the seat indicator 248. Any environmental selections that are made by the user are then applied to the selected seat 74. Alternatively, it is contemplated that the user may be provided control over the environmental and comfort conditions of other seats 74. For example, a parent may wish to adjust comfort parameters for a child or a flight crew member may wish to adjust conditions for a passenger based on a verbal request.

Figure 18:
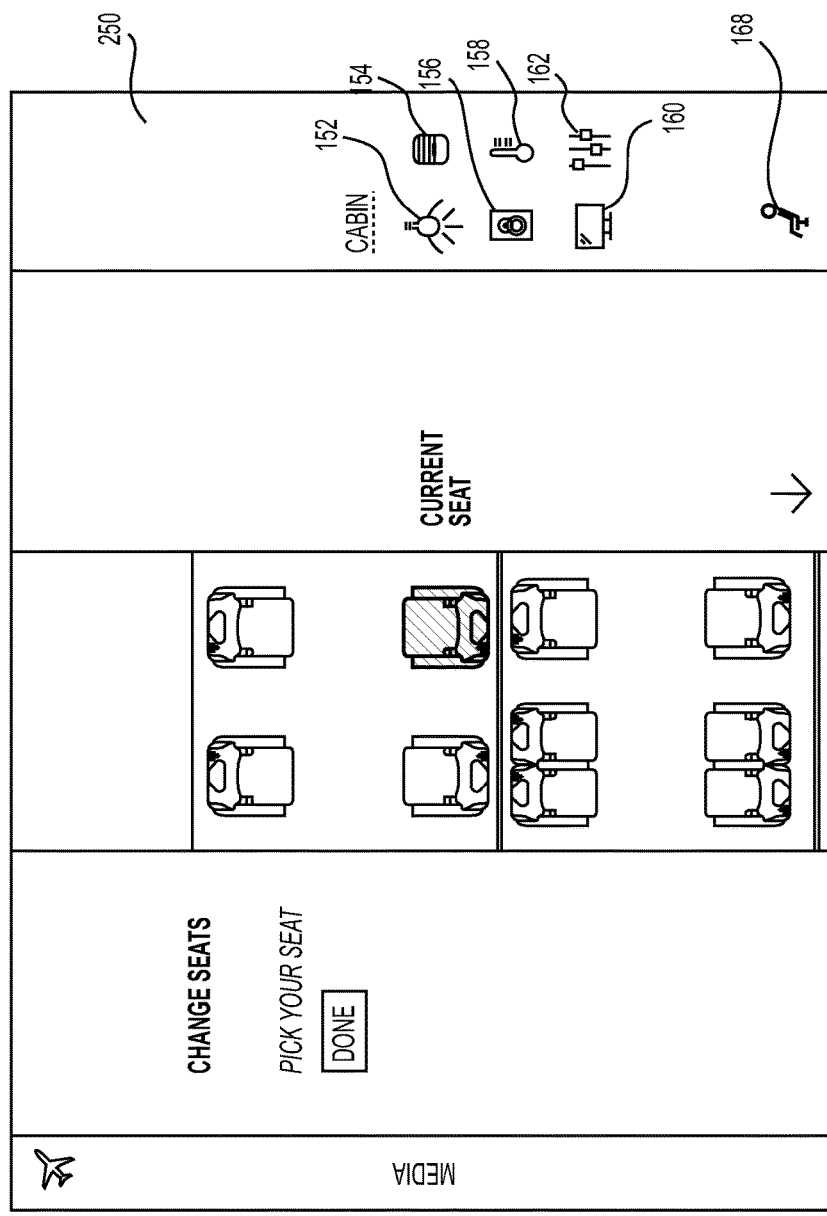
FIG. 18 illustrates a change seat GUI that is contemplated for use with the crew IO node of the present invention and also with the passenger IO node contemplated to cooperate with the crew IO node.

FIG. 18 illustrates a change seat GUI 250. The change seat GUI 250 permits the passenger to move from an initial seat 74 to a new seat 74. Any selected comfort variables that the passenger selected may then be applied to the passenger's new seat.

As noted above, the crew IO node 22 is contemplated to include all of the functionality discussed in connection with the passenger IO node 20. In addition, the crew IO node 22 is contemplated to include functionality that is specific to members of the flight crew and the operation of the aircraft 36.

In the paragraphs that follow, the additional functionality of the crew IO node 22 is discussed. As noted above, the crew IO node 22 also is contemplated to be embodied in a tablet 130.

Figure 19:
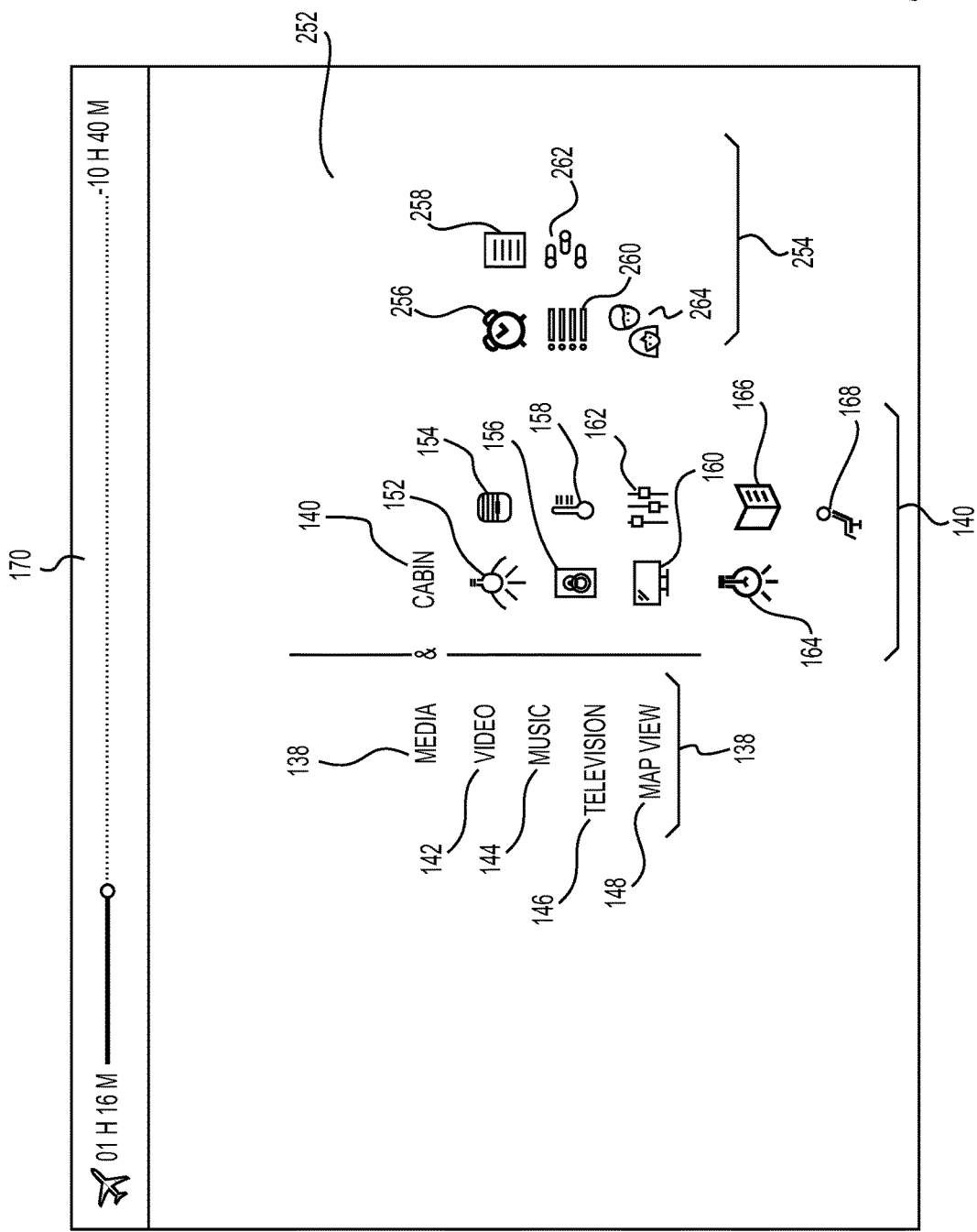
FIG. 19 illustrates one contemplated menu for display on the crew IO node of the present invention.

FIG. 19 illustrates a crew main menu 252, which is contemplated to be similar to the main menu 136 described in connection with FIG. 5. The crew main menu 252, however, includes five additional icons, grouped in a crew cabin submenu 254, that provide access to additional functionality available via the crew IO node 22. The five additional icons include: (1) a scheduling icon 256, (2) a notes icon 258, (3) a report icon 260, (4) a control panel icon 262, (5) and a passenger roster icon 264. Each of these icons, when accessed, takes the user to GUIs that provide specific functionality, as discussed in greater detail below.

It is noted that the crew main menu 252 need not be provided with the crew cabin submenu 254. Functionality associated with the icons 256-264 that are in the crew cabin submenu 254 may be provided via a separate menu that is available only to the crew via the crew IO node 22.

Figure 20:
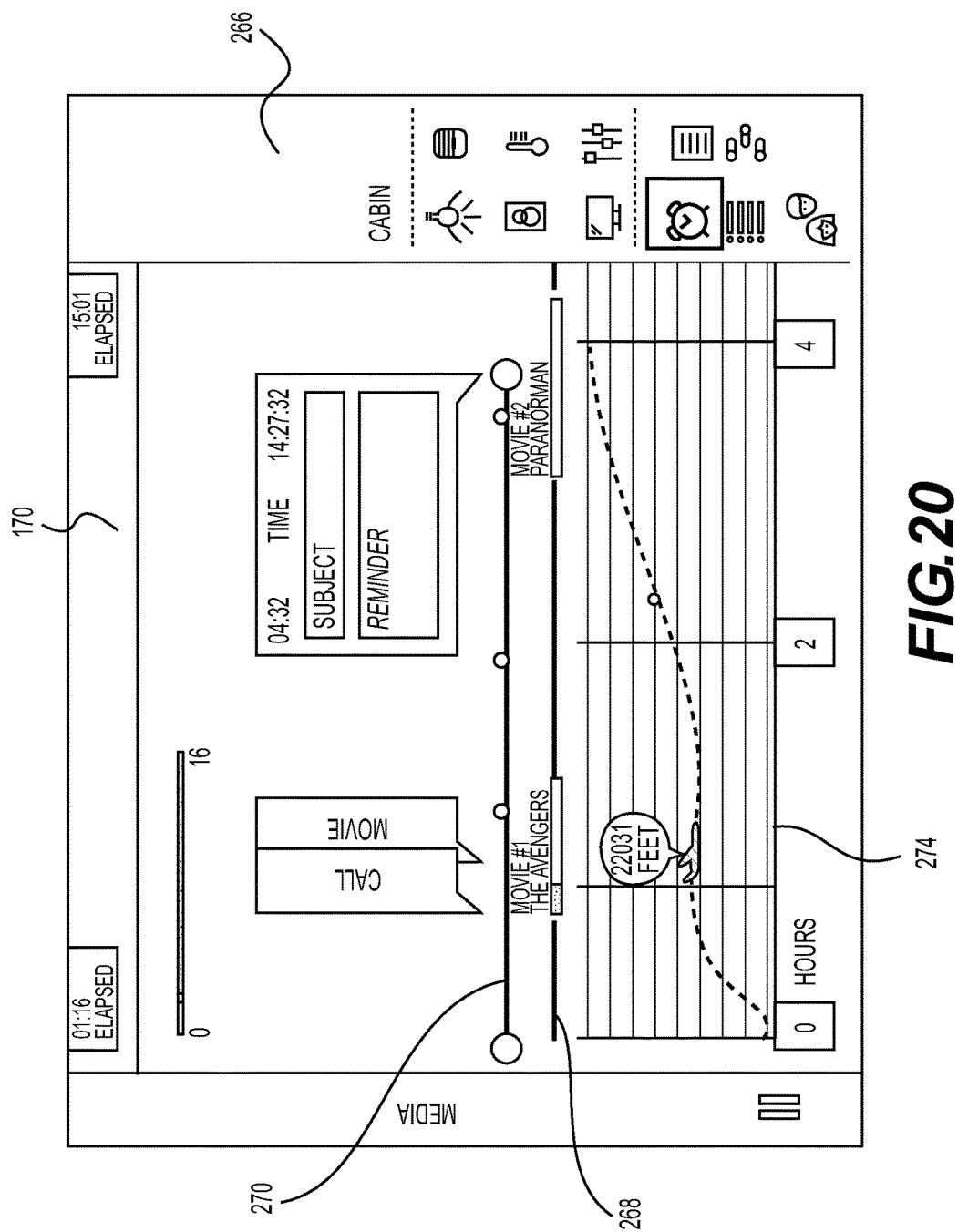
FIG. 20 illustrates one contemplated embodiment of a scheduling GUI displayable on the crew IO node of the present invention.

FIG. 20 depicts one contemplated embodiment of a scheduling GUI 266 that is presented to the crew member after pressing the scheduling icon 256. The scheduling GUI 266 is contemplated to include a timeline 268 for the flight. The timeline 268 identifies specific events that may be preplanned for the flight. For example, if the flight is of a particularly long duration, the timeline 268 may include information that indicates when movies are to be played and in what sequence. The timeline 268 is contemplated to provide planning functionality to the crew. Once programmed, the timeline 268 may automatically execute the sequence of entertainment, etc., that has been preselected for a flight.

The scheduling GUI 266 also includes an events recorder 270 that records the events that occur during the flight. In the illustrated example, a flight attendant call 272 was made early in the flight. The flight attendant call 272, which was made by one of the passengers via the passenger IO node 20, for example, is recorded in the events recorder 270 to keep a running log of what occurred during the flight.

The scheduling GUI 266 also may include an altitude record 274 that provides a visual output of the vertical position of the aircraft 36 during the flight. The altitude record 274 may be provided with specific logic to prevent certain activities from occurring if those activities do not comply with applicable aviation guidelines. For example, if movies may be played only after the aircraft 36 reaches a particular altitude, the crew IO node 22 may be programmed to prevent the playing of any media until such time that the aircraft 36 has reached a suitable altitude.

Figure 21:
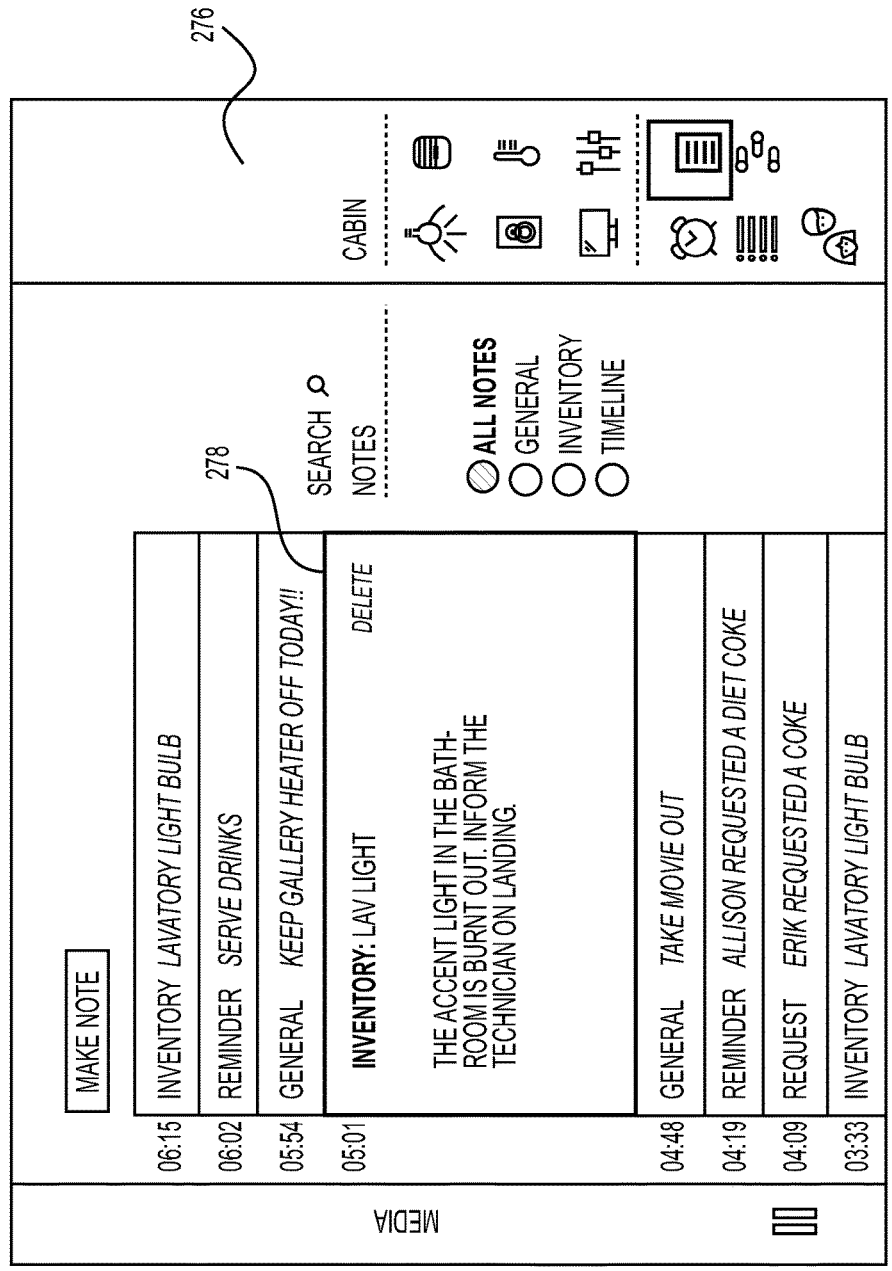
FIG. 21 provides a contemplated layout for a notes GUI for display on the crew IO node of the present invention.

FIG. 21 is a depiction of one contemplated embodiment of a notes GUI 276 that permits flight crew members to keep track if important information during the flight. For example, if the lavatory light burns out, the flight crew member may make a notation 278 via the notes GUI 276. Flight maintenance crews may then rely on the notes to take corrective action after the aircraft 36 reaches its destination.

Figure 22:
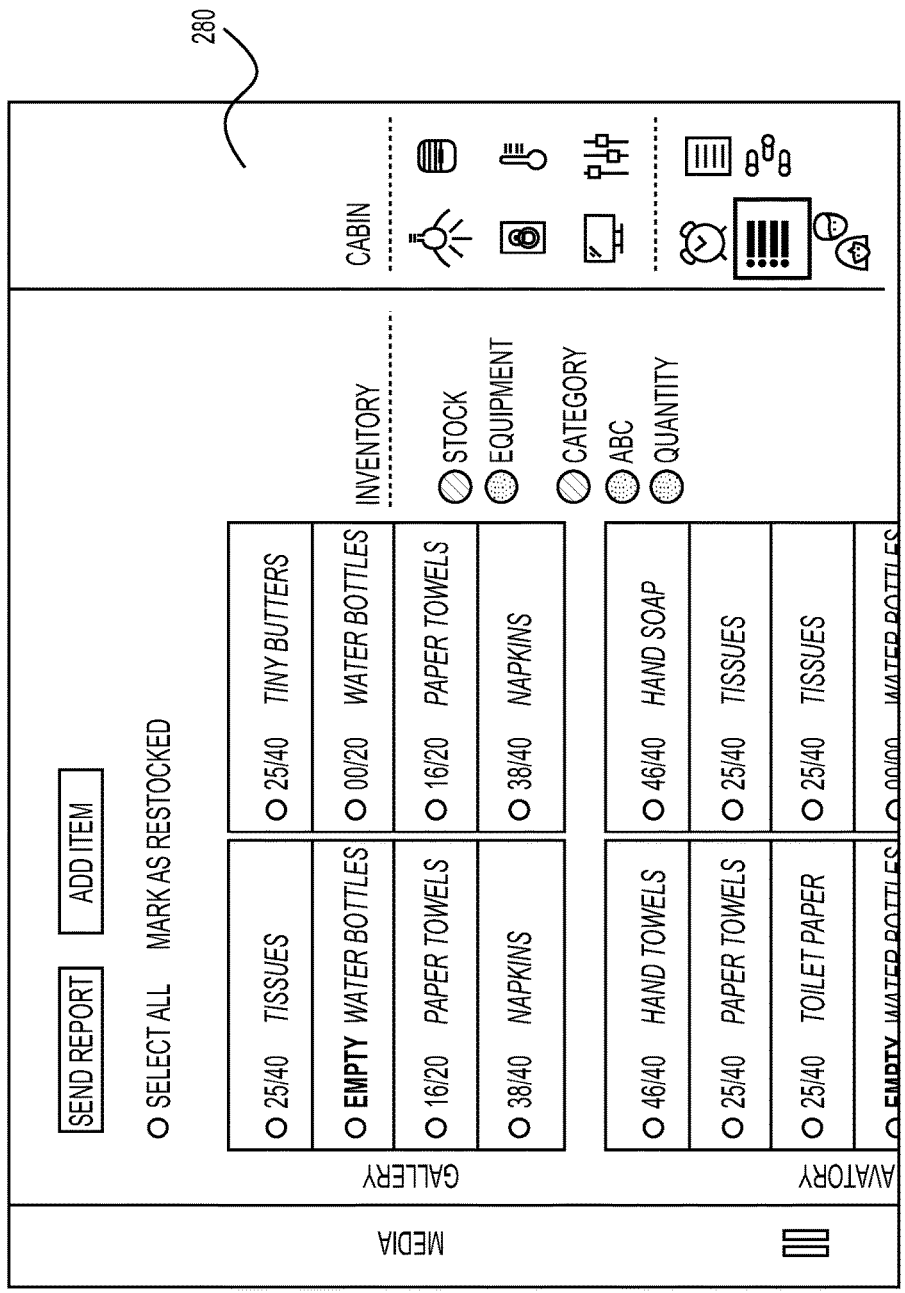
FIG. 22 depicts one contemplated format for a reports GUI for display on the crew IO node of the present invention.

FIG. 22 depicts one contemplated embodiment of a report GUI 280 that may be presented to a crew member after accessing the report icon 260. The report GUI 280 is contemplated to provide a tally of the supplies on board the aircraft 36 and to identify any supply needs. For example, if the aircraft 36 depletes its supply of paper towels, this information would be captured by the logic associated with the report GUI 280. When the aircraft 36 lands, the supply may be replenished by the ground crew that services the aircraft 36.

Figure 23:
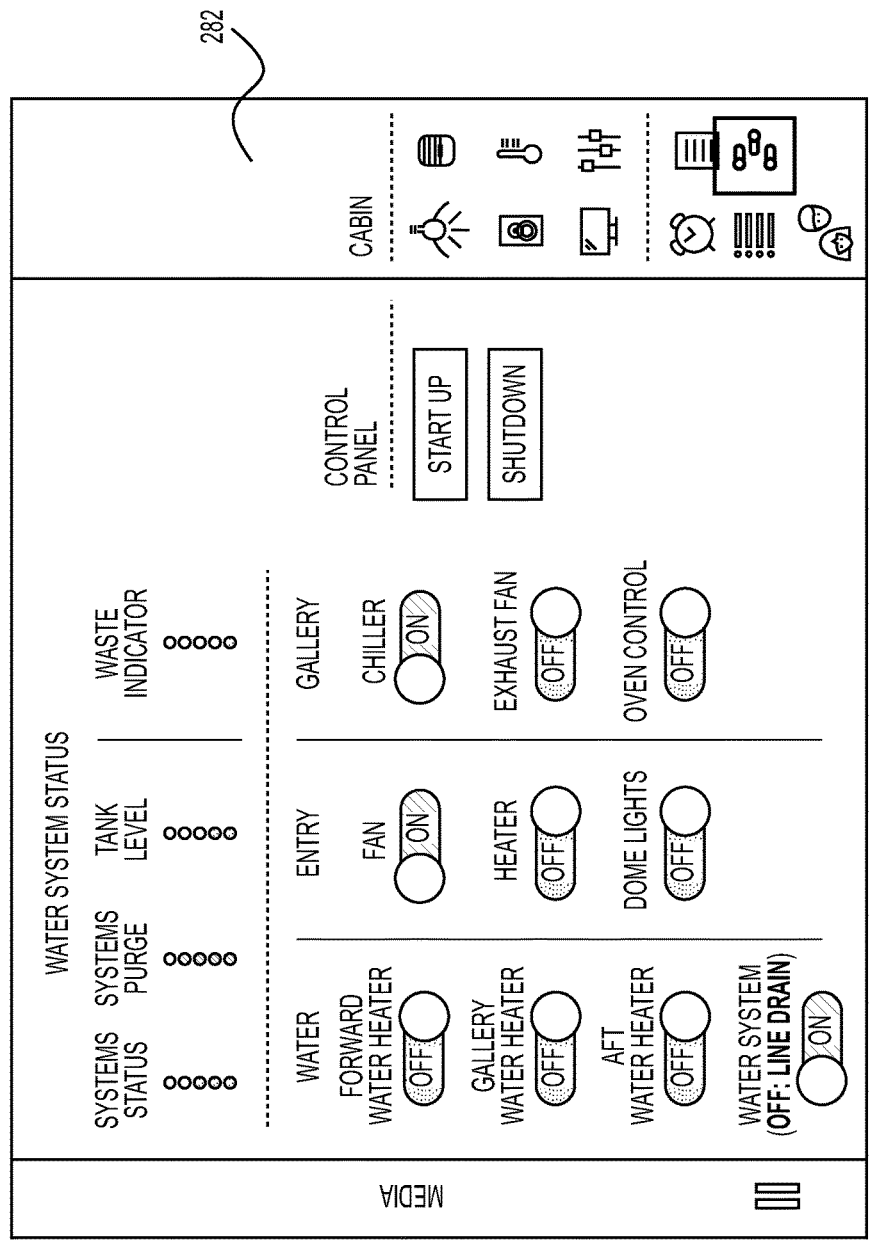
FIG. 23 illustrates one possible embodiment of a control GUI that may be provided to the user via the crew IO node of the present invention.

FIG. 23 provides one representation of a control panel GUI 282 that is accessible after pressing the control panel icon 262. Various devices, such as the hot water heater, may be controlled via the control panel GUI 282. In addition, the control panel GUI 282 may include a startup icon 284 and a shutdown icon 286. The startup icon 284 is contemplated to provide a startup of all equipment onboard the aircraft 36 needed during the flight. Conversely, the shutdown icon 286 shuts off all of the equipment on board the aircraft 36, usually after landing.

Figure 24:
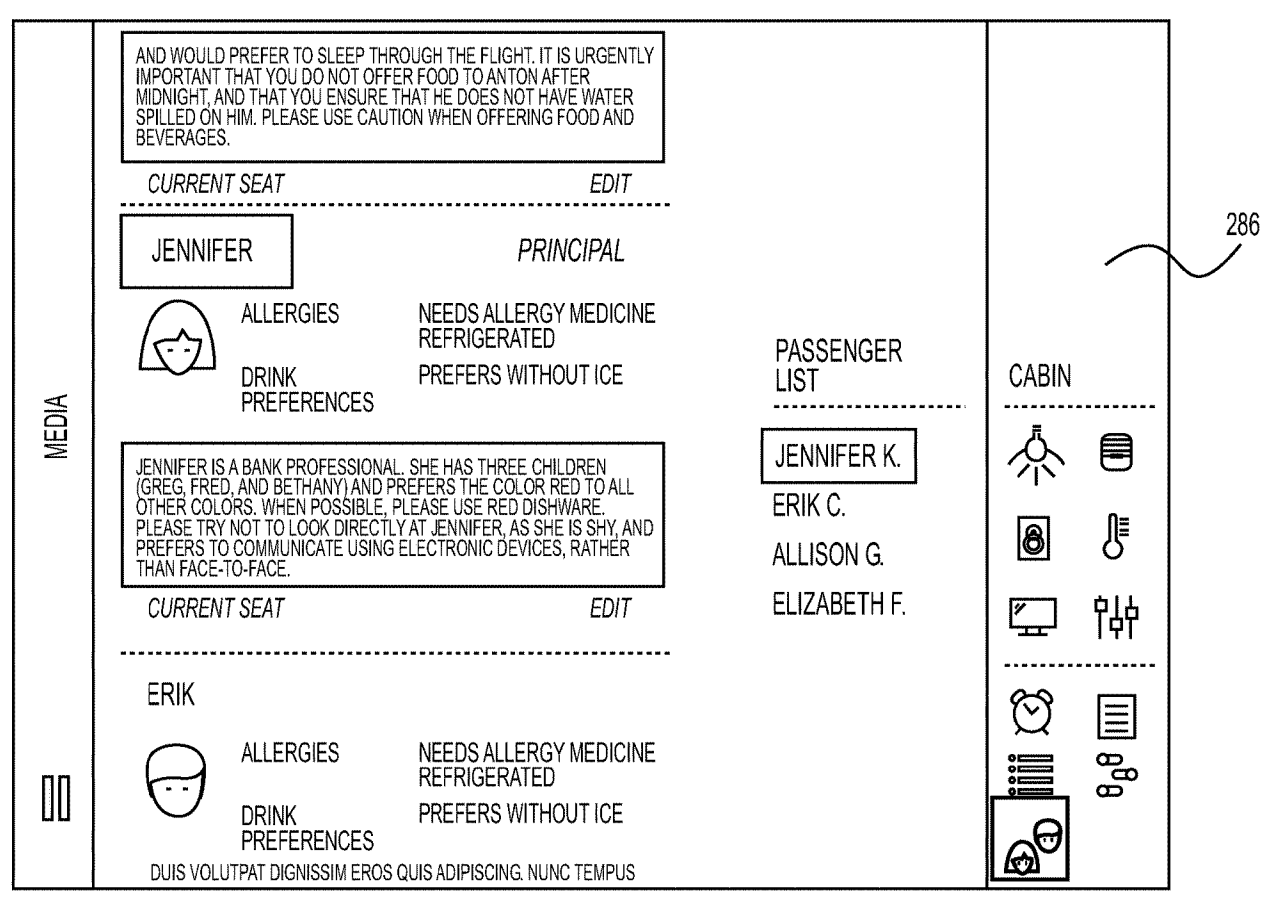

FIG. 24 depicts one contemplated embodiment of a passenger roster GUI 286 that may be accessed when pressing the passenger roster icon 264. The passenger roster GUI 286 is intended to provide specific information about the passengers on the aircraft 36. Pertinent information may include, for example, the passenger's name and any medications that the passenger may require during the flight.

Figure 25:
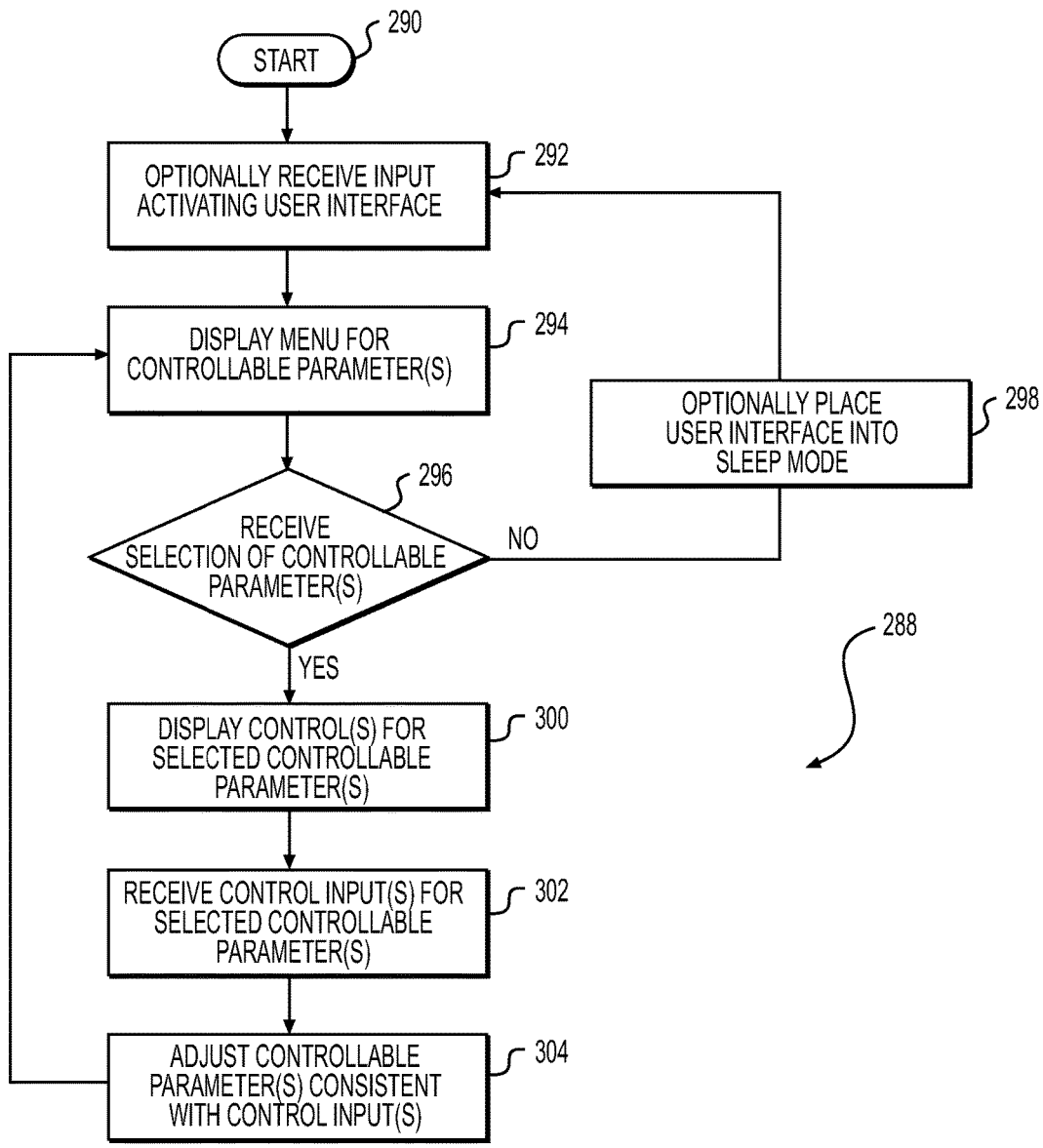
FIG. 25 is a flow chart that illustrates one method contemplated to operate in connection with the crew IO node of the present invention.

FIG. 25 illustrates one method 288 contemplated by the present invention. The method 288 is considered to be generic to the operation of the crew IO node 22 of the present invention. In the discussion that follows, reference is made to the crew tablet 130. As noted above, the tablet 130 is but one embodiment of the passenger IO node 20 of the present invention. The passenger IO node 20 may be embodied in other electronic devices, such as smart phones. Reference to the tablet 130, therefore, should not be understood to limit the present invention solely to a tablet 130, whether mobile or positioned at a fixed location within the aircraft 36.

The method 288 begins at step 290. From the start 290, the method 288 proceeds to step 292 where the method 288 optionally receives input activating the user interface associated with the crew IO node 22. As noted above, this includes, but is not limited to, activation of the tablet 130.

It is contemplated that the tablet 130 might not provide any display until activated. As noted above, a user may activate the tablet 130 by touching the touch-sensitive surface 150 thereof. Alternatively, a switch (not shown) may be provided to turn on or turn off the tablet 130.

Separately, it is contemplated that the tablet 130 may operate such that the tablet 130 remains in a constant on mode of operation. In this contemplated mode of operation, the tablet 130 may provide a display at all times during flight.

From optional step 292, the method 288 proceeds to step 294, where a menu for controllable parameters is displayed. The menu includes, but is not limited to, a display of the cabin light icon 152, the window shade icon 154, the audio icon 156, the thermostat icon 158, the video icon 160, the presets icon 162, the table light icon 164, the reading light icon 166, and the seat icon 168. As discussed above, each of these icons is associated with a controllable parameter on board the aircraft 36. As also noted, the crew main menu 252 is contemplated to include additional icons associated with the crew cabin submenu 254.

The method 288 then proceeds to step 296, where a selection of one of the controllable parameters is received by the method 288. As noted above, the input may be received when a person taps on a particular icon 152-168 and/or 256-264. In an alternative contemplated operation, the user may use a swiping motion to access the menus associated with the icons 152-168 and/or 256-264. Specifically, the user may use a swiping motion, by dragging his or her finger across the surface 150 of the tablet 130, to navigate through the different menus associated with each of the icons 152-168 and/or 256-264.

If no input is received at step 296, the method 288 proceeds to an optional step 298 where the tablet 130 is placed into a sleep mode. In the sleep mode, the tablet 130 may go dark. Alternatively, it may continue to display the screen last selected by a user. In still another embodiment, the tablet 130 may default to the crew main menu 252.

If the user selects one of the controllable parameters by selecting one of the icons 152-168 and/or 256-264, the method 288 proceeds to step 300. At step 300, the method 288 displays the controls appropriate for the selected controllable parameter. For example, if the table light icon 164 is selected, the light intensity menu 210 may be displayed. A color light menu 212 also may be displayed as another lighting option for the table light.

Once the control(s) are displayed, the method 288 proceeds to step 302. At step 302, the method 288 receives control input(s) from the user to adjust one or more of the controllable parameters in the cabin 48 of the aircraft 36.

After receiving the input at step 302, the method 288 proceeds to step 304, where the selected, controllable parameters are adjusted according to the input provided by the user.

After step 304, the method 288 is contemplated to return to step 294 and display the crew main menu 252.

As noted above, it is contemplated that the tablet 130 will operate after being awakened by a person's touch. In keeping with this mode of operation, it is contemplated that the tablet 130 will enter into a sleep mode (or go dark) after the expiry of a predetermined time period. For example, if the tablet 130 has not received tactile input for a period of 2 minutes, the tablet 130 will be instructed to enter into the sleep mode where it will await the next command.

FIGS. 26-41 illustrate a second method 306 of operation of the tablet 130 of the present invention.

Figure 26:
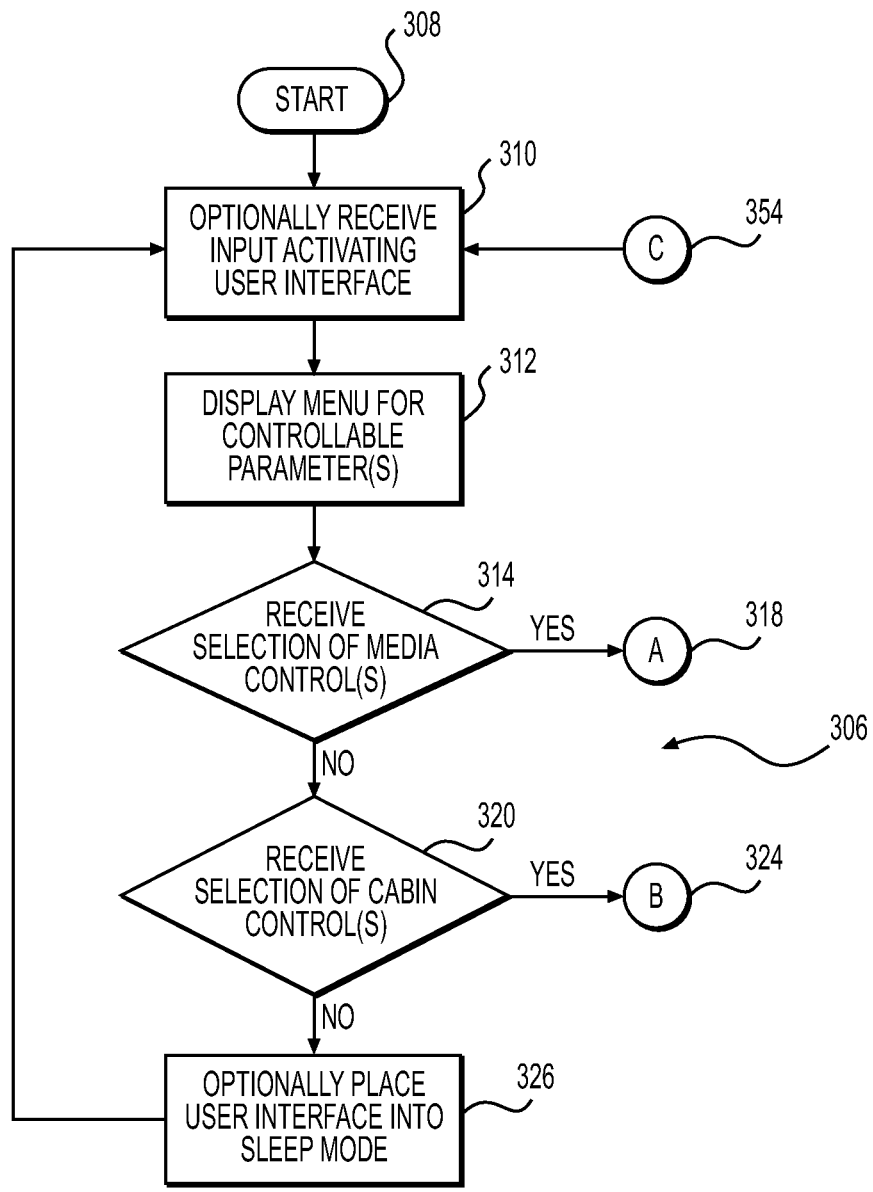
FIGS. 26-41 provide flow charts that collectively outline a second method contemplated to operate together with the crew IO node of the present invention.

As illustrated in FIG. 26, the method 306 starts at step 308. The method 306 then proceeds to optional step 310, where the tablet 130 receives an input activating the tablet 130. As noted above, the activation input may be a touch on the surface 150 of the tablet 130. Other inputs may be employed to wake the tablet 130 from a sleep mode without departing from the scope of the present invention.

After being awakened at step 310, the method 306 proceeds to step 312, where the tablet 130 displays a menu of parameters that are controllable within the cabin 48 of the aircraft 36. As noted above, the controllable parameters may be divided into two separate categories including, but not limited to, a media submenu 138, a cabin submenu 140, and a crew submenu 254. As should be apparent, the media submenu 138, the cabin submenu 140, and the crew submenu 254 are contemplated embodiments of the present invention but should not be understood to be limiting of the present invention.

Figure 27:
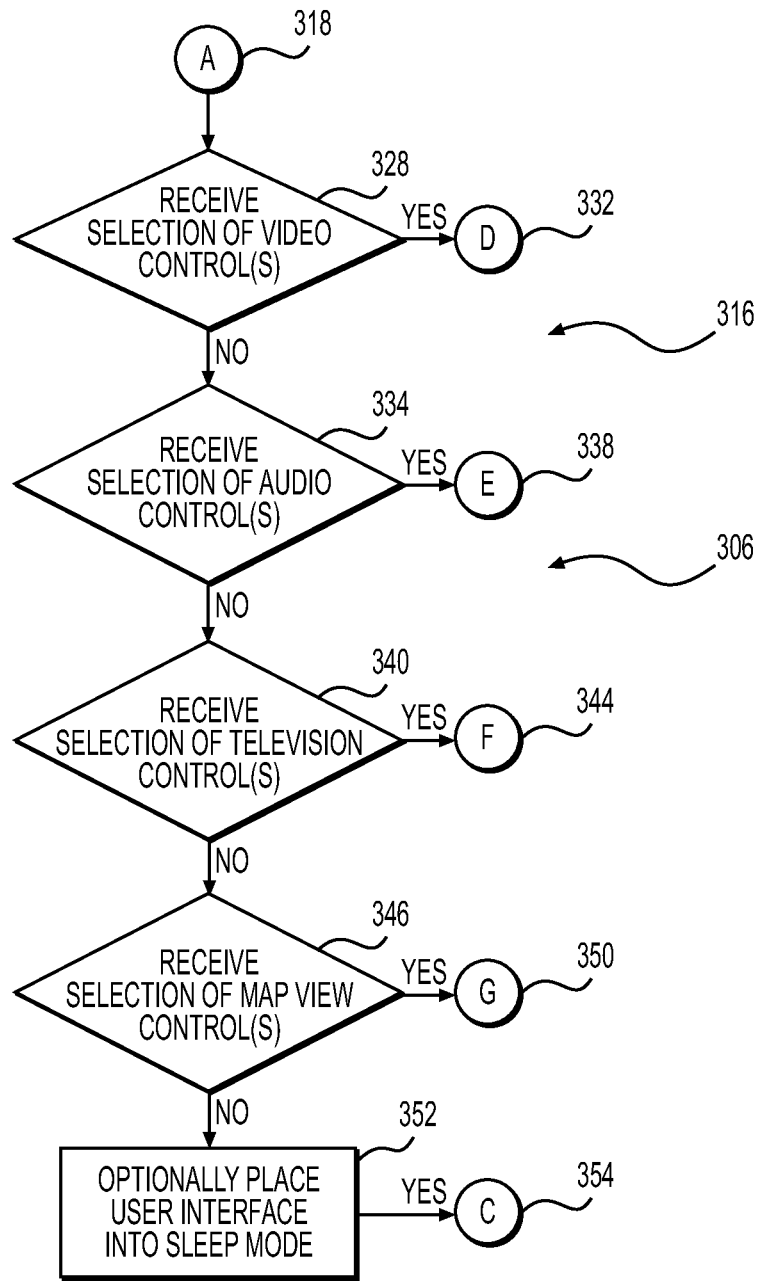

The method 306 then proceeds to step 314, where the method 306 awaits receipt of the selection of media controls. If the user selects an option under the media submenu 138, the method 306 proceeds to the media subroutine 316, which is illustrated in FIG. 27. The connector 318 connects step 314 with the media subroutine 316.

Figure 28:
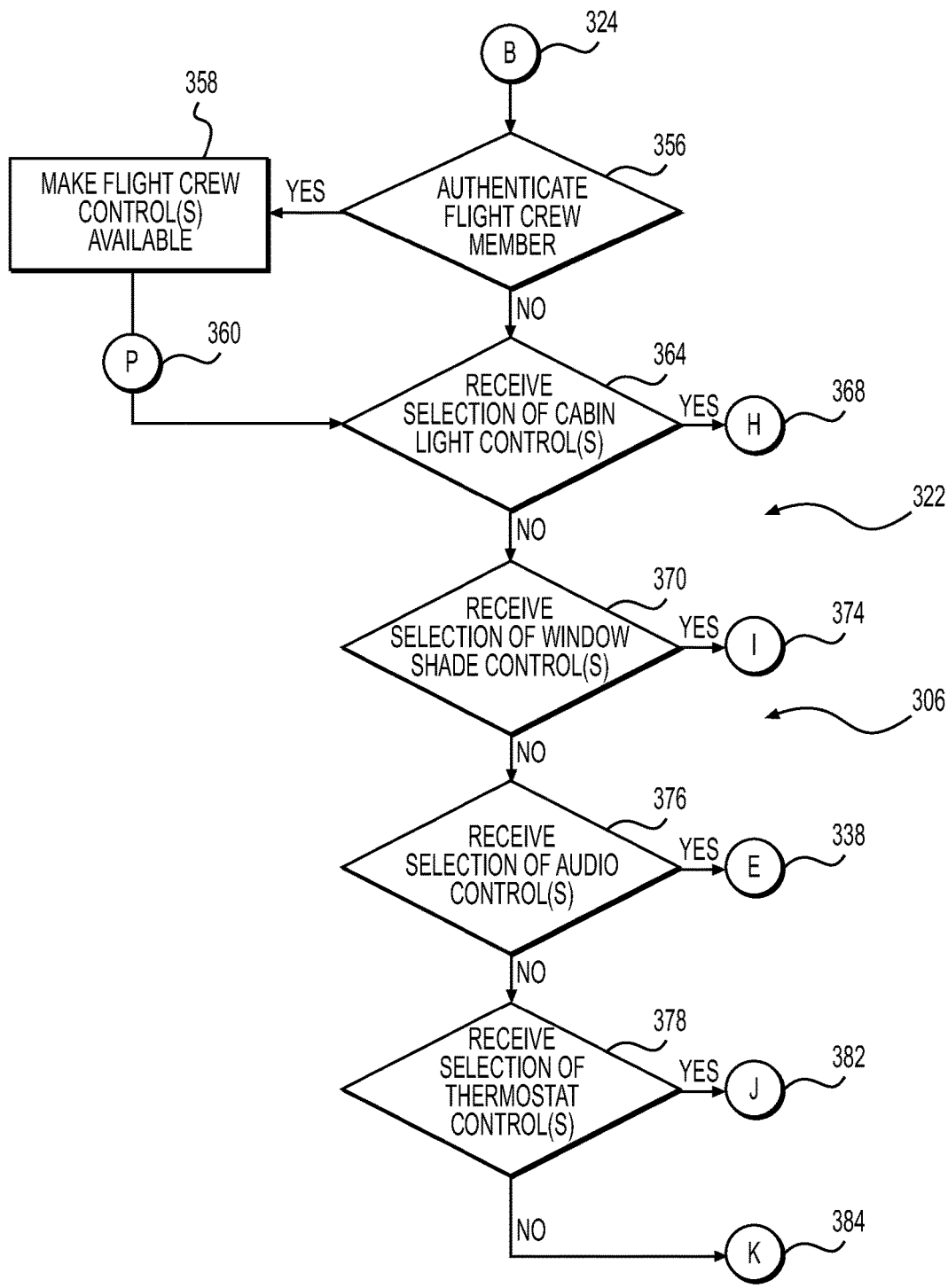

If the user does not select one of the options available in the media submenu 138, the method 306 proceeds to step 320. If the user selects one of the options associated with cabin parameters, the method 306 proceeds to the cabin subroutine 322 via the connector 324. The cabin subroutine 322 is illustrated in FIG. 28.

It is noted that steps 314 and 320 are illustrated in series. However, these steps 314, 320 need not occur in the order presented. Moreover, the steps 314, 320 need not occur in series. It is contemplated that the steps 314, 320 may operate in parallel or in any other suitable order without departing from the scope of the present invention.

If the user does not select one of the cabin parameters in step 320, the method 306 proceeds to step 326, where the method 306 places the tablet 130 into a sleep mode. As noted, this step 326 is optional. It is contemplated that the tablet 130 may not enter a sleep mode. Instead, it is contemplated that the tablet 130 may remain in a constant on condition during operation of the aircraft 36.

FIG. 27 illustrates the media subroutine 316, which connects to the portion of the method 306 illustrated in FIG. 26 via the connector 318.

Figure 29:
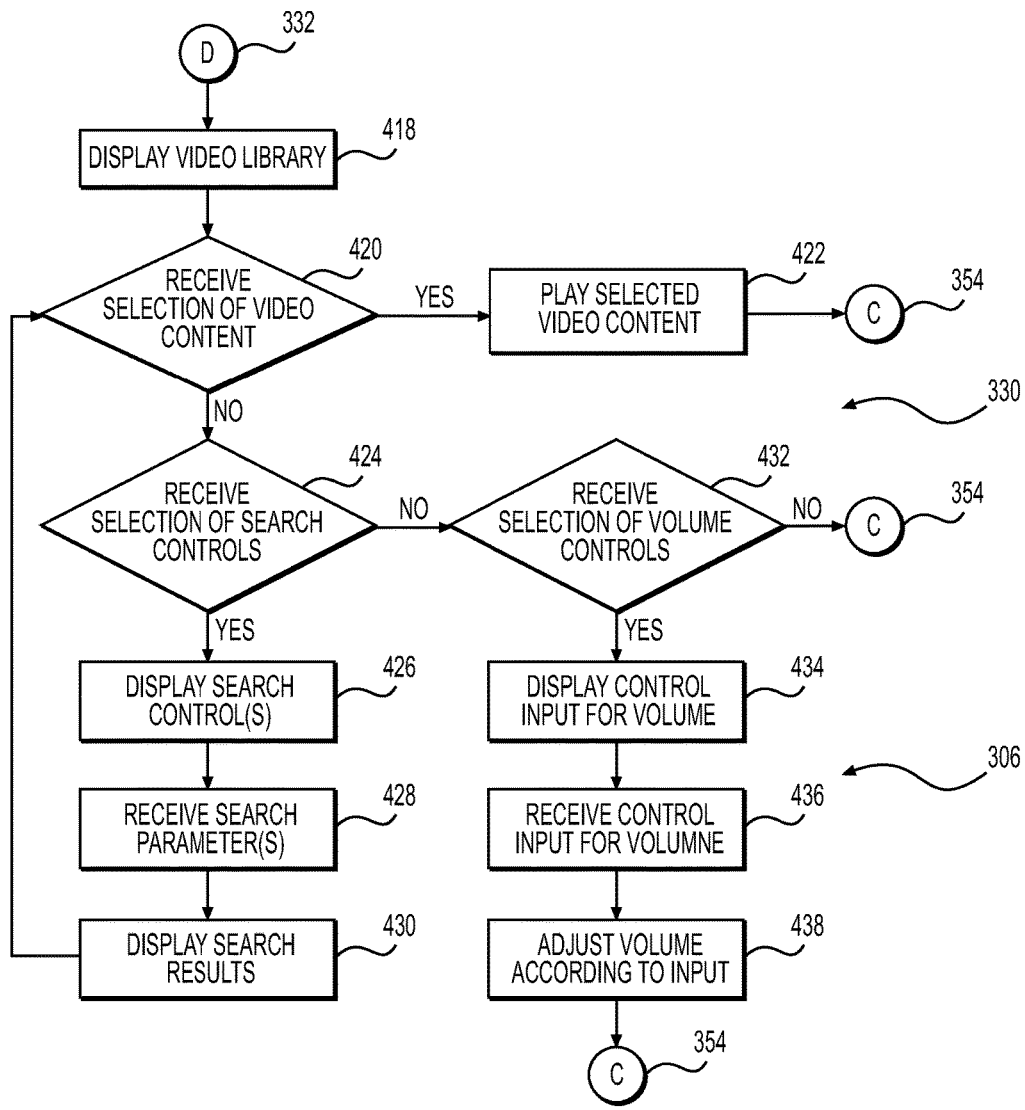

The media subroutine 316 starts at step 328, where the method 306 awaits selection of video control(s). If video control(s) are selected, the method 306 proceeds to the video subroutine 330 via the connector 332. The video subroutine 330 is illustrated in FIG. 29.

Figure 30:
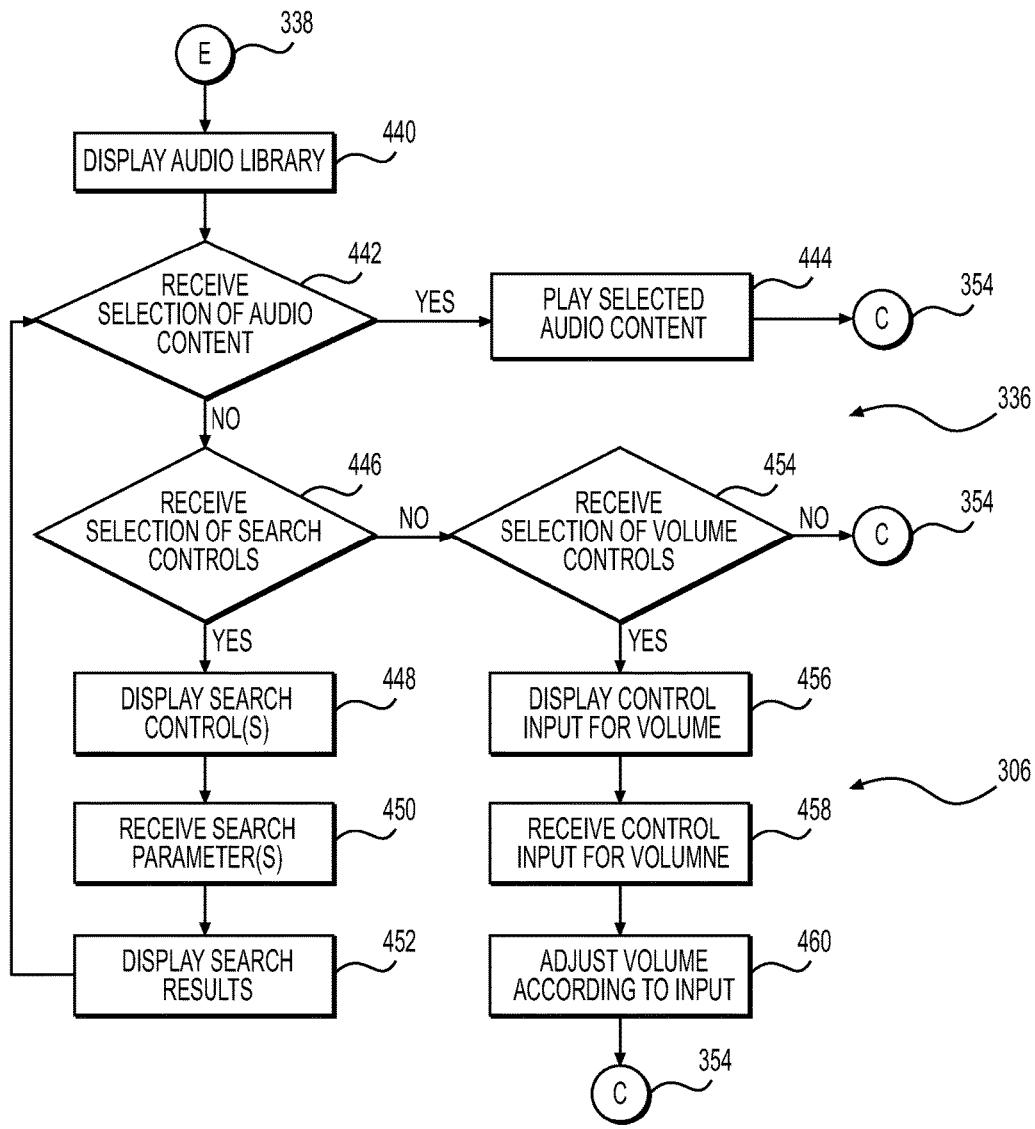

If the user does not select the video control(s), the method 306 proceeds to step 334, where the method 306 awaits selection of the audio control(s). If the user selects the audio controls(s), the method 306 proceeds to the audio subroutine 336 via the connector 338. The audio subroutine 336 is illustrated in FIG. 30.

Figure 31:
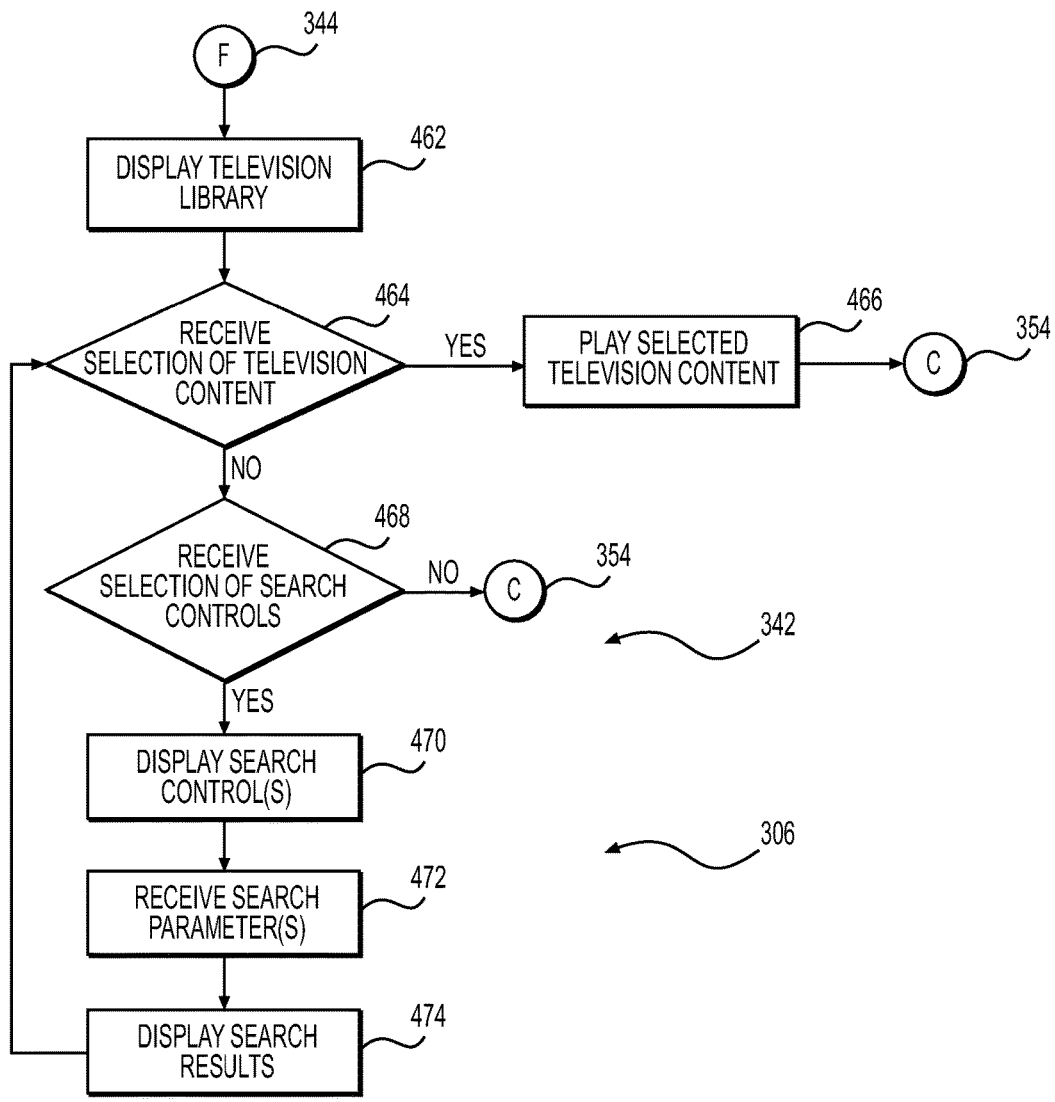

If the user does not select the audio control(s) in step 334, the method 306 proceeds to step 340, where the method 306 awaits selection of the television control(s). If the user selects the television control(s), the method 306 proceeds to the television subroutine 342 via the connector 344. The television subroutine 342 is illustrated in FIG. 31.

If the user does not select the television control(s), the method 306 proceeds to step 346, where the method 306 awaits selection of the map view control(s). If the user selects the map view control(s), the method 306 proceeds to the map subroutine 348 via the connector 350.

As should be apparent, while the steps 328, 334, 340, 346 are illustrated in a particular order, the present invention does not require that the steps 328, 334, 340, 346 be executed in this order. The steps 328, 334, 340, 346 may be executed in any order without departing from the scope of the present invention. In an alternative contemplated embodiment, the steps 328, 334, 340, 346 may proceed in parallel.

If the user does not select the map view control(s), the method 306 proceeds to step 352, where the method 306 optionally places the tablet 130 into sleep mode. From step 352, the method 306 returns to step 310 via the connector 354.

FIG. 28 illustrates the cabin subroutine 322. As discussed in the paragraphs that follow, the cabin subroutine 322 illustrates one contemplated subroutine for processing input and output related to the parameters associated with functions that are controllable within the cabin 48 of the aircraft 36 from the tablet 130.

The cabin subroutine 322 connects to the portion of the method 306 illustrated in FIG. 26 via the connector 324.

The cabin subroutine 322 then proceeds to step 356, where the subroutine 322 authenticates if the user of the tablet 130 is a flight crew member. If the person operating the tablet 130 is a flight crew member, the method 306 proceeds to step 358. At step 358, the method 306 makes flight crew control(s) available to the flight crew member. It is noted that, if the user is authenticated as a flight crew member, the tablet 130 transitions to a crew IO node 22 and additional functionality becomes available to the flight crew member, as noted above.

Figure 41:
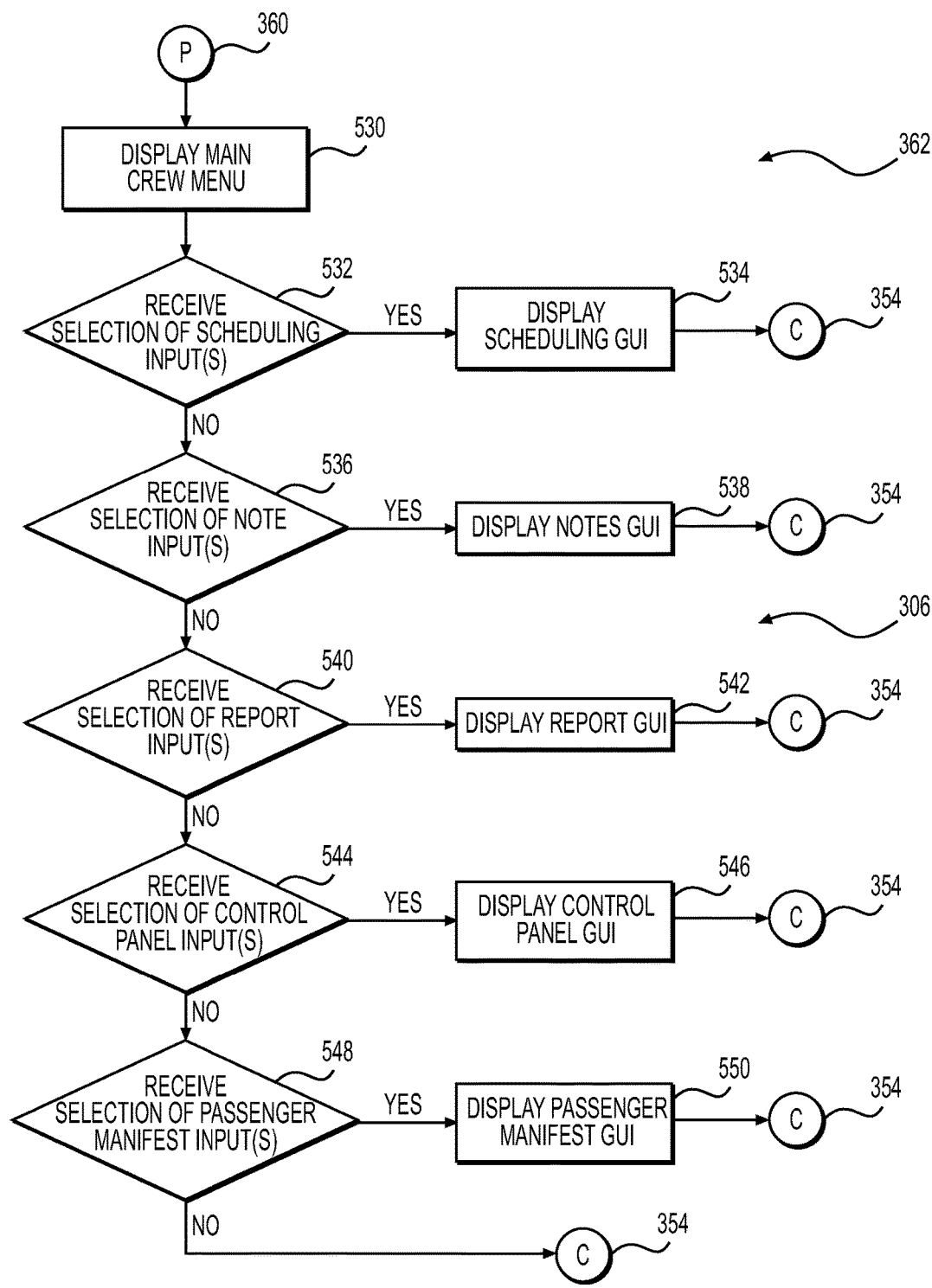

In connection with the activation of flight crew options at step 358, the method 306 makes available the functionality designated by the connector 360. The connector 360 provides access to the flight crew subroutine 362, which is illustrated in FIG. 41. The flight crew subroutine 362 is described in greater detail below. With the understanding that the flight crew member will have additional features available to him or her, the method 306 proceeds to step 364. If the user is not a flight crew member but is a passenger, the method 306 proceeds to step 364 without additional functionality being provided to the passenger.

Figure 33:
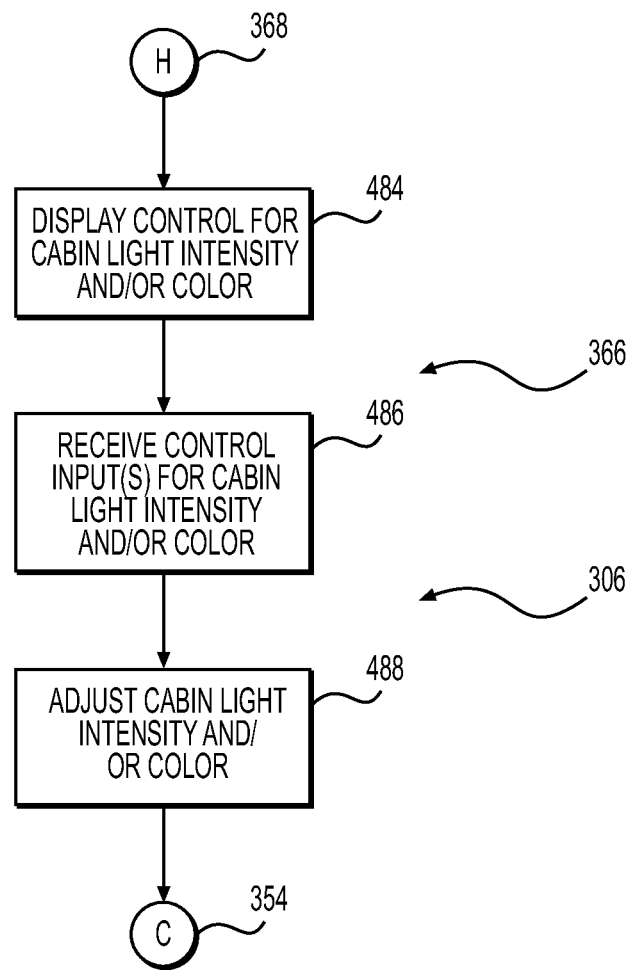

At step 364, the method 306 awaits receipt of the selection of cabin light control(s). The cabin light control(s) are made available if the user accesses the cabin light icon 152. If the method 306 receives the cabin light control(s), the method 306 proceeds to the cabin light subroutine 366 via the connector 368. The cabin light subroutine 366 is illustrated in FIG. 33.

Figure 34:
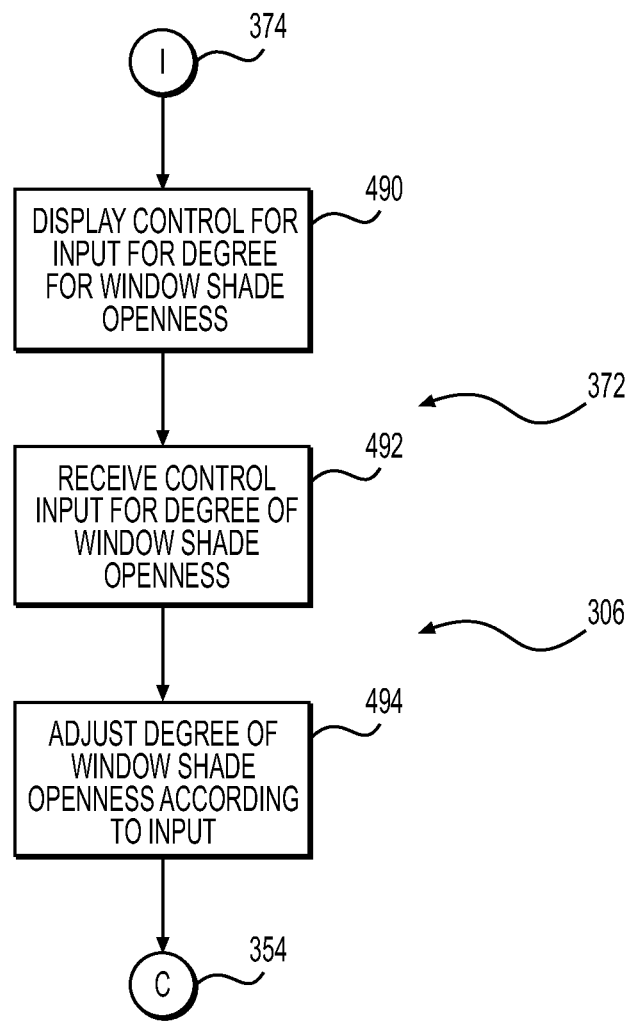

If the method 306 does not receive any selection of cabin light control(s), the method 306 proceeds to step 370. At step 370, the method awaits input of window shade control(s). The window shade control(s) are available through activation of the window shade icon 154, for example. If the method 306 receives input for the window shade control(s), the method proceeds to the window shade subroutine 372 via the connector 374. The window shade subroutine 372 is illustrated in FIG. 34.

If the method 306 does not receive inputs for the window shade control(s), the method 306 proceeds to step 376, where the method 306 awaits input for audio control(s). If the user accesses the audio control(s), the method 306 proceeds to the audio subroutine 336 via the connector 338. The audio subroutine 336 is illustrated in FIG. 30.

Figure 35:
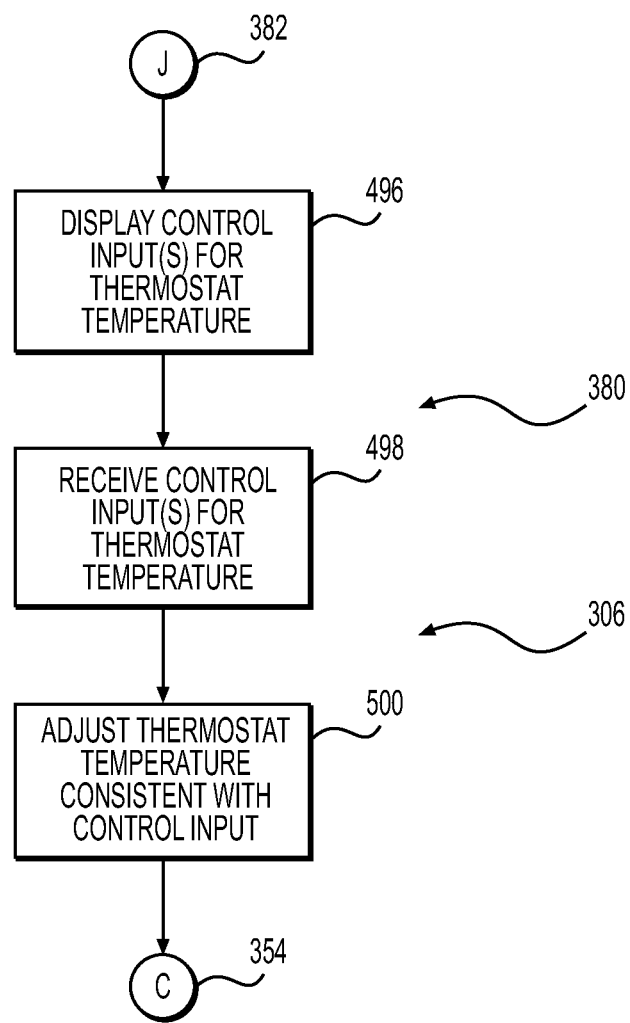

If the method 306 does not receive any selection of audio control(s) in step 376, the method proceeds to step 378, where the method 306 awaits selection of the thermostat controls. If the method 306 receives a selection of the thermostat control(s), such as by receiving a selection of the thermostat icon 158, the method 306 proceeds to the thermostat subroutine 380, which is illustrated in FIG. 35. The thermostat subroutine 380 connects to the portion of the method 306 depicted in FIG. 28 via the connector 382.

Figure 36:
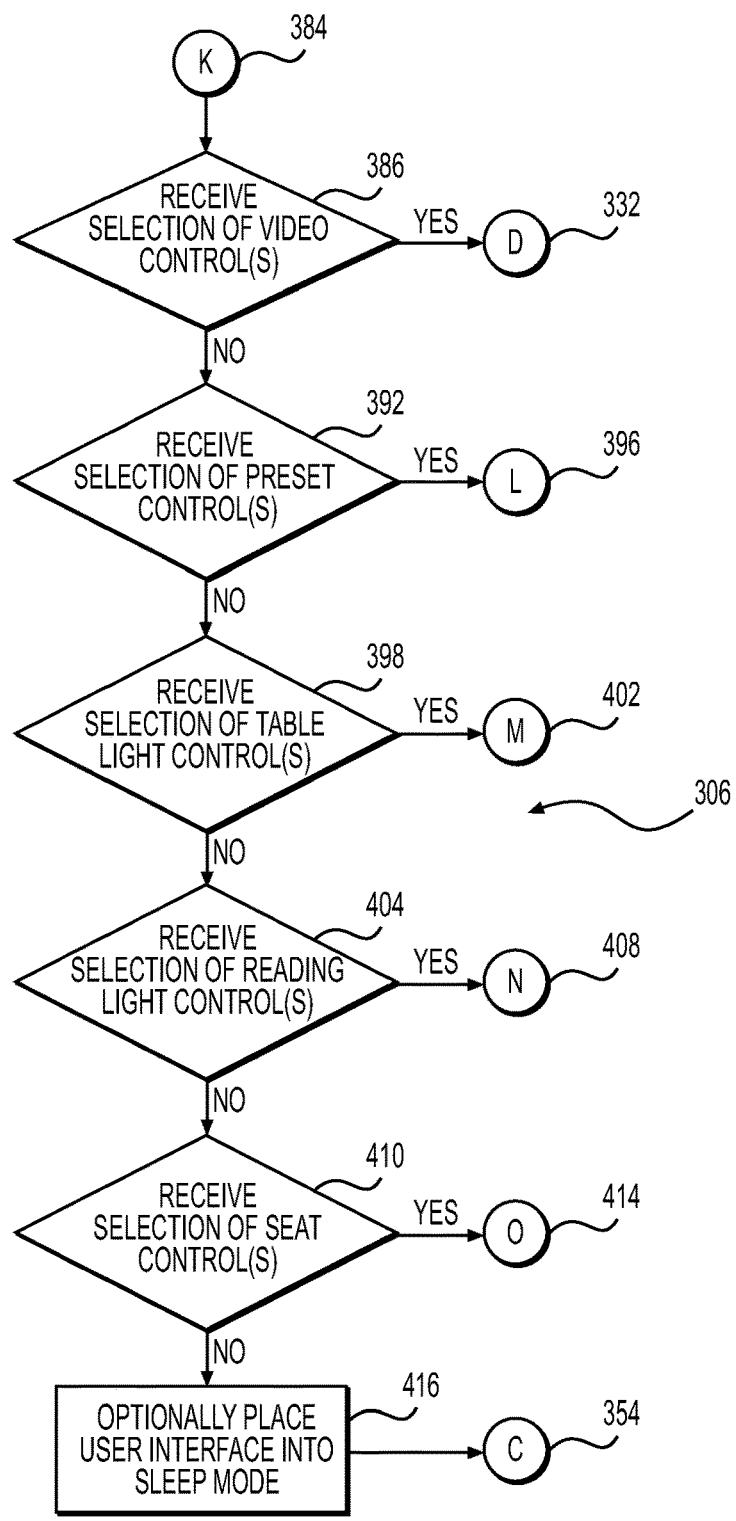

If the method 306 does not receive a selection of the thermostat control(s), the method proceeds, via the connector 384, to step 386, which is illustrated in FIG. 36. At step 386, the method 306 awaits input selecting the video control(s) that are made available by the selection of the video icon 160, for example.

If the method receives a selection of video control(s) at step 386, the method 306 proceeds to the video subroutine 330, which is illustrated in FIG. 29. The connector 332 indicates the connection to the video subroutine 330. The video subroutine 330 may be accessed via the video icon 160, for example.

Figure 37:
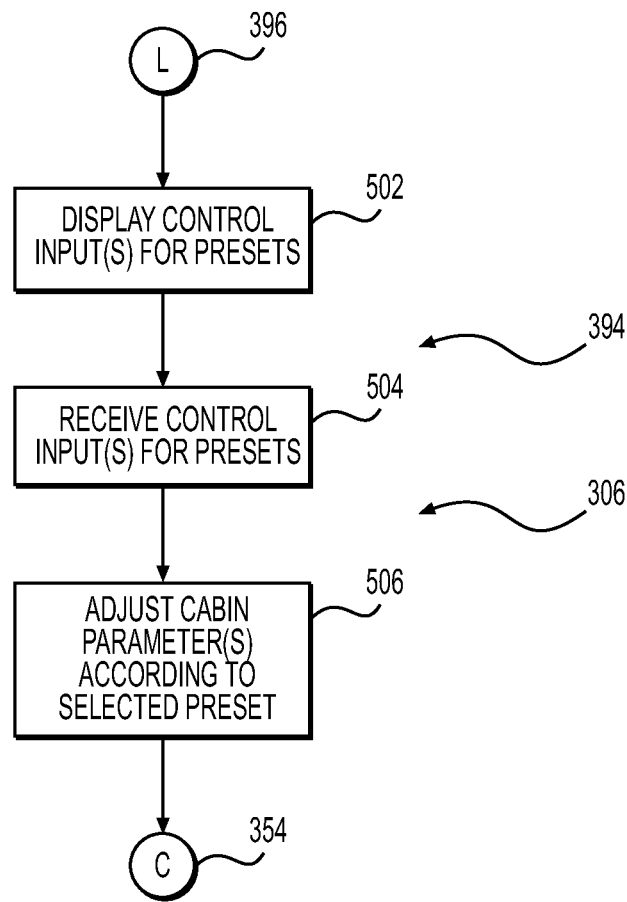

If the method 306 does not receive the selection of video control(s) at step 386, the method proceeds to step 392. At step 392, the method awaits selection of the presets control(s) via the tablet 130. The user may access the presets control(s) by selecting the presets icon 162, for example. If the user accesses the presets control(s), the method 306 transitions to the presets subroutine 394 via the connector 396. The presets subroutine 394 is illustrated in FIG. 37.

Figure 38:
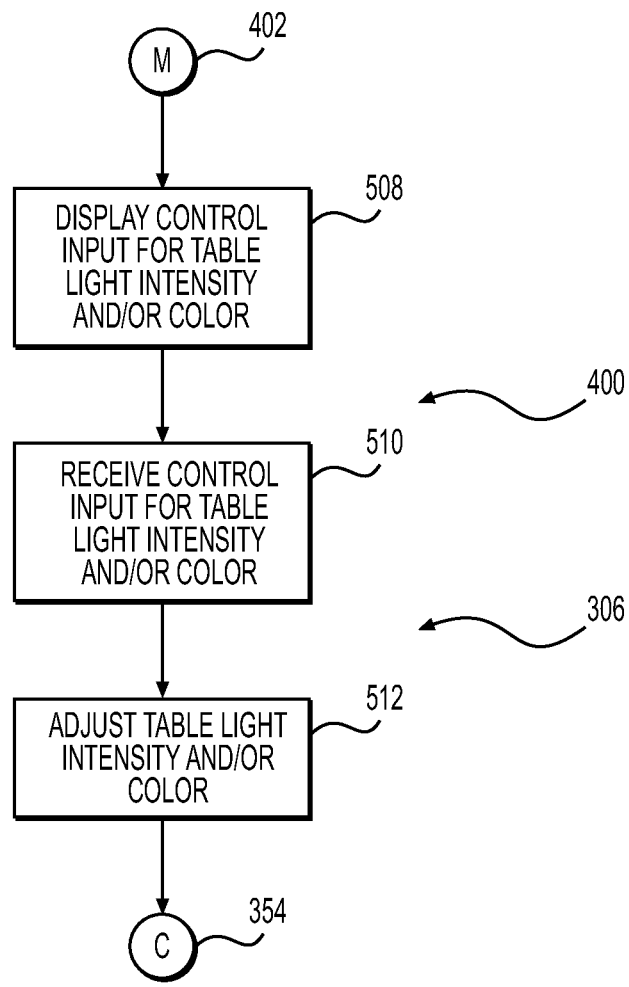

If the method 306 does not receive any input indicating the selection of the presets control(s), the method proceeds to step 398. At step 398, the method 306 determines if the user provides input selecting the table light control(s). If so, the method 306 proceeds to the table light subroutine 400, which is illustrated in FIG. 38. The table light control(s) are accessible via the table light icon 164, for example. The connector 402 connects step 398 with the table light subroutine 400.

Figure 39:
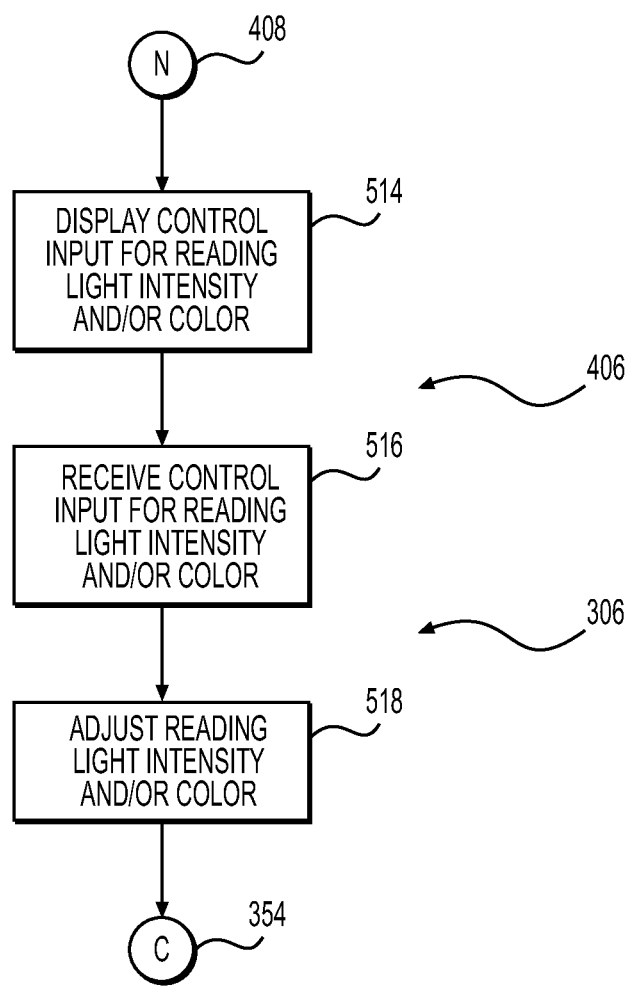

If the method 306 does not receive any input from the user that the user has selected the table light icon 164, the method 306 proceeds to step 404 where the method 306 awaits input of the selection of the reading light control(s). If the user selects the reading light control(s) by accessing the reading light icon 166, for example, the method proceeds to the reading light subroutine 406 via the connector 408. The reading light subroutine 406 is illustrated in FIG. 39.

Figure 40:
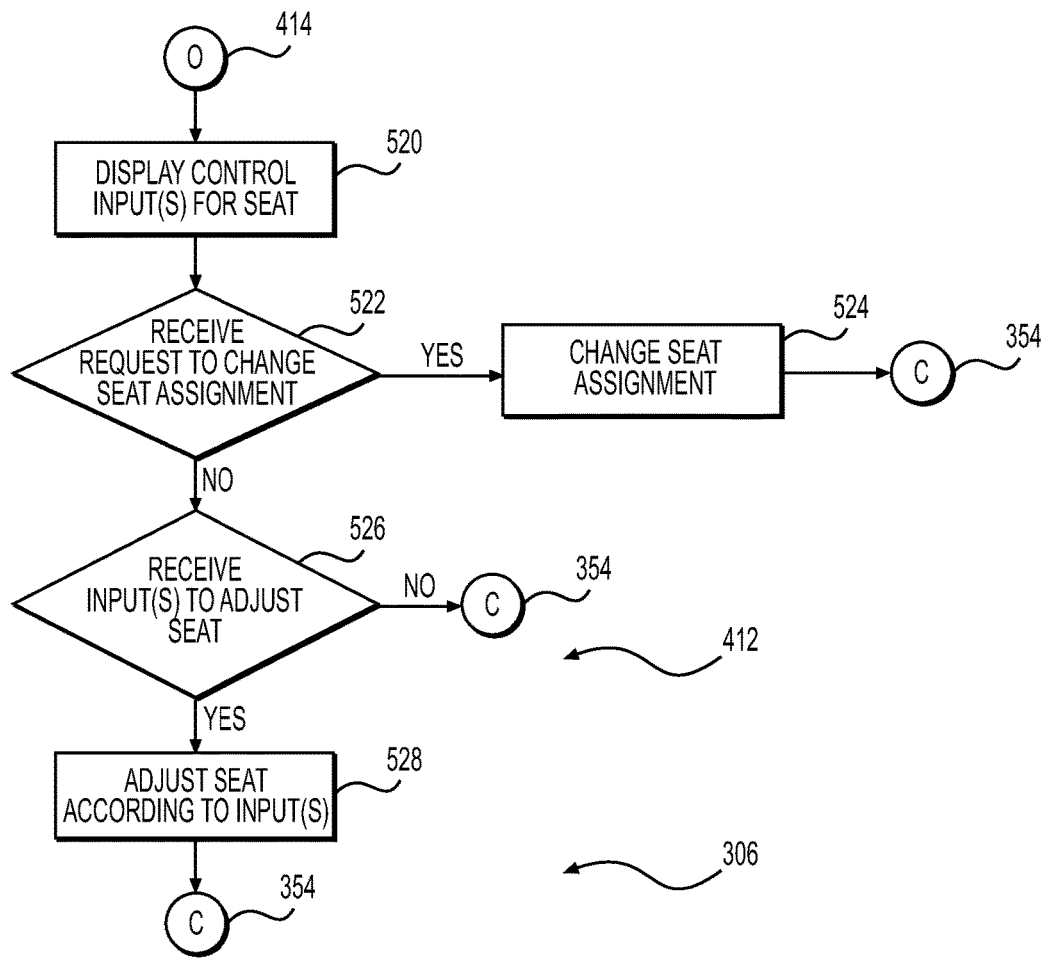

If the method 306 does not receive any input from the user selecting the reading light control(s), the method 306 proceeds to step 410. At step 410, the method 306 awaits input of the selection of the seat control(s). The seat controls may be accessed by selecting the seat icon 168. If the method 306 receives the selection of the seat control(s), the method 306 proceeds to step 412 via the connector 414. The seat subroutine is illustrated in FIG. 40.

If the method 306 does not receive input regarding the seat, the method 306 proceeds to step 416, where the method 306 optionally places the tablet 130 into a sleep mode. From step 416, the method 306 returns to step 310 via the connector 354.

It is noted that the steps 364, 370, 376, 378, 386, 392, 398, 404, 410 need not be executed in the order described in connection with FIGS. 28 and 36. To the contrary, the steps may be performed in a different order without departing from the scope of the present invention. Alternatively, one or more of the steps 364, 370, 376, 378, 386, 392, 398, 404, 410 may be performed in parallel without departing from the scope of the present invention.

FIG. 29 illustrates the video subroutine 330, as discussed above.

The video subroutine 330 starts at step 418, which follows from the connector 332 that is illustrated in FIG. 27.

At step 418, the method 306 displays the video library 180, which is contemplated to encompass all of the video files that are accessible by the user. The video files may be stored in the database 18, for example. While the video files may be displayed in any particular order and according to any particular sorting parameter(s), it is contemplated that the video files will be presented in alphabetical order.

From step 418, the method 306 proceeds to step 420 where the method 306 determines if there has been a selection of specific video content.

If specific video content has been selected, the method 306 proceeds to step 422. At step 422, the selected video content is played to the user until the video content is exhausted. In other words, at step 422, the video content is anticipated to be played from the beginning to the end of the video file. As should be apparent, control options may be provided to the user to start, stop, advance, and retard the play back of the video file at any point during the playback of the video content. As indicated above, the video content may be provided in the form of an electronic file, a file read from a storage medium (i.e., a digital video disk), etc.

After the video file is played, the method 306 returns to step 310 via the connector 354. Since the user has control over the playback of the video content, the method 306 may return to the step 310 at any time after the user elects to stop the playback, as appropriate.

If the user does not select a particular video from the video library 180, the method proceeds to step 424, where the method 306 awaits the user's selection of search controls. The search controls and search terms may be entered, for example, in the search GUI 182.

If the user enters search parameters, the method 306 proceeds to step 426 where the method 306 displays search control(s). In this step 426, the search controls and search terms may be entered, for example, in the search GUI 182. Searching is contemplated to be performed based on words, phrases, or other suitable search parameters.

At step 428, the method 306 receives the search parameter(s) from the user.

From step 428, the method 306 proceeds to step 430, where the method 306 displays the result(s) of the search to the user.

After the search results are displayed, the method returns to step 420, where the user is permitted to select one of the results from the results that are displayed at step 430.

If the method 306 does not receive the selection of search control(s) at step 424, the method proceeds to step 432, where the method 306 receives a selection of volume controls. If the user does not select the volume controls, the method returns to step 310 via the connector 354. If the user does select the volume controls, the method 306 proceeds to step 434, where the volume controls are displayed to the user.

At step 436, the method 306 receives input for the volume controls.

The method 306 then proceeds to step 438, where the method 306 adjusts the volume according to the input provided by the user.

After step 438, the method 306 returns to step 310 via the connector 354.

FIG. 30 illustrates the audio subroutine 336, as discussed above.

The audio subroutine 336 starts at step 440, which follows from the connector 338 that is illustrated in FIG. 27.

At step 440, the method 306 displays the audio library 180 in the audio submenu 192, which is contemplated to encompass all of the audio files that are accessible by the user. The audio files may be stored in the database 18, for example. While the audio files may be displayed in any particular order and according to any particular sorting parameter(s), it is contemplated that the audio files will be presented in alphabetical order.

From step 440, the method 306 proceeds to step 442 where the method 306 determines if there has been a selection of specific audio content.

If specific audio content has been selected, the method 306 proceeds to step 444. At step 444, the selected audio content is played to the user until the audio content is exhausted. In other words, at step 444, the audio content is anticipated to be played from the beginning to the end of the audio file. As should be apparent, control options may be provided to the user to start, stop, advance, and retard the play back of the audio file at any point during the playback of the audio content. As indicated above, the audio content may be provided in the form of an electronic file, a file read from a storage medium (i.e., a compact disk, digital audio disk, or mp3 file, etc.).

After the audio file is played, the method 306 returns to step 310 via the connector 354. Since the user has control over the playback of the audio content, the method 306 may return to the step 306 at any time after the user elects to stop the playback, as appropriate.

If the user does not select a particular audio from the audio library 180, the method proceeds to step 446, where the method 306 awaits the user's selection of search controls. The search controls and search terms may be entered, for example, in the search GUI 192.

If the user enters search parameters, the method 306 proceeds to step 448 where the method 306 displays search control(s). In this step 448, the search controls and search terms may be entered, for example, in the search GUI 192. Searching is contemplated to be performed based on words, phrases, or other suitable search parameters.

At step 450, the method 306 receives the search parameter(s) from the user.

From step 450, the method 306 proceeds to step 452, where the method 306 displays the result(s) of the search to the user.

After the search results are displayed, the method returns to step 442, where the user is permitted to select one of the results from the results that are displayed at step 452.

If the method 306 does not receive the selection of search control(s) at step 446, the method proceeds to step 454, where the method 306 receives a selection of volume controls. If the user does not select the volume controls, the method returns to step 310 via the connector 354. If the user does select the volume controls, the method 306 proceeds to step 456, where the volume controls are displayed to the user.

At step 458, the method 306 receives input for the volume controls.

The method 306 then proceeds to step 460, where the method 306 adjusts the volume according to the input provided by the user.

After step 460, the method 306 returns to step 310 via the connector 354.

FIG. 31 illustrates the steps comprising the television subroutine 342 of the method 306. The television subroutine 342 begins from the connector 344, as illustrated.

The television subroutine 342 of the method 306 of the present invention starts with a display of the television submenu 194 at step 462. One contemplated embodiment of the television submenu 194 is shown in FIG. 10.

After the display of the television library in step 462, the method 306 proceeds to step 464, where the method 306 awaits receipt of the selection of television content. Television content may include the selection of a particular television channel or pre-recorded television content. If the method 306 receives selected television content from the user, the method 306 proceeds to step 466, where the selected television content is played. After the selected television content is played, the method 306 returns to step 310 via the connector 354.

If the method 306 does not receive a selection of television content, the method proceeds to step 468 where the method receives a selection of search controls. If the method 306 does not receive a selection of search controls, the method 306 returns to step 310 via the connector 354.

If the method 306 receives a selection of search controls, the method 306 proceeds to step 470 where the method displays search controls.

At step 472, the method 306 receives input of search parameters. The user may search for specific content, for a genre of television programs, etc.

After receiving the search parameters, the method 306 proceeds to step 474, where the method displays the search results. The user may then select content from the displayed results. As such, the method returns to step 464 from step 474.

Figure 32:
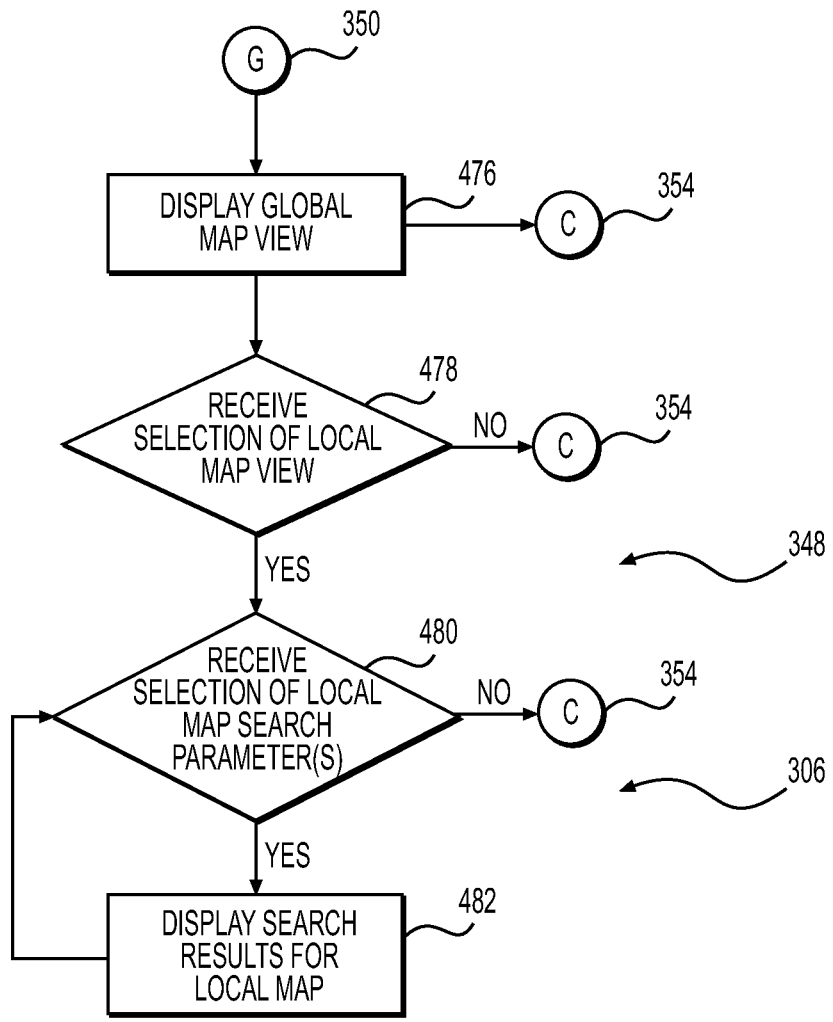

FIG. 32 illustrates the global map subroutine 348 according to one contemplated embodiment of the present invention. The global map subroutine 348 starts at step 476, which follows from the connector 350. At step 476, the method displays the global map GUI 198. One contemplated embodiment of the global map GUI 198 is shown in FIG. 11.

The method 306 proceeds to step 478 where the method 306 awaits receipt of a selection of a local map view. If the method 306 does not receive any selection of a local map view, the method 306 proceeds to step 480.

At step 480, the method 306 awaits selection of local map search parameters via the local map GUI 200. The local map GUI 200 may be configured to receive search parameters associated with the destination of the flight, for example. The user may wish to search for restaurants, museums, and other points of interest at the destination location for the flight, for example.

If the method 306 does not receive a selection of local map search parameters at step 480, the method 306 returns to step 310 via the connector 354.

If the method 306 receives a selection of local map search parameters at step 480, the method 306 proceeds to step 482. At step 482, the method 306 displays the results for the local map search.

FIG. 33 illustrates the cabin lights subroutine 366. The cabin lights subroutine 366 is contemplated to provide control over the cabin lights in the aircraft 36.

The cabin lights subroutine 366 begins at step 484, which is connected to step 364, for example, via the connector 368. At step 484, the method 306 displays the controls for cabin light intensity and/or color. As noted above, the intensity of the cabin lights may be altered to provide a desirable brightness for the lights in the cabin 48. In addition, it is contemplated that the color of the cabin lights may be adjusted between "warm" and "cool" tones.

After step 484, the method 306 proceeds to step 486 where the method receives controls from the user over the cabin lights. The control inputs may be over light intensity and/or color. Controls may be possible via a suitable touch-sensitive control bar, as discussed above.

At step 488, the method 306 adjusts the cabin light intensity and/or color based on the inputs received from the user.

FIG. 34 illustrates the window shade subroutine 372. The window shade subroutine 372 provides control over the degree of openness of the window shades in the cabin 48 of the aircraft 36.

The window shade subroutine 372 begins at step 490, which follows the connector 374. At step 490, the method displays the controls for input of the degree to which one or more of the window shades is to be opened. The control may be by a control slider as discussed above.

At step 492, the method receives control input from a user regarding the degree to which the window shades are to be opened on the aircraft 36. As noted above, the control may be provided over a single window shade or a group of window shades.

At step 494, the method 306 adjusts the degree to which the window shades are opened based on the input provided by the user.

FIG. 35 illustrates the thermostat subroutine 380, which connects to the remainder of the method 306 via the connector 382.

At step 496, the method 306 displays the control inputs for controlling the temperature on board the aircraft 36. The thermostat controls are contemplated to include a control bar a slider, but the controls are not limited to this arrangement.

At step 498, the method 306 receives input for the thermostat controls. Specifically, the method 306 receives temperature inputs for one or more of the regions within the cabin 48 of the aircraft 36.

At step 500, the method 306 adjusts the temperature within the cabin 48 of the aircraft 36 according to the control inputs provided by the user. The method then returns to step 310 via the connector 354.

FIG. 36 illustrates the remainder of the method 306 that is illustrated in FIG. 28. This portion of the method 306 continues after step 378, to which a connection is made via the connector 384.

This portion of the method 306 has already been described.

FIG. 37 illustrates the presets subroutine 394. The presets subroutine connects to the method 306 via the connector 396.

The presets subroutine 394 begins at step 502 where the method 306 displays the control inputs for the presets. One contemplated embodiment for this display is the presets GUI 234 that is illustrated in FIG. 16, for example.

At step 504, the method 306 receives input for the control presets. As discussed above, one of the presets may include a lighting level and environmental controls that are suitable for viewing a meeting. Another preset may include environmental controls for assisting with sleep.

At step 506, the method 306 adjusts that cabin parameters according to the inputs provided by the user.

FIG. 38 illustrates the table light subroutine 400. The table light subroutine 400 provides access to and control over one or more lights that may be positioned above a retractable table 76 or a conference table 80.

The table light subroutine 400 begins at step 508, where the method 306 displays the controls for the table light. The controls may include a control bar and slider as previously described. The controls may include one or both of intensity of the table light and the color, as discussed above.

From step 508, the method 306 proceeds to step 510 where the method 306 receives input regarding the intensity and/or color of the table light. The input may be provided by the user.

At step 512, the method 306 adjusts the table light according to the input received at step 510.

FIG. 39 illustrates a reading light subroutine 406. The reading light subroutine provides control over a reading light that is contemplated to be local to the passenger seat 74. In particular, the reading light is contemplated to be over the seat 74 of the passenger. The reading light subroutine 406 is contemplated to provide control over at least one of the light's intensity and/or color.

At step 514, the controls for the reading light are displayed by the method 306 of the present invention. The controls are contemplated to encompass a control bar with a slider as discussed herein. Of course, other control schemes may be employed without departing from the scope of the present invention.

At step 516, the method 306 receives input concerning the light intensity and/or color.

At step 518, the method 306 adjusts the light intensity and/or color in accordance with the inputs received at step 516.

FIG. 40 illustrates a seat subroutine 412, which connects with step 410 in the method 306, as illustrated in FIG. 36.

The seat subroutine 412 starts at step 520, where the method 306 displays the controls that are associated with the seat input(s).

The method proceeds to step 522, where the method 306 awaits a request from a user to change his or her seat assignment. If the method 306 receives a request for a passenger to change his or her seat assignment, the method 306 proceeds to step 524. At step 524, the method changes the seat assignment for the passenger according to the input received. A change in seat assignment includes a change in any preferences and settings previously provided for the seat of origin to the changes seat. Accordingly, it is contemplated that, if a passenger changes his or her seat 74, the comfort parameters previously entered will be transferred to the passenger's new seat 74.

If the method 306 does not receive a request for a passenger to change seats, the method 306 proceeds to step 526. At step 526, the method receives input from the user to adjust the seat. If the method 306 does not receive input to adjust the seat 74, the method proceeds to step 310 via the connector 354. If the method 306 receives input to adjust the seat, the method 306 proceeds to step 528. At step 528, the method 306 adjusts the seat 74 according to the input provided. After the seat 74 is adjusted, the method 306 returns to step 310 via the connector 354.

FIG. 41 illustrates one contemplated flow chart for the crew cabin subroutine 362, which is made available after authentication of the flight crew.

The crew cabin subroutine 362 begins at step 530, where the crew main menu is displayed. The crew main menu may be configured consistently with the crew main menu 252 that is illustrated in FIG. 19, for example. As noted above, however, the crew main menu 252 that is illustrated is meant to be exemplary of any of a number of possible variations. In other words, the crew main menu 252 is not intended to be limiting of the present invention.

After the display step 530, the crew cabin subroutine 362 proceeds to step 532, where the method 306 awaits input regarding scheduling associated with the functionality that is controllable within the cabin 48 of the aircraft 36.

If a flight crew member accesses an input function for the crew cabin subroutine 362 at step 532, the method proceeds to step 534 where the scheduling GUI 266 is displayed. Through this display, the crew member may control various functions within the cabin 48 of the aircraft 36.

It is contemplated that input may be provided in an interactive manner via the scheduling GUI 266 that is illustrated in FIG. 20. For example, if the flight crew member wishes to play a particular movie at a particular time index, the flight crew member may do so by accessing the scheduling GUI 268. Alternatively, if the flight crew member would like for the movie to begin playing after the aircraft 36 reaches a particular altitude, the flight crew member may set this parameter via the altitude record 274.

As with other subroutines described herein, after step 534, it is contemplated that the method 306 may return to step 310 via the connector 354.

If no-one selects the scheduling inputs at step 532, the method 306 proceeds to step 536, where the method awaits selection of inputs regarding notes. If a member of the flight crew accesses this feature, the method 306 proceeds to step 538, where the method 306 displays the notes GUI 276, such as the one illustrated in FIG. 21.

The notes GUI 276 is provided so that the flight crew may enter specific notes regarding a flight. As indicated in FIG. 21, this may include an indication that a lavatory light has burned out, requiring attention. Other notes also may be provided, as suggested by FIG. 21.

After notes are added, the method 306 is contemplate to return to step 310 via the connector 354.

If the flight crew does not select the notes GUI 276, the method 306 is contemplated to proceed to step 540. At step 540, the method 306 awaits receipt of a selection of the report icon 260.

If the report icon 260 is selected, the method proceeds to step 542, where the report GUI 280 is displayed. Once contemplated embodiment of the report GUI 280 is provided in FIG. 22. The report GUI 22 280 is contemplated to provide an interactive interface that permits the flight crew to update the status of items, for example, that are needed for operation of the aircraft 36. For example, if the aircraft 36 is running low on paper towels, this may be reported so that the deficiency may be addressed at the next opportunity.

As before, at the conclusion of step 542, the method 306 is contemplated to return to step 310 via the connector 354.

If the method 306 does not receive a selection of the reports input(s), the method 306 proceeds to step 544, where the method awaits receipt of the selection of control panel inputs. Control panel inputs are accessible be selecting the control panel icon 262, for example.

If a flight crew member accesses the control panel icon 262, the method 306 proceeds to step 546 where the method displays the control panel GUI 282. One example of the control panel GUI 282 is provided in FIG. 23.

The control panel GUI 282 is contemplated to provide an interface that permits the flight crew member to turn on or turn off specific components on the aircraft 36. For example, the flight crew member may wish to turn on the hot water heater that provides hot water to the lavatories on the aircraft 36.

After the flight crew member provides any input for the controllable parameters that are available at step 546, the method 306 is contemplated to return to step 310 via the connector 354.

If no selection is made for the control panel, the method 306 is contemplated to proceed to step 548, where the method 306 awaits selection of the passenger manifest inputs.

If the passenger manifest inputs are accessed, such as via the passenger manifest icon 264, the method 306 proceeds to step 550.

At step 550, the passenger manifest GUI 286 is displayed. The passenger manifest GUI 286 is contemplated to provide an interactive menu so that the flight crew member may access and enter personal information about the persons on board the aircraft.

After receipt of any entries at step 550, the method 306 is contemplated to return to step 310 via the connector 354.

If the method 306 does not receive any selection of inputs at steps 532, 536, 540, 544, 548, the method 306 is contemplated to return to step 310 via the connector 354.

As should be apparent from FIGS. 13-17, the present invention is contemplated to provide general, localized, and individualized control via the passenger IO node 20, such as the tablet 130. Control may be provided for the cabin 48 as a whole. Selective control may alternatively be provided for zones within the aircraft 36. Finally, the user is provided with control over functionality associated with a passenger's seat 74.

As discussed above, inputs provided by any of the IO nodes 20, 22 and 28-34 are first provided to the controller 16. The reason for this is simple: the controller 16 provides overall control for the functions that are available to passengers in the cabin 48. Without a centralized control, it is possible that passengers might issue instructions that are contrary to one another. The controller 16 may be programmed to address these conflicts or issue an alarm when conflicts arise.

As noted above, it is contemplated that the controller 16 will incorporate a command hierarchy that will resolve any conflicts between the various inputs received from the various nodes 20, 22, 28, 30, 32, 34. The command hierarchy may be based on the status of the person (i.e., crew versus passenger) or based on the location of the IO node (i.e., window IO node 34 versus bulkhead IO node 28). It is also noted that the command and control functions need not be incorporated solely in the controller 16 but may be incorporated into other features without departing from the scope of the present invention.

As also noted above, the present invention contemplates reliance on an isometric view of the cabin 48 of the aircraft 36. The isometric view permits a user to select specific controllable features and zones within the aircraft 36. For example, the user may select one of the passenger seating areas 58, 60, 62 over which control is to be asserted. Alternatively, the user may select an individual seat 74 over which controls are to be asserted. Still further, by selecting a suitable icon from an isometric view of the cabin 48 of the aircraft 36, the user may assert control over one or more of the monitors 96 within the aircraft 36. The isometric view of the cabin 48 of the aircraft 36 provides an easily understood interface for a user to direct inputted commands and assert control over one or more controllable parameters within the cabin 48 of the aircraft 36.

As noted above, the present invention is not intended to be limited solely to the embodiment(s) described herein. To the contrary, those skilled in the art should appreciate that the present invention may be embodied in one or more variations and equivalents to the embodiment(s) described herein. The present invention is intended to encompass those variations and equivalents.

What is claimed is:

1. A method of scheduling operation of a plurality of controllable functionalities within a cabin of an aircraft, the method comprising:

displaying on a mobile computing device a graphical user interface suitable for permitting scheduling of the controllable functionalities during a course of an aircraft flight, the computing device being in communication with an aircraft controller suitable for causing execution of the controllable functionalities;

receiving at the computing device an indication of the controllable functionalities to be scheduled;

receiving at the computing device a scheduling criterion for triggering execution of the controllable functionalities during the course of the aircraft flight;

transmitting from the computing device to the aircraft controller a signal indicative of the controllable functionalities to be scheduled and the scheduling criterion for triggering execution of the controllable functionalities; and causing, by the aircraft controller, execution of the controllable functionalities upon occurrence of the scheduling criterion during the course of the aircraft flight, wherein the controllable functionalities comprise cabin environmental functions and passenger cabin comfort functions, wherein the controllable functionalities are controllable by a user regardless of the location of the user within the cabin, and wherein the controllable functionalities are prevented from occurring based on an altitude of the aircraft if execution of the controllable functionalities is non-compliant with a guideline for the altitude.

2. The method of claim 1, wherein the scheduling criterion is a time index indicative of a time at which execution of at least one of the controllable functionalities is to be performed.

3. The method of claim 2, wherein the time index is indicative of a time measured from a departure of the aircraft flight.

4. The method of claim 2, further comprising displaying a timeline on the graphical user interface, the time index being graphically represented on the timeline.

5. The method of claim 1, wherein the scheduling criterion is an altitude at which execution at least one of the controllable functionalities is to be performed.

6. The method of claim 5, further comprising:
displaying a graphical representation of flight altitude over a duration of the aircraft flight on the graphical user interface,
wherein the altitude at which execution of the at least one of the controllable functionalities is to be performed is represented on the graphical representation.

7. The method of claim 1, wherein at least one of the controllable functionalities comprises playing a movie.

8. The method of claim 1, wherein at least one of the controllable functionalities comprises one of adjusting cabin light intensity, cabin light color, cabin temperature, the degree of openness of at least one window shade, and media volume.

9. The method of claim 1, wherein the graphical user interface is a scheduling graphical user interface.

10. The method of claim 9, wherein the scheduling graphical user interface displayed on the computing device is available only to aircraft crew members upon authentication.

11. A system for scheduling operation of a plurality of controllable functionalities within a cabin of an aircraft, comprising:
a mobile computing device for displaying a graphical user interface suitable for permitting scheduling of the controllable functionalities during a course of an aircraft flight, the computing device being operative for receiving an input indicative of:
the controllable functionalities to be scheduled; and
a scheduling criterion for triggering execution of the controllable functionalities during the course of the aircraft flight; and
an aircraft controller in communication with the computing device for receiving a signal from the computing device indicative of the controllable functionalities and the scheduling criterion,
wherein the aircraft controller causes execution of the controllable functionalities upon occurrence of the scheduling criterion during the course of the aircraft flight,
wherein the controllable functionalities comprise cabin environmental functions and passenger cabin comfort functions,
wherein the controllable functionalities are controllable by a user regardless of the location of the user within the cabin, and
wherein the controllable functionalities are prevented from occurring based on an altitude of the aircraft if execution of the controllable functionalities is non-compliant with a guideline for the altitude.

12. The system of claim 11, wherein the scheduling criterion is a time index indicative of a time at which execution of at least one of the controllable functionalities is to be performed.

13. The system of claim 12, wherein the time index is indicative of a time measured from a departure of the aircraft flight.

14. The system of claim 12, wherein the graphical user interface displays a timeline as an output, the time index being graphically represented on the timeline.

15. The system of claim 11, wherein the scheduling criterion is an altitude at which at least one of the controllable functionalities is caused to be executed.

16. The system of claim 15, wherein:
the graphical user interface displays a graphical representation of the altitude over a duration of the aircraft flight, and
the altitude at which the at least one of the controllable functionalities is caused to be executed is represented on the graphical representation.

17. The system of claim 11, wherein at least one of the controllable functionalities comprises playing a movie.

18. The system of claim 11, wherein at least one of the controllable functionalities comprises one of adjusting cabin light intensity, cabin light color, cabin temperature, the degree of openness of at least one window shade, and media volume.

19. The system of claim 11, wherein the graphical user interface is a scheduling graphical user interface.

20. The system of claim 19, wherein the scheduling graphical user interface displayed on the computing device is available only to aircraft crew members upon authentication.

* * * * *